(12) United States Patent
Girtman et al.

(10) Patent No.: US 9,493,316 B2
(45) Date of Patent: Nov. 15, 2016

(54) ROBOTIC CARTON UNLOADER

(71) Applicant: INTELLIGRATED HEADQUARTERS LLC, Mason, OH (US)

(72) Inventors: Michael L. Girtman, O'Fallon, MO (US); Brian E. Neville, Edwardsville, IL (US); Matthew Wicks, St. Charles, MO (US)

(*) Notice: Subject to any disclaimer, the term of this patent is extended or adjusted under 35 U.S.C. 154(b) by 0 days.

(21) Appl. No.: 14/445,929

(22) Filed: Jul. 29, 2014

(65) Prior Publication Data

US 2015/0037131 A1 Feb. 5, 2015

Related U.S. Application Data

(60) Provisional application No. 61/860,209, filed on Jul. 30, 2013, provisional application No. 61/871,292, filed on Aug. 28, 2013, provisional application No. 61/894,871, filed on Oct. 23, 2013, provisional (Continued)

(51) Int. Cl.
| | |
|---|---|
| B65G 67/24 | (2006.01) |
| B25J 15/06 | (2006.01) |
| B25J 15/00 | (2006.01) |
| B65G 47/91 | (2006.01) |

(52) U.S. Cl.
CPC .......... *B65G 67/24* (2013.01); *B25J 15/0052* (2013.01); *B25J 15/0616* (2013.01); *B65G 47/918* (2013.01); *Y10S 901/40* (2013.01)

(58) Field of Classification Search
CPC ...................................................... B65G 7/24

USPC ........ 414/797, 7, 795.4, 795.5, 801, 416.02; 294/87.1, 86.4, 119.1, 185, 186, 189, 294/65; 901/31, 36, 39, 40
See application file for complete search history.

(56) References Cited

U.S. PATENT DOCUMENTS

| | | |
|---|---|---|
| 2,605,912 A | 8/1952 | Small et al. |
| 3,608,743 A | 9/1971 | Mosher et al. |
| 3,651,963 A | 3/1972 | McWilliams |
| 3,715,043 A | 2/1973 | Weir |
| 3,837,510 A | 9/1974 | McWilliams |
| 3,850,313 A | 11/1974 | Rackman et al. |
| 3,866,739 A | 2/1975 | Sikorski |

(Continued)

FOREIGN PATENT DOCUMENTS

| | | |
|---|---|---|
| CA | 908092 A | 8/1972 |
| CA | 2143816 | 9/1996 |

(Continued)

OTHER PUBLICATIONS

Prieele, "The best way to unload a container . . . ", http://www.youtube.com/watch?feature=player_detailpage&v=Mc-ICIycIgU, (Nov. 17, 2009).

(Continued)

*Primary Examiner* — Paul T Chin

(57) ABSTRACT

A robotic carton unloader for automatic unloading of cartons from a carton pile, such as a carton pile stacked within a trailer. In various embodiments, a robotic carton unloader may comprise a conveyor system, a robotic positioner, and a manipulator having a conformable face configured to conform to irregularities of the carton pile, and the manipulator may be movable attached to an end of the robotic positioner.

28 Claims, 37 Drawing Sheets

Related U.S. Application Data application No. 61/894,878, filed on Oct. 23, 2013, provisional application No. 61/894,889, filed on Oct. 23, 2013, provisional application No. 61/916,720, filed on Dec. 16, 2013, provisional application No. 61/971,463, filed on Mar. 27, 2014, provisional application No. 61/973,188, filed on Mar. 31, 2014, provisional application No. 62/023,068, filed on Jul. 10, 2014.

(56) References Cited

U.S. PATENT DOCUMENTS

| | | |
|---|---|---|
| 4,039,074 A | 8/1977 | Maxted |
| 4,044,897 A | 8/1977 | Maxted |
| 4,111,412 A | 9/1978 | Cathers |
| 4,181,947 A | 1/1980 | Krauss et al. |
| 4,229,136 A | 10/1980 | Panissidi |
| 4,242,025 A | 12/1980 | Thibault |
| 4,281,955 A | 8/1981 | McWilliams |
| 4,282,186 A | 8/1981 | Nonnenmann et al. |
| 4,536,980 A | 8/1985 | Fleming |
| 4,597,707 A | 7/1986 | Cornacchia |
| 4,635,908 A | 1/1987 | Ludwig |
| 4,687,428 A * | 8/1987 | Martin .................... B29C 31/00 118/317 |
| 4,692,876 A | 9/1987 | Tenma et al. |
| 4,705,447 A | 11/1987 | Smith |
| 4,721,005 A | 1/1988 | Yoshiji et al. |
| 4,743,159 A * | 5/1988 | Inamori ................. B62D 65/02 414/737 |
| 4,747,193 A | 5/1988 | Hashidate et al. |
| 4,792,995 A | 12/1988 | Harding |
| 4,802,377 A | 2/1989 | Keppler |
| 4,836,111 A | 6/1989 | Kaufmann |
| 4,904,150 A | 2/1990 | Svensson et al. |
| RE33,416 E | 10/1990 | Konishi et al. |
| 4,968,214 A | 11/1990 | Shiotani |
| 4,976,584 A | 12/1990 | Focke |
| 5,009,560 A | 4/1991 | Ruder et al. |
| 5,015,145 A | 5/1991 | Angell et al. |
| 5,067,867 A | 11/1991 | Ruder et al. |
| 5,108,255 A | 4/1992 | Cornacchia |
| 5,195,627 A | 3/1993 | Wyman |
| 5,201,626 A | 4/1993 | Hansen |
| 5,240,101 A | 8/1993 | LeMay et al. |
| 5,256,021 A | 10/1993 | Wolf et al. |
| 5,325,953 A | 7/1994 | Doster et al. |
| 5,330,311 A * | 7/1994 | Cawley .................... B65B 69/00 294/188 |
| 5,400,896 A | 3/1995 | Loomer |
| 5,411,362 A * | 5/1995 | Neri ...................... B65G 47/905 294/907 |
| 5,415,057 A | 5/1995 | Nihei et al. |
| 5,415,281 A | 5/1995 | Taylor et al. |
| 5,476,358 A | 12/1995 | Costa |
| 5,509,630 A | 4/1996 | Bringuier |
| 5,524,747 A | 6/1996 | Wohlfahrt et al. |
| 5,542,729 A * | 8/1996 | Ohtonen ............... B65B 25/148 294/65 |
| 5,549,191 A | 8/1996 | Itoh et al. |
| 5,560,733 A | 10/1996 | Dickinson |
| 5,605,432 A | 2/1997 | Fink et al. |
| 5,642,803 A | 7/1997 | Tanaka |
| 5,701,989 A | 12/1997 | Boone et al. |
| 5,716,184 A | 2/1998 | Lowe et al. |
| 5,718,325 A | 2/1998 | Doster et al. |
| 5,738,487 A | 4/1998 | Schaede et al. |
| 5,743,705 A | 4/1998 | Eissfeller |
| 5,769,204 A | 6/1998 | Okada et al. |
| 5,796,620 A | 8/1998 | Laskowski et al. |
| 5,799,806 A | 9/1998 | Cullity |
| 5,918,723 A | 7/1999 | Schuitema et al. |
| 5,921,740 A | 7/1999 | Stewart |
| 5,984,621 A | 11/1999 | Letson |
| 5,997,240 A | 12/1999 | Focke et al. |
| 6,006,893 A | 12/1999 | Gilmore et al. |
| 6,116,841 A | 9/2000 | Iwasaki |
| 6,234,737 B1 | 5/2001 | Young et al. |
| 6,238,175 B1 | 5/2001 | Gotz et al. |
| 6,269,933 B1 | 8/2001 | Schuitema et al. |
| 6,298,587 B1 | 10/2001 | Vollom |
| 6,408,225 B1 | 6/2002 | Ortmeier et al. |
| 6,412,621 B1 | 7/2002 | De Vree et al. |
| 6,484,862 B1 | 11/2002 | Gilmore et al. |
| 6,502,877 B2 | 1/2003 | Schick et al. |
| 6,545,440 B2 | 4/2003 | Slater et al. |
| 6,629,018 B2 | 9/2003 | Mondie et al. |
| 6,629,594 B2 | 10/2003 | Nagel et al. |
| 6,634,686 B2 | 10/2003 | Hosokawa |
| 6,659,264 B2 | 12/2003 | Pelka |
| 6,823,985 B2 | 11/2004 | Gilmore et al. |
| 6,923,085 B2 | 8/2005 | Nakano |
| 7,090,067 B2 | 8/2006 | Schiesser et al. |
| 7,108,125 B2 | 9/2006 | Gilmore et al. |
| 7,168,910 B2 | 1/2007 | Keller |
| 7,387,485 B2 | 6/2008 | Dickey et al. |
| 7,641,247 B2 | 1/2010 | Blonigan et al. |
| 7,648,329 B2 | 1/2010 | Chilson et al. |
| 7,967,543 B2 | 6/2011 | Criswell et al. |
| 7,980,808 B2 | 7/2011 | Chilson et al. |
| 7,994,793 B2 | 8/2011 | Matsumoto et al. |
| 8,075,243 B2 | 12/2011 | Chilson et al. |
| 8,162,362 B2 | 4/2012 | Braunschweiger et al. |
| 8,192,137 B2 | 6/2012 | Ross et al. |
| 8,210,791 B2 | 7/2012 | Chilson et al. |
| 8,295,980 B2 | 10/2012 | Williamson |
| 8,522,540 B2 | 9/2013 | Runesson et al. |
| 8,562,277 B2 | 10/2013 | Criswell |
| 2001/0014268 A1 | 8/2001 | Bryson, III et al. |
| 2003/0209407 A1 | 11/2003 | Brouwer et al. |
| 2004/0013506 A1 | 1/2004 | Guhr et al. |
| 2006/0133913 A1 | 6/2006 | Helmner |
| 2006/0182607 A1* | 8/2006 | Clark .................... B25J 15/0616 414/744.5 |
| 2006/0185963 A1 | 8/2006 | Wijngaarden et al. |
| 2006/0260911 A1 | 11/2006 | Eckert et al. |
| 2006/0272324 A1 | 12/2006 | Hedman |
| 2006/0280587 A1 | 12/2006 | Guerra et al. |
| 2007/0020069 A1 | 1/2007 | Hutton |
| 2007/0246328 A1 | 10/2007 | Reznik |
| 2008/0267756 A1 | 10/2008 | Echelmeyer et al. |
| 2009/0110522 A1 | 4/2009 | Criswell |
| 2010/0074720 A1 | 3/2010 | Taylor |
| 2010/0104403 A1 | 4/2010 | Cho et al. |
| 2010/0178137 A1 | 7/2010 | Chintalapati et al. |
| 2010/0178139 A1 | 7/2010 | Sundar et al. |
| 2010/0266381 A1 | 10/2010 | Chilson et al. |
| 2011/0072930 A1 | 3/2011 | Bayer et al. |
| 2011/0114444 A1 | 5/2011 | Butler et al. |
| 2012/0076629 A1 | 3/2012 | Goff et al. |
| 2012/0207572 A1 | 8/2012 | Enenkel |
| 2012/0207577 A1 | 8/2012 | Stollery et al. |
| 2012/0253507 A1 | 10/2012 | Eldershaw et al. |
| 2013/0017053 A1* | 1/2013 | Forget .................. B65G 59/005 414/796.9 |
| 2014/0050557 A1 | 2/2014 | Criswell |
| 2014/0205403 A1 | 7/2014 | Criswell |

FOREIGN PATENT DOCUMENTS

| | | |
|---|---|---|
| CH | 648806 A5 | 4/1985 |
| DE | 10324755 A1 | 9/2004 |
| DE | 102010033115 A1 | 2/2012 |
| EP | 1332683 A2 | 8/2003 |
| EP | 2626181 A2 | 8/2013 |
| GB | 2109337 A | 6/1983 |
| GB | 2327929 A | 2/1999 |
| JP | 5756689 U | 4/1982 |
| JP | 05105235 | 4/1993 |
| JP | 06262561 | 9/1994 |
| JP | 09301538 | 11/1997 |
| NL | 1011978 C2 | 11/2000 |
| WO | 9316582 A1 | 9/1993 |
| WO | 2008091733 A2 | 7/2008 |

(56) References Cited

FOREIGN PATENT DOCUMENTS

| WO | 2008094164 A1 | 8/2008 |
| WO | 2009051723 A1 | 4/2009 |
| WO | 2010114754 A1 | 10/2010 |

OTHER PUBLICATIONS

RTL Robotic Mixed Case Simulation, "http://robotics.wynright.com/videos.php" (Dec. 12, 2012).

RTL Robotic Truck Loading, "http://robotics.wynright.com/videos.php" (Dec. 12, 2012).

RTL Robotic Tire Loading, "http://robotics.wynright.com/videos.php" (Dec. 12, 2012).

RTU Robotic Truck Unloading, "http://robotics.wynright.com/videos.php" (Dec. 12, 2012).

RTU Robotic Truck Unloading 2, "http://robotics.wynright.com/videos.php" (Mar. 22, 2013).

RTU Mixed Case, "http://robotics.wynright.com/videos.php" (Feb. 11, 2013).

RTU Window View, "http://robotics.wynright.com/videos.php" (Feb. 11, 2013).

RTU Window View 2, "http://robotics.wynright.com/videos.php" (Feb. 11, 2013).

U.S. Patent Application No. 61/754,630 filed Jan. 20, 2013 titled "Automated Truck Unloader for Unloading/ Unpacking Product from Trailers and Containers".

International Preliminary Report on Patentability received in connection with International Application No. PCT/US2014/048679 mailed Aug. 5, 2015.

International Search Report and Written Opinion received in connection with international application No. PCT/US2014/053252; mailed Dec. 10, 2014.

International Search Report and Written Opinion received in connection with international application No. PCT/US2014/053247; mailed Dec. 11, 2014.

International Search Report and Written Opinion received in connection with international application No. PCT/US2014/048679; mailed Nov. 20, 2014.

\* cited by examiner

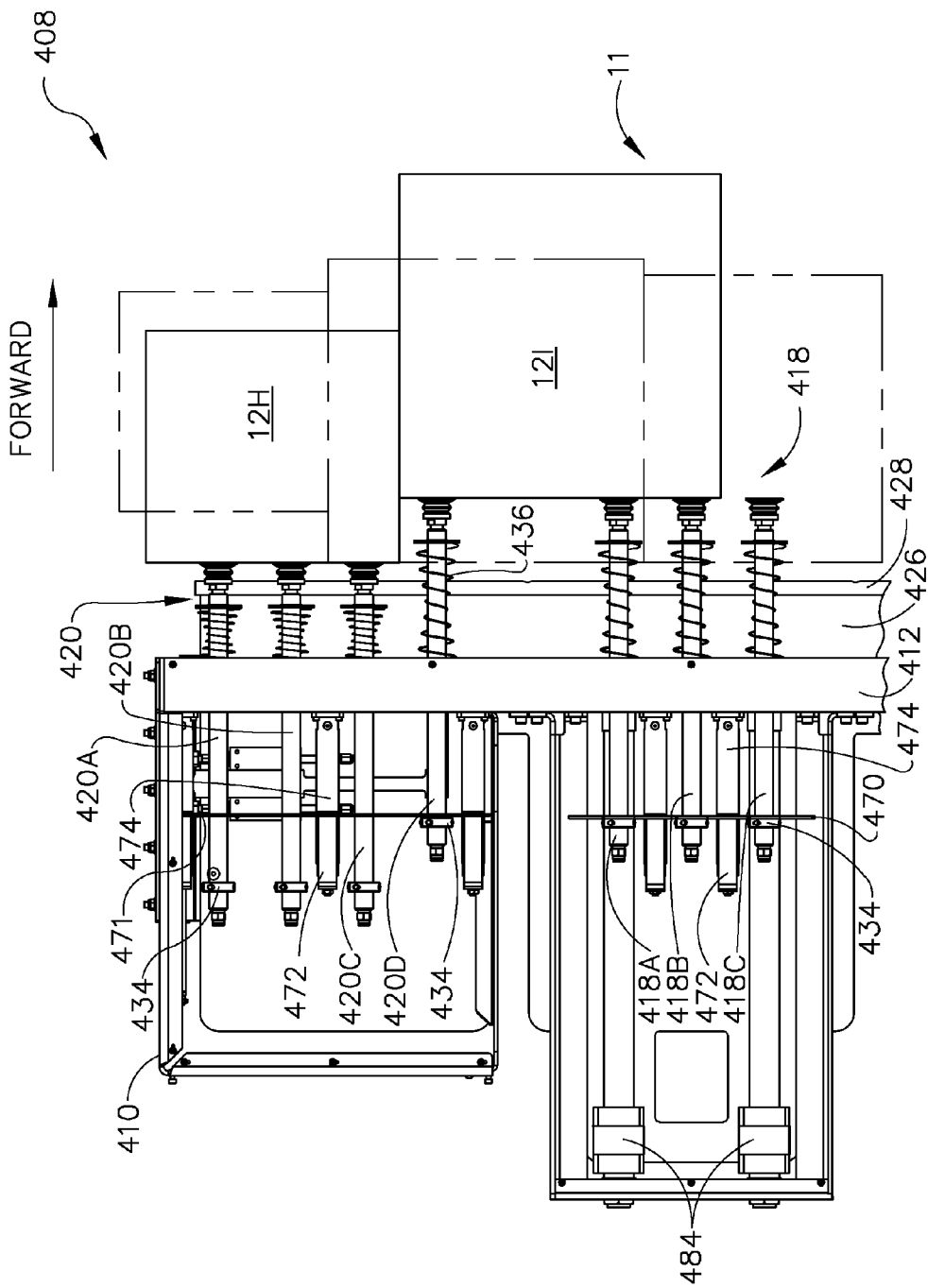

ROBOTIC CARTON UNLOADER

CROSS REFERENCE TO RELATED APPLICATIONS

This application claims priority to U.S. Provisional Patent Application Ser. No. 61/860,209, filed Jul. 30, 2013, entitled "Robotic Carton Unloader", U.S. Provisional Patent Application Ser. No. 61/871,292, filed Aug. 28, 2013, entitled "Robotic Carton Unloader", U.S. Provisional Patent Application Ser. No. 61/894,871, filed Oct. 23, 2013, entitled "Robotic Carton Unloader", U.S. Provisional Patent Application Ser. No. 61/894,878, filed Oct. 23, 2013, entitled "Robotic Carton Unloader", U.S. Provisional Patent Application Ser. No. 61/894,889, filed Oct. 23, 2013, entitled "Robotic Carton Unloader", U.S. Provisional Patent Application Ser. No. 61/916,720, filed Dec. 16, 2013, entitled "Robotic Carton Unloader", U.S. Provisional Patent Application Ser. No. 61/971,463, filed Mar. 27, 2014, entitled "Robotic Carton Unloader", U.S. Provisional Patent Application Ser. No. 61/973,188, filed Mar. 31, 2014, entitled "Robotic Carton Unloader", and U.S. Provisional Patent Application Ser. No. 62/023,068, filed Jul. 10, 2014, entitled "Robotic Carton Unloader." The entire contents of all nine applications are incorporated by reference herein.

TECHNICAL FIELD

The present disclosure relates generally to an apparatus for handling products, and is more particularly directed to an automatic case unloader designed to unload product, such as cardboard cases of various sizes, from within a trailer.

BACKGROUND

Trucks and trailers loaded with cargo and products move across the country to deliver products to commercial loading and unloading docks at stores, warehouses, and distribution centers. Trucks can have a trailer mounted on the truck, or can be of a tractor-semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock.

Trucks are typically unloaded with forklifts if the loads are palletized and with manual labor if the products are stacked within the trucks. Unloading large truck shipments manually with human laborers can be physically difficult, and can be costly due to the time and labor involved. Consequently, a need exists for an improved unloading system that can unload bulk quantities of stacked cases and cargo from truck trailers more quickly than human laborers and at a reduced cost.

SUMMARY

Various embodiments include a robotic carton unloader for automatic unloading of cartons from a carton pile, such as a carton pile stacked within a trailer. In various embodiments, a robotic carton unloader may comprise a conveyor system, a robotic positioner, and a manipulator having a conformable face configured to conform to irregularities of the carton pile, and the manipulator may be movable attached to an end of the robotic positioner. In a further embodiment, the conformable face of the manipulator may be configured to passively conform to the irregularities of the carton pile by contact therewith. In a further embodiment, the conformable face of the manipulator may be configured to attach to contacted cartons of the carton pile to unload the contacted cartons. In an embodiment, the conformable face may be configured to apply a vacuum to attach to the contacted cartons. In an embodiment, the conformable face may comprise a plurality of carton connectors, wherein each of the carton connectors is configured to be biased toward the carton pile and to individually conform to the irregularities of the carton pile by contact therewith. In an embodiment, each of the plurality of carton connectors may be biased toward the carton pile by a spring. In an embodiment, the conformable face may comprise more than one bank of pluralities of carton connectors and each bank of a plurality of carton connectors may be configured to move independent of the other banks of pluralities of carton connectors towards the carton pile to conform to the irregularities of the carton pile by contact therewith and to move independent of the other banks of pluralities of carton connectors away from the carton pile to unload the contacted cartons. In an embodiment, each bank of pluralities of carton connectors may comprise at least one fluid activated cylinder to move that bank of pluralities of carton connectors towards and away from the carton pile. In various embodiments, the manipulator may further comprise a moveable shelf movable towards and away from the carton pile and the movable shelf may be configured to support cartons drawn from the carton pile. In a further embodiment, the movable shelf may slide towards and away from the carton pile. In an additional embodiment, the movable shelf may include a bumper to stabilize the carton pile as cartons are unloaded. In a further embodiment, the moveable shelf may pivot in whole or in part. In various additional embodiments, the various embodiment robotic carton unloaders may further comprise a control and visualization system connected to the embodiment conveyor systems, the embodiment robotic positioners, and the embodiment manipulators, and the control and visualization system may be configured to automatically control the conveyor systems, the robotic positioners, and the manipulators of the various embodiments to unload the carton pile. In an embodiment, the control and visualization system may be configured to control the robotic positioner to rotate the manipulator perpendicular to a floor of a truck or trailer to lift a carton from the floor. In various additional embodiments, the various embodiment manipulators may further comprise at least one carton connector configured to extend out from a side of the manipulator perpendicular to the conformable face. In an embodiment, the at least one carton connector may be configured to attach to contacted cartons on the side of the manipulator to unload the contacted cartons. In an embodiment, the at least one carton connector may be configured to apply vacuum to attach to the contacted cartons.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain the features of the present invention.

FIG. 26A is a partial top view of the left side of the vacuum manipulator of FIG. 14 in contact with a carton pile at a first time during carton removal operations.

DETAILED DESCRIPTION

Figure 1:
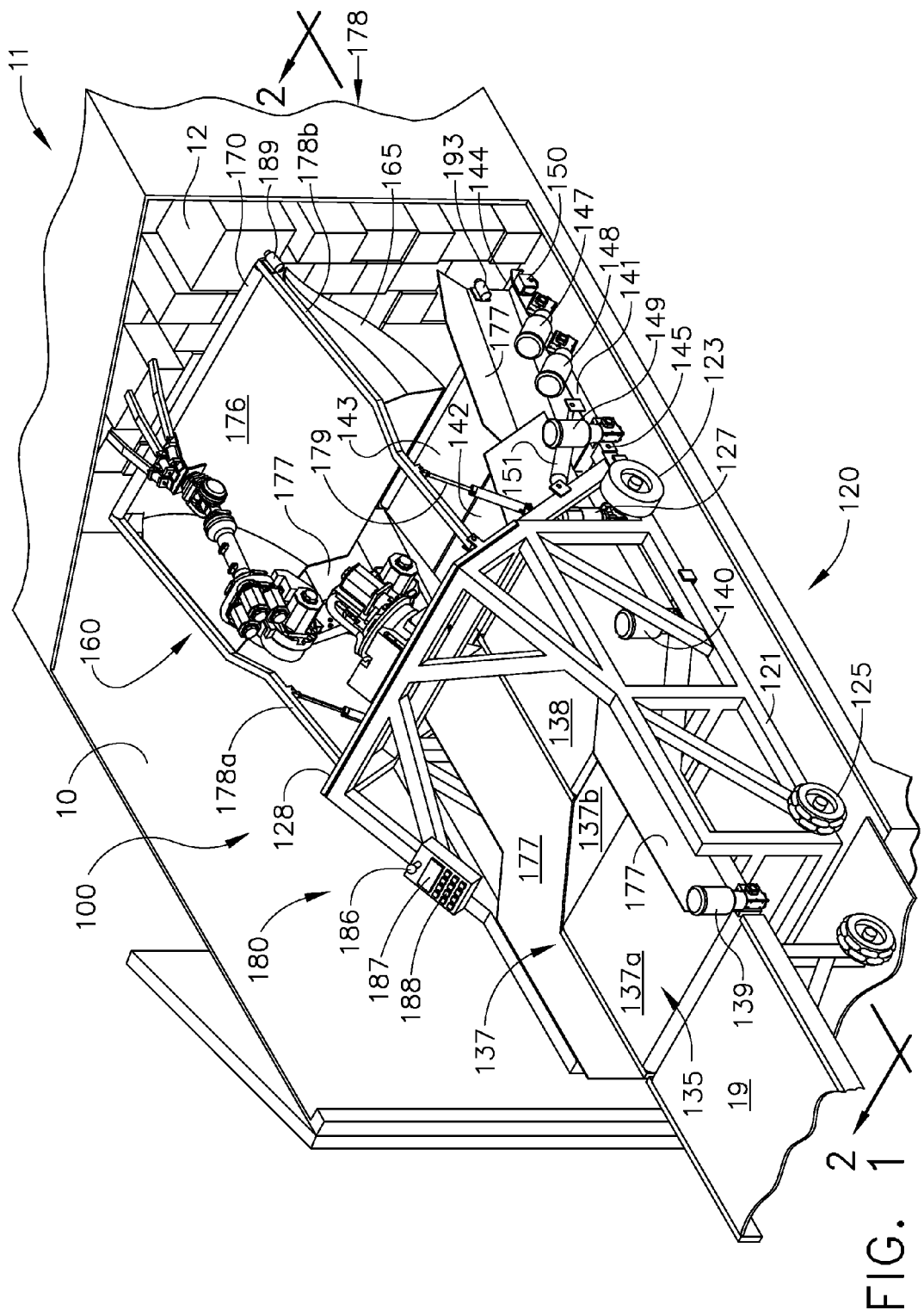
FIG. 1 is an isometric view of an embodiment of a robotic carton unloader maneuvering within a truck to unload product, such as cartons depicted as a pile of cartons, stacked within the truck.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. References made to particular examples and implementations are for illustrative purposes and are not intended to limit the scope of the invention or the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference.

The word "exemplary" is used herein to mean "serving as an example, instance, or illustration." Any implementation described herein as "exemplary" is not necessarily to be construed as preferred or advantageous over other implementations.

The present application is related to International Patent Application Serial No. PCT/US2014/038513 filed May 16, 2014, entitled "Robotic Carton Unloader" the entire contents of which are incorporated by reference herein.

FIGS. 1-6 generally show an embodiment of a robotic carton unloader 100 for unloading cartons 12 from within a truck or semi-trailer 10. For instance, robotic carton unloader 100 may be configured to be driven into semi-trailer 10, dislodge or remove cartons 12 from carton wall or carton pile 11 stacked on floor 18 of semi-trailer 10, and transfer or unload the dislodged cartons 12 from semi-trailer 10. Cartons 12 may then be transferred into a store, warehouse or distribution center unloading bay. Cartons 12 may be any kind of product container for conveying products such as, but not limited to, cardboard cartons. Robotic carton unloader 100 may include a mobile body 120 sized and configured to be driven in and out of semi-trailer 10. Robotically controlled carton remover system 160 may be positioned on mobile body 120 and may extend from mobile body 120 toward carton pile 11 to dislodge and unload cartons 12 from carton pile 11. For instance, robotically controlled carton remover system 160 may dislodge and unload cartons 12 from a front and a top of carton pile 11. Carton guide system 175 may be located adjacent to (e.g., below) carton remover system 160 to catch cartons 12 as they are dislodged from pile 11. Carton guide system 175 may also guide cartons 12 onto and along conveyor system 135 that may extend from one end of robotic carton unloader 100 to the other end of robotic carton unloader 100. Conveyor system 135 may discharge unloaded cartons 12 at the end portion of robotic carton unloader 100 for collection (e.g., by laborers) or to a distribution center conveyor 19. Control and visualization system 180 may be provided to control and automate the unloading process, and to operate robotic carton unloader 100. Each of these components will be discussed in further detail below.

Mobile Body

Figure 2:
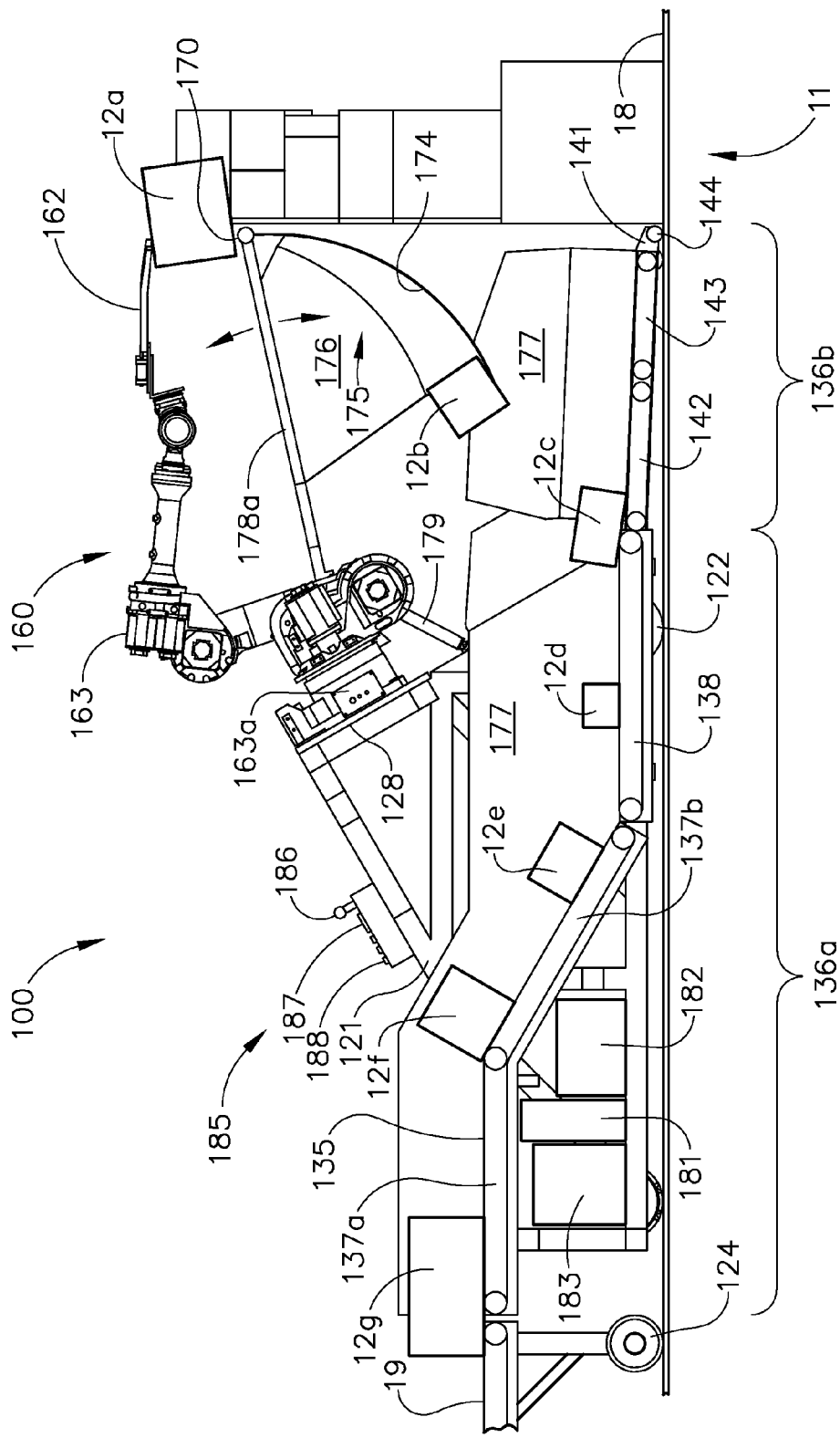
FIG. 2 is a side sectional view of the robotic carton unloader of FIG. 1 taken along line 2-2 of FIG. 1, showing a carton being unloaded from the pile of cartons and discharged onto an unloading dock conveyor.

As shown in FIGS. 1 and 2, mobile body 120 of robotic carton unloader 100 comprises chassis 121 movably supported on a four wheel configuration with each wheel 122, 123, 124, 125 adjacent to a corner of chassis 121. As an example, the chassis 121 may be a generally rectangular chassis with each wheel 122, 123, 124, and 125 adjacent to a corner or the rectangle. Angled plate 128 may be elevated above a central portion of conveyor system 135 and may extend across chassis 121 (e.g., transversely across chassis 121) for the attachment of robotically controlled carton remover system 160 thereto. A first drive motor and a second drive motor 127 (e.g., a drive system) may be generally located inboard from sides (e.g., the left side and the right side) of robotic carton unloader 100. The first drive motor may be configured to drive wheel 122, while second drive motor 127 may be configured to drive wheel 123. Other wheels, such as wheels 124, 125, may be configured to freewheel. Accordingly, drive motors, such as the first drive motor and the second drive motor 127, may drive and steer robotic carton unloader 100 within semi-trailer 10. As examples, rotating the first drive motor and the second drive motor 127 in the same direction may drive robotic carton unloader 100 forward or backward, rotating the first drive motor and the second drive motor 127 in opposite directions may pivot robotic carton unloader 100 about a point centered between drive wheels 122, 123, and rotating one of the first drive motor or the second drive motor 127 may pivot robotic carton unloader 100 about the opposite undriven drive wheel 122 or 123.

Conveyor System

As best seen in FIG. 2, conveyor system 135 includes a plurality of independently controlled conveyors to transport cartons 12. For example, the independently controlled conveyors may define an elongated "Z" shape conveyor system. In an embodiment, conveyor system 135 may be wider at the front (e.g., at the end of the conveyor closest to the carton pile 11) to receive cartons 12, and may narrow moving toward the rear (e.g., at the end of the conveyor farthest from the carton pile 11) along conveyor system 135. The narrowing of conveyor system 135 may position the unloaded cartons 12 in a line for discharge. Conveyor system 135 may comprise a rear portion 136a fixed relative to chassis 121, and a front portion 136b pivotally mounted to, and extending from, chassis 121. Rear portion 136a of conveyor system 135 may comprise a rear conveyor 137 and central conveyor 138. Rear conveyor 137 may comprise a portion 137a (e.g., a horizontal portion) that may be aligned with distribution center conveyor 19 for unloading cartons 12. Rear conveyor 137 may further comprise a portion 137b that is inclined to couple portion 137a with central conveyor 138. Central conveyor 138 may be positioned proximal (e.g., horizontal) to trailer floor 18 and may extend through chassis 121 from rear conveyor 137 to front portion 136b of conveyor system 135. Motor 139 may be coupled with rear conveyor 137 to drive rear conveyor 137, and motor 140 may be coupled to central conveyor 138 to drive central conveyor 138. As will be apparent to one with ordinary skill in the art in view of the teachings herein, any suitable number of motors 139, 140 may be used to drive conveyors 137, 138.

Conveyor arms 141 may pivotally extend (e.g., in a front direction toward the carton pile 11) from chassis 121 to support front portion 136b of conveyor system 135. Conveyor arms 141 may be rotatable about pivot 145. Front portion 136b of conveyor system 135 may comprise trailing conveyor 142 and leading conveyor 143. Conveyors 142, 143 may be positioned end-to-end between conveyor arms 141 to transport cartons 12 along conveyors 142, 143. Roller 144 may be positioned adjacent the distal end of leading conveyor 143 and may be configured to load cartons 12 onto leading conveyor 143. Roller 144 may be generally cylindrical and may extend transversely across an end of conveyor arms 141. Roller 144 may be powered by roller drive motor 147 coupled with conveyor arms 141. Leading motor 148 and trailing motor 149 are coupled with conveyor arms 141 to drive leading conveyor 143 and trailing conveyor 142 respectively.

Figure 3:
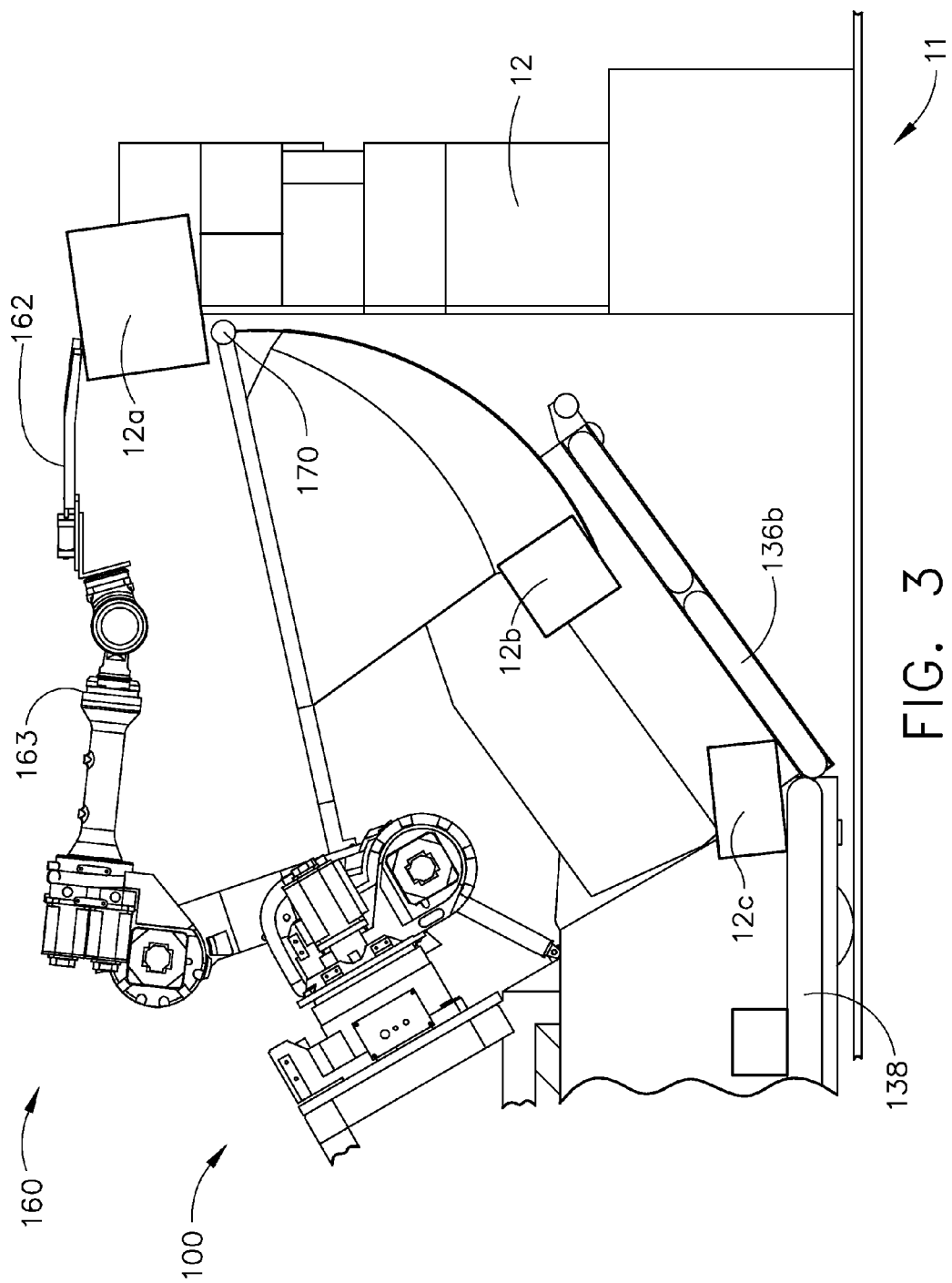
FIG. 3 is a partial side sectional view of the robotic carton unloader of FIG. 2, showing a portion of a conveyor system pivoted upwards.

Conveyor wheel 150 may be coupled with conveyor arms 141 to support front portion 136b on trailer floor 18. Lift 151 may operably connect between chassis 121 and conveyor arms 141 to lift the front portion 136b of conveyor system 135 off of the trailer floor 18 to any angular position relative thereto, such as but not limited to the angular position shown in FIG. 3. During operation, front portion 136b may be angled upwardly or downwardly relative to central conveyor 138. For instance, the angular position of front portion 136b may be adjusted to meet the changing height of carton pile 11. The front portion 136b may be angled to remain below the carton guide system 175. When carton pile 11 is at a maximum, the angular position is at a maximum, and when carton pile 11 is at a minimum, the angular position is at a minimum. As shown in FIG. 3, pivoting upstream portion 136b to an angular position may shorten the fall distance of carton 12 as it exits carton guide system 175 to fall or drop onto conveyor system 135. Lift 151 may be an electrical actuator such as a motor, but is not limited thereto.

Robotically Controlled Carton Remover System

Turning to FIGS. 1-4, robotically controlled carton remover system 160 may be configured to reach out (e.g., extend) from robotic carton unloader 100 to dislodge one or more cartons 12 (e.g., a plurality of cartons 12) from carton pile 11 with manipulator 162. As best seen in FIG. 3, manipulator 162 may be movably attached to a free end of robotic, positioner 163. Base 163a of robotic positioner 163 is disposed adjacent angled plate 128 overlying central conveyor 138 of conveyor system 135. Robotic positioner 163 and manipulator 162 may be controlled by control and visualization system 180, and may be configured to dislodge or unload cartons 12 from anywhere on carton pile 11. The operating areas of robotic positioner 163 and manipulator 162 may extend from side-to-side and from floor-to-top of semi-trailer 10. Robotic positioner 163 may be any available robotic arm with at least four degrees of motion, such as the exemplary FANUC™ Robot R-1000ia sold by FANUC™ Robotics America Corporation, 3900 West Hamlin Road, Rochester Hills Mich. 48309-3253.

Figure 4:
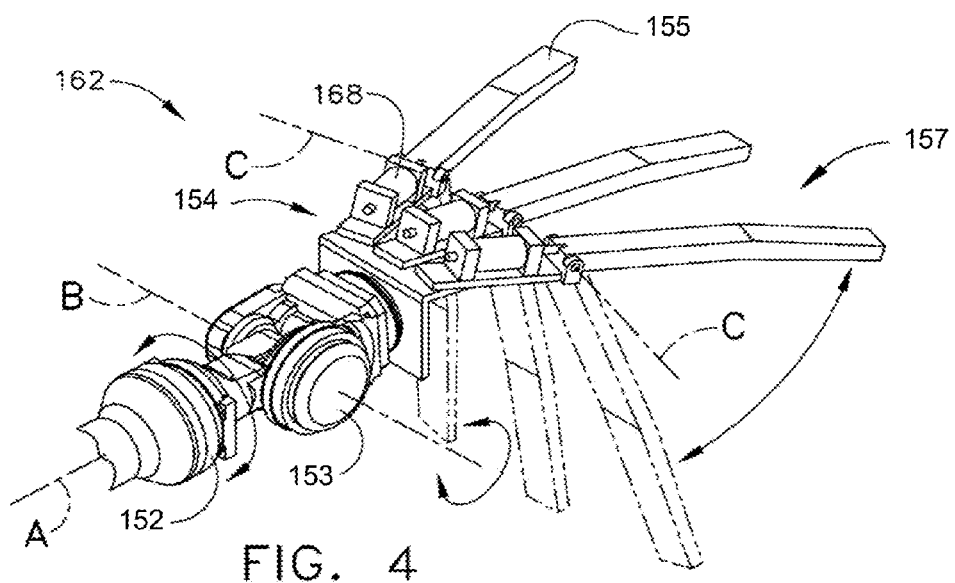
FIG. 4 is an isometric view of a manipulator of the robotic carton unloader of FIG. 1, showing movements of portions of the manipulator.
Figure 5:
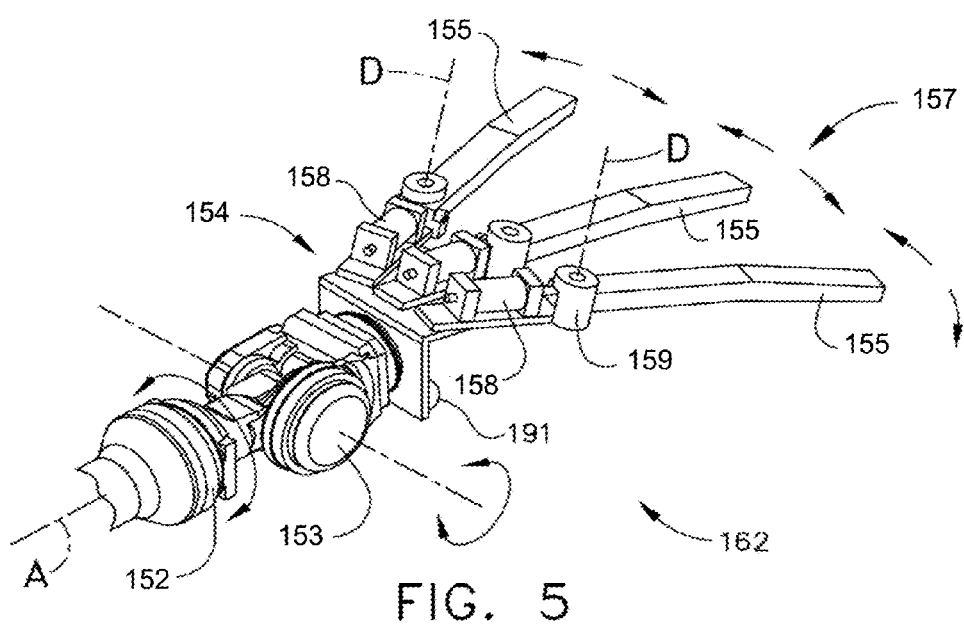
FIG. 5 is an isometric view of the manipulator of FIG. 4, showing a spreading movement of the manipulator.
Figure 6:
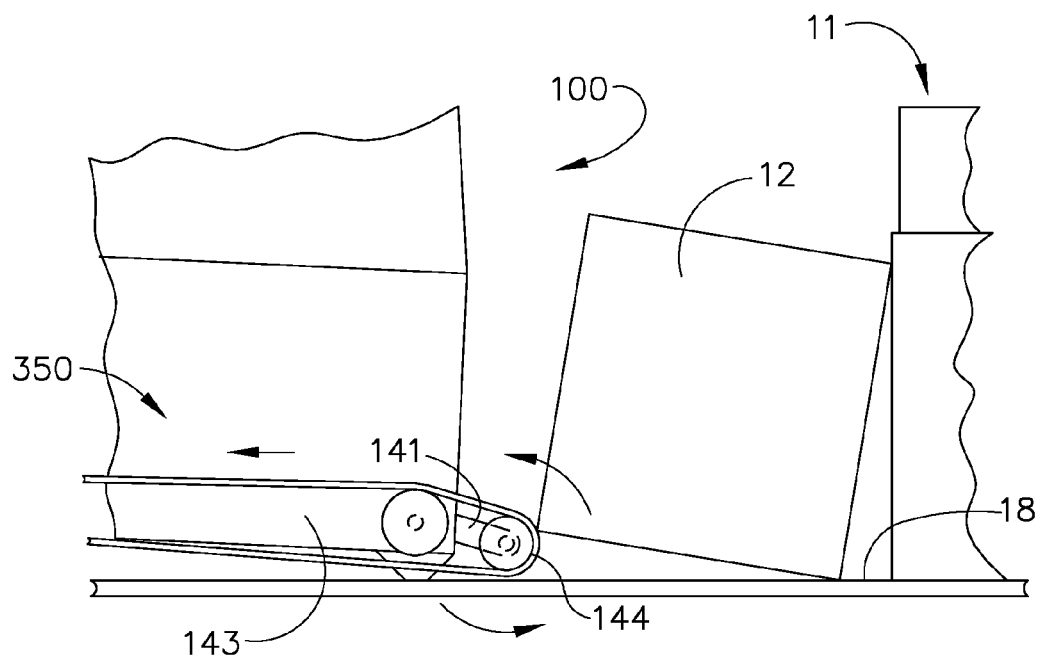
FIG. 6 is a partial side sectional view of the robotic carton unloader of FIG. 2, showing a rotating front roller lifting a carton from a floor of the truck.

As shown in FIG. 4, manipulator 162 may be rotatable about a wrist rotation joint 152 to rotate manipulator 162 about longitudinal axis A. Manipulator 162 may be further pivotable about wrist pivot joint 153 to pivot manipulator 162 about axis B oriented transverse to axis A. Manipulator 162 includes base 154 with at least one actuatable element, such as a claw 157 or finger 155, extending therefrom. As shown in this embodiment, base 154 may have two or more actuatable elements, such as three fingers 155, pivotally mounted to base 154 at their respective proximal ends. First actuator 158 may be connected to each actuatable element, such as each of fingers 155, to pivot fingers 155 downwardly relative to hand 156 about respective axes C, which is spaced from axis B as shown in FIG. 4. Second actuator 159 may be attached to hand 156 and to each of fingers 155 for spreading fingers 155 apart about axis D which is oriented transverse to axis C as shown in FIG. 5. First and second actuators 158, 159 may be, but are not limited to, electric or fluidic actuators. Fluidic actuators of the embodiments may operate with compressible fluids or with incompressible fluids.

Carton Guide System

Carton guide system 175 may be configured to guide unloaded or dislodged cartons 12 through robotic carton unloader 100, as shown in FIGS. 1 and 2. Carton guide system 175 may comprise a shelf 176, for example a carton deceleration skirt, located between carton remover system 160 and conveyor system 135. Shelf 176 comprises may comprise a surface 174. For example, the surface 174 may be a non-vertical surface, such as a curved surface. The surface 174 may be configured to catch falling cartons 12 and guide the sliding dislodged cartons 12 onto conveyor system 135. Shelf 176 may be constructed from materials having a coefficient of friction configured to decelerate cartons 12 sliding thereon without stopping the sliding motion of cartons 12. Shelf 176 may be formed from various materials. As examples, shelf 176 may be formed from bendable or deflectable materials such as a fabric, a flexible plastic sheet, a pleated collapsible structure, etc. Carton guide system 175 may further comprise a pair of conveyor guides 177 positioned on each side of conveyor system 135. Conveyor guides 177 extend from conveyor arms 141 of front portion 136b of conveyor system 135 and may narrow toward at the rear portion 136a to guide cartons 12 onto conveyor system 135.

A frame 178 of carton guide system 175 may be pivotally attached to angled plate 128 of mobile body 120 (e.g., at a front side of angled plate 128 oriented toward the carton pile 11) such that carton guide system 175 extends outwardly from mobile body 120. In an embodiment, frame 178 may be generally U-shaped and may comprise a pair of frame arms 178a and 178b extending outwardly and spreading wider therefrom. Frame arms 178a and 178b may terminate at a cross member such as bumper 170 extending rigidly between frame arms 178a and 178b (e.g., from side to side at a front end closest to the carton pile 11). Bumper 170 may include outer cover 170a over a rigid core and may rotate. In one embodiment, at least a portion of bumper 170 may be a deflectable material such as an elastomer or a foam. Curved arrows are provided in FIG. 2 to show the directions of the pivotal motion of frame arms 178a, 178b relative to mobile body 120.

The previously described shelf 176 may be suspended from frame 178. Frame lift 179 may connect between the frame 178 and the angled plate 128 (see FIG. 1) to raise and lower frame 178, bumper 170, and shelf 176 (see arrows FIG. 2). Frame lift 179 can be an electrical actuator such as a motor but is not limited thereto. As will be described in greater detail later, frame lift 179 may place bumper 170 against the wall of carton pile 11 below cartons 12 being removed to stabilize the wall of carton pile 11 below the cartons 12 being removed. The deflection properties of shelf 176 may provide robotically controlled carton remover system 160 access to cartons 12 resting on trailer floor 18 when shelf 176 is lowered into contact with at least part of conveyor system 135 and collapses or reduces in height from the contact.

Control and Visualization System

Control and visualization system 180 may coordinate and control all of the functions of the systems of the robotic carton unloader 100. Control and visualization system 180 may be configured to operate robotic carton unloader 100 to automate at least a portion of the unloading process. Control and visualization system 180 may include control module 181, power supply 182, and robotics controller 183, positioned within chassis 121. Control and visualization system 180 provides timing, sequencing, homing routines, and motion control for drive motors 126, 127, conveyor drive motors 139, 140, 148, 149, roller drive motor 147, front lift 151, frame lift 179, robotic positioner 163 and manipulator 162.

Operator interface 185 may be coupled with chassis 121 and extends inwardly above a portion of conveyor system 135. Operator interface 185 may include joystick 186, display 187, and keypad 188. Joystick 186 may be a multi-purpose control and can be configured to control movement of robotic positioner 163 and manipulator 162. Joystick 186 may be reconfigured (via selections on keypad 188) to steer, drive, and stop robotic carton unloader 100. Display 187 may display a wide variety of information that includes but is not limited to error messages, calibration information, status indicators, systems fault warnings, and can display lines of software code entered or edited on keypad 188. Keypad 188 may be used to enter software code for motion control of the robotic arm, conveyor system 135, drive motors 126, 127, lifts 151, 179, and conveyor drive motors 139, 140, 148, and 149.

Control and visualization system 180 may include visualization sensors such as a wall proximity sensor 193 for preventing robotic carton unloader 100 from colliding with the wall of carton pile 11. Wall proximity sensor 193 may be an electrical sensor attached to at least one of conveyor guides 177, such as at a front of the robotic carton unloader 100, for measuring proximity between the at least one proximity sensor 193 and carton pile 11. When wall proximity sensor 193 senses that robotic carton unloader 100 is at a desired distance from carton pile 11, control and visualization system 180 may stop robotic carton unloader 100.

Upper carton sensor 189 may be mounted on frame 178 to indicate contact of frame 178 with carton pile 11. Upper carton sensor 189 may be a contact switch adjacent to bumper 170 that trips when bumper 170 contacts the face of carton pile 11. Or, in another embodiment, upper carton sensor 189 may be a distance sensor that detects a distance to the face of carton pile 11. An angle position indicator may connect between angled plate 128 and frame 178 to indicate an angle between angled plate 128 and frame 178. When bumper 170 is contacting carton pile 11, the angle position indicator may provide control and visualization system 180 with angular positional data that can be used to compute the location of the wall of carton piles 11 relative to robotic carton unloader 100 and manipulator 162 of robotically controlled carton remover system 160. As an example, the angle position indicator may be a potentiometer.

Carton sensor 191 may be attached to base 154 of manipulator 162 (FIG. 5) so that the carton extraction or unloading area adjacent to manipulator 162 may be viewed or scanned. For instance, carton sensor 191 may measure the distance to a selected carton 12 so that manipulator 162 may be appropriately positioned to extract or unload the selected carton 12. In an alternate embodiment, carton sensor 191 may be a carton edge detector. A visualization sensor may be attached to angled plate 128 of chassis 121 for viewing the inside of semi-trailer 10, robotically controlled carton remover system 160 and cartons 12 within carton pile 11.

Operation

During operation, an operator may start robotic carton unloader 100 to initiate a startup and homing sequence to verify operation of the various systems and to move systems components to a home position. For example, control and visualization system 180 may undergo test routines to calibrate and home robotically controlled carton remover system 160, to pivot and position frame 178 behind a leading edge of robotic carton unloader 100, and to test activate conveyors of conveyor system 135. After the startup tests and homing routines are completed, the operator manually may select a drive selection on operator interface 185, and uses joystick 186 to steer and drive robotic carton unloader 100 into semi-trailer 10. Robotic carton unloader 100 may be advanced into semi-trailer 10 until the at least one proximity sensor 193 signals to the operator, via control and visualization system 180, that robotic carton unloader 100 is positioned adjacent to carton pile 11.

Upper carton sensor 189 may be used to identify a height and a front of carton pile 11, and control and visualization system 180 can use this information to position manipulator 162 adjacent to the identified position of carton pile 11. Carton sensor 191 on manipulator 162 may rescan carton pile 11 to refine the carton location data to ensure accurate selection and unloading of cartons 12.

FIG. 2 shows robotic carton unloader 100 unloading cartons 12 from semi-trailer 10 and the arrows are provided to show the paths of a plurality of cartons 12a-12h as they are unloaded from carton pile 11 and through robotic carton unloader 100. In FIG. 2, control and visualization system 180 selected carton 12a for unloading from carton pile 11 (e.g., the top of the carton pile 11), and robotically controlled carton remover system 160 is raking or dislodging carton 12a from carton pile 11.

Carton 12a may be tipped and drawn back by manipulator 162 towards shelf 176. Note that bumper 170 of carton guide system 175 may be pressed (e.g., deliberately) against carton pile 11 directly below carton 12a to stabilize carton pile 11 therebelow. Once the top row of cartons 12 is removed from carton pile 11, control and visualization system 180 can actuate frame lift 179 and possibly drive motors 126, 127 to reposition bumper 170 and carton guide system 175 against carton pile 11 below the new topmost row of cartons 12 slated for removal.

Turning back to FIG. 2, carton 12b is sliding down and off curved shelf 176 just prior to falling or dropping onto the moving conveyor system 135. Carton 12c is transiting from trailing conveyor 142 onto central conveyor 138 to join carton 12d traveling rearward thereon. Cartons 12e and 12f are moving upwards and rearwards along portion 137b of rear conveyor 137. Unloaded carton 12g is shown discharging from portion 137a of rear conveyor 137, and onto distribution center conveyor 19 for delivery into the distribution center. As the height of carton pile 11 is reduced, frame lift 179 may lower carton guide system 175 downward.

In an embodiment, when shelf 176 may be lowered into contact with conveyor system 135, shelf 176 may be operatively configured to deflect or collapse against conveyor system 135. This deflection or collapse may reduce the height of shelf 176, which may enable robotically controlled carton remover system 160 to reach over the collapsed shelf 176 to reach lower cartons 12. Once a dislodged lower carton 12 may be drawn onto the collapsed shelf 176, robotically controlled carton remover system 160 and shelf 176 may be raised to dump carton 12 onto conveyor system 135.

As described previously and best shown in FIG. 6, roller 144 may be located adjacent to conveyor system 135 and may be rotated by roller drive motor 147. As shown, roller 144 is cylindrical with a length and a circular cross section. Roller 144 is rotated in a direction that lifts any carton 12 upwardly when contacted by roller 144. Once lifted, the rotating roller 144 can draw carton 12 downstream onto roller 144 and onto moving conveyor system 135 for extraction. These processes may repeat as required until all of the cartons 12 are unloaded from semi-trailer 10.

Alternate Embodiments

Figure 7:
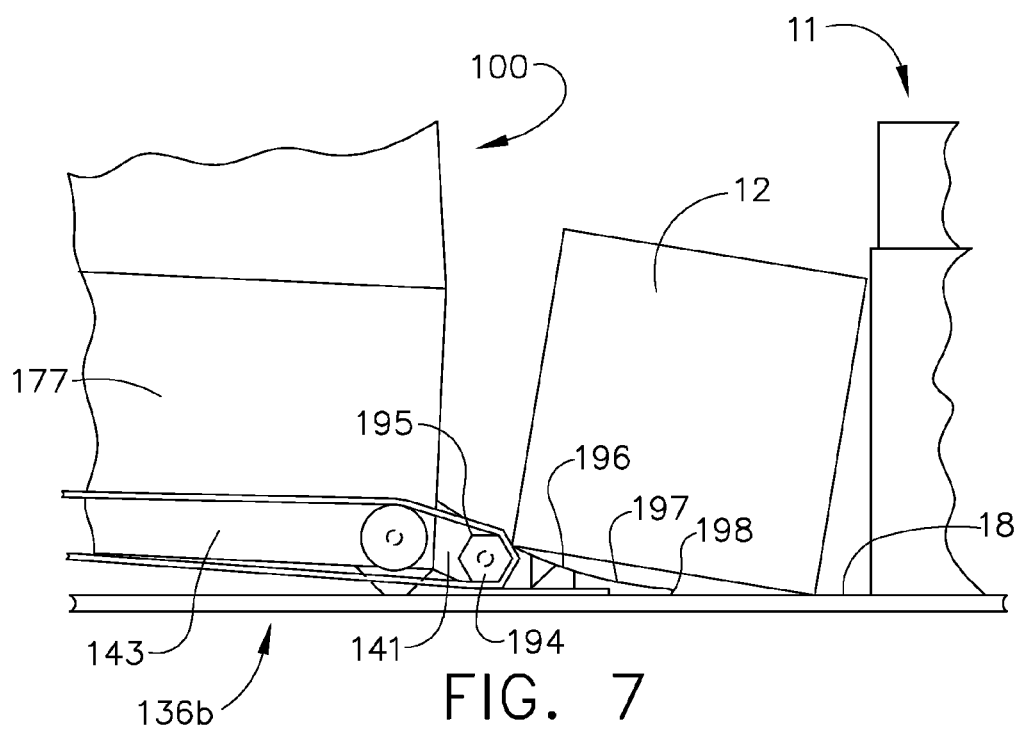
FIG. 7 is a partial side sectional view of an alternate embodiment of a robotic carton unloader having a roller with corners and a carton scoop.

FIG. 7 shows an alternate roller 194 having a length and a non-circular cross section such as a hexagonal cross section. Other suitable cross section configurations for roller 194 may be used, such as octagonal or ribbed cross section. The non-circular cross section extends lengthwise along roller 194 and is placed in front of conveyor system 135. Roller 194 may have a plurality of roller corners 195 extending lengthwise along the alternate roller 194 and when rotated, roller corners 195 create rotating ridges of high pressure that impact and dig into cartons 12. The combinations of upward rotating lines of pressure and impact have been proven to be effective in dislodging cartons 12.

FIG. 7 further includes carton scoop 196 extending from conveyor arms 141 frontwards of roller 194. Carton scoop 196 may be wedge shaped and at least a portion of carton scoop 196 can be a curve 197. Leading edge 198 of carton scoop 196 may be driven underneath carton 12 resting on floor 18. Carton scoop 196 may be configured to act as an inclined ramp that lifts and tilts carton 12 while moving underneath. As shown, the tilted carton 12 in FIG. 7 may have at least one edge thereof lifted off floor 18. Carton 12 then slides and rides up along carton scoop 196 until contacting rotating roller 194 to further lift and pull carton 12 downstream onto conveyor system 135. While carton scoop 196 is shown with roller 194, carton scoop 196 may, in another embodiment, also be used with roller 144. Additionally, in another embodiment, carton scoop 196 may be used without rollers 194 or 144 and can attach directly in front of moving conveyor system 135 (not shown).

While robotic carton unloader 100 is described above for unloading a semi-trailer 10, robotic carton unloader 100 of the present embodiment is not limited for use solely thereto, and is well suited for unloading cartons 12 in other settings such as within a store, a warehouse, a distribution center, an unloading bay, between product aisles, a rack, a pallet, and a freezer.

With respect to the actuators and lifts described as first and second actuators 168, 169 or frame lift 179, these actuators are not limited to electrical actuators, but can be a fluidic actuator operable with compressible or incompressible fluids, such as air and oil.

Vacuum Pick Head

FIGS. 8-13 illustrate an alternate robotically controlled carton remover system 260 that has a manipulator having a conformable face, such as a vacuum manipulator 162, to grasp, draw, and drop cartons 12 from the carton wall or carton pile 11 onto a body conveyor system 235. The body conveyor system 235 is shown in different embodiments in FIGS. 14 and 31, and was simulated in testing of the vacuum manipulator 162 with a table top as shown in FIGS. 8-13. Additionally, during the testing, an edge of the table top was used as a bumper 170 to stabilize the carton pile 11 during the removal of the cartons 12 therefrom. FIGS. 8-13 show snapshots of the vacuum manipulator 162 in operation as it grasps, draws, and drops cartons 12 onto the body conveyor system 235.

Figure 8:
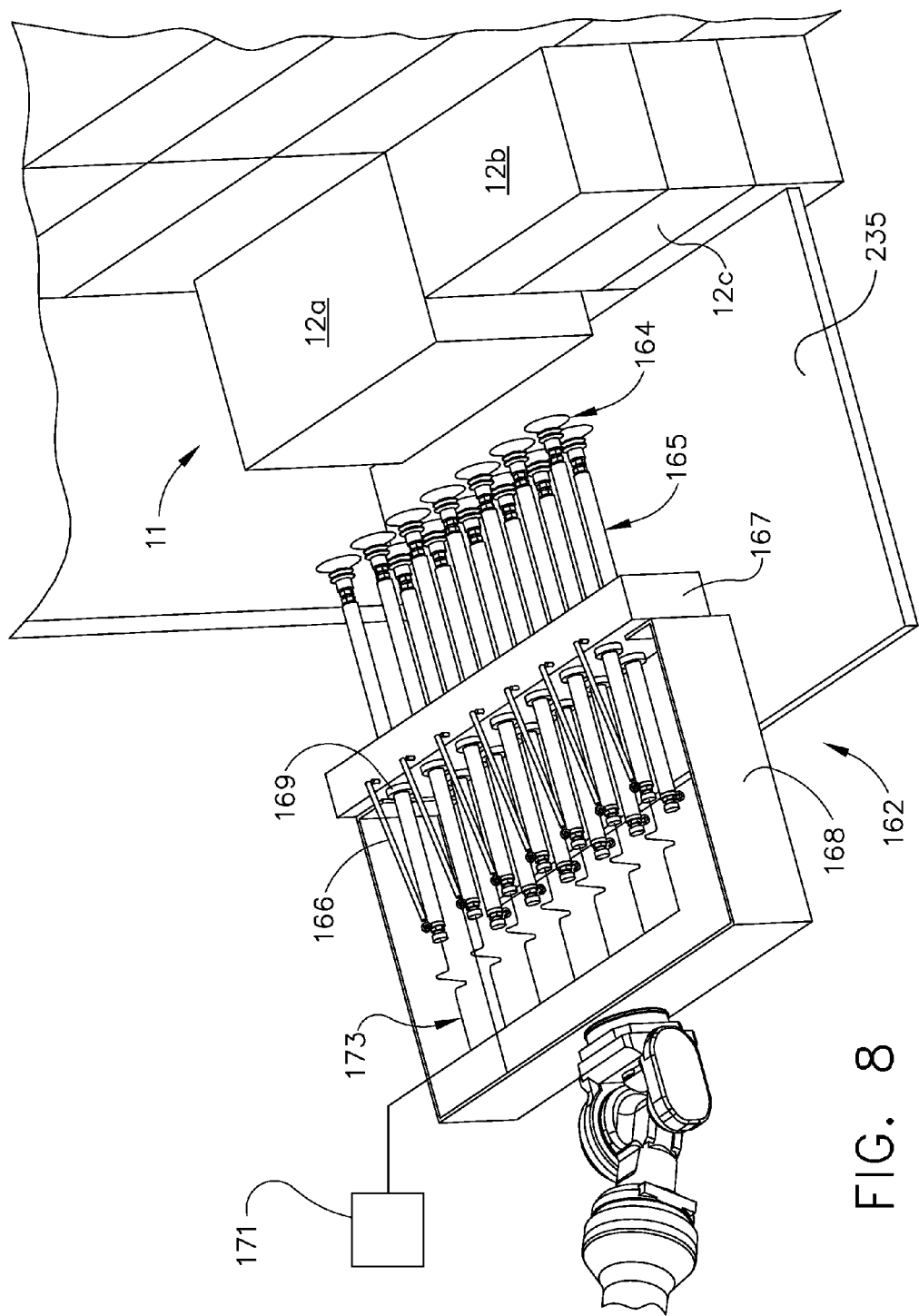
FIGS. 8-13 are a series of block diagrams showing a vacuum manipulator in operation as it grasps, draws, and drops cartons.

FIG. 8 shows the vacuum manipulator 162 approaching the carton wall or carton pile 11. The vacuum manipulator is aimed at cartons 12a, 12b, and 12c. Carton 12a juts out of the carton pile 11. The vacuum manipulator 162 has a plurality of vacuum cups 164 with each vacuum cup 164 mounted at an end of a respective guide rod 165. The guide rods 165 are hollow and slidably mounted in a guide frame 167. Springs 166 are connected between the guide rods 165 and the guide frame 168 to bias the guide rods 165 forward. A stop 169 is located on a middle portion of each of the guide rods 165 to stop forward movement of the guide rods 165 when stops 169 contact the guide frame 167. The guide frame 167 is held by a frame 168 that is movable towards and away from the carton pile 11, such as by a robotic positioner (e.g., a robotic arm). Vacuum lines 173 connect to each of the hollow guide rods 165 to supply vacuum to the vacuum cups 164 provide by a vacuum source 171 connected to each vacuum line 173.

Figure 9:
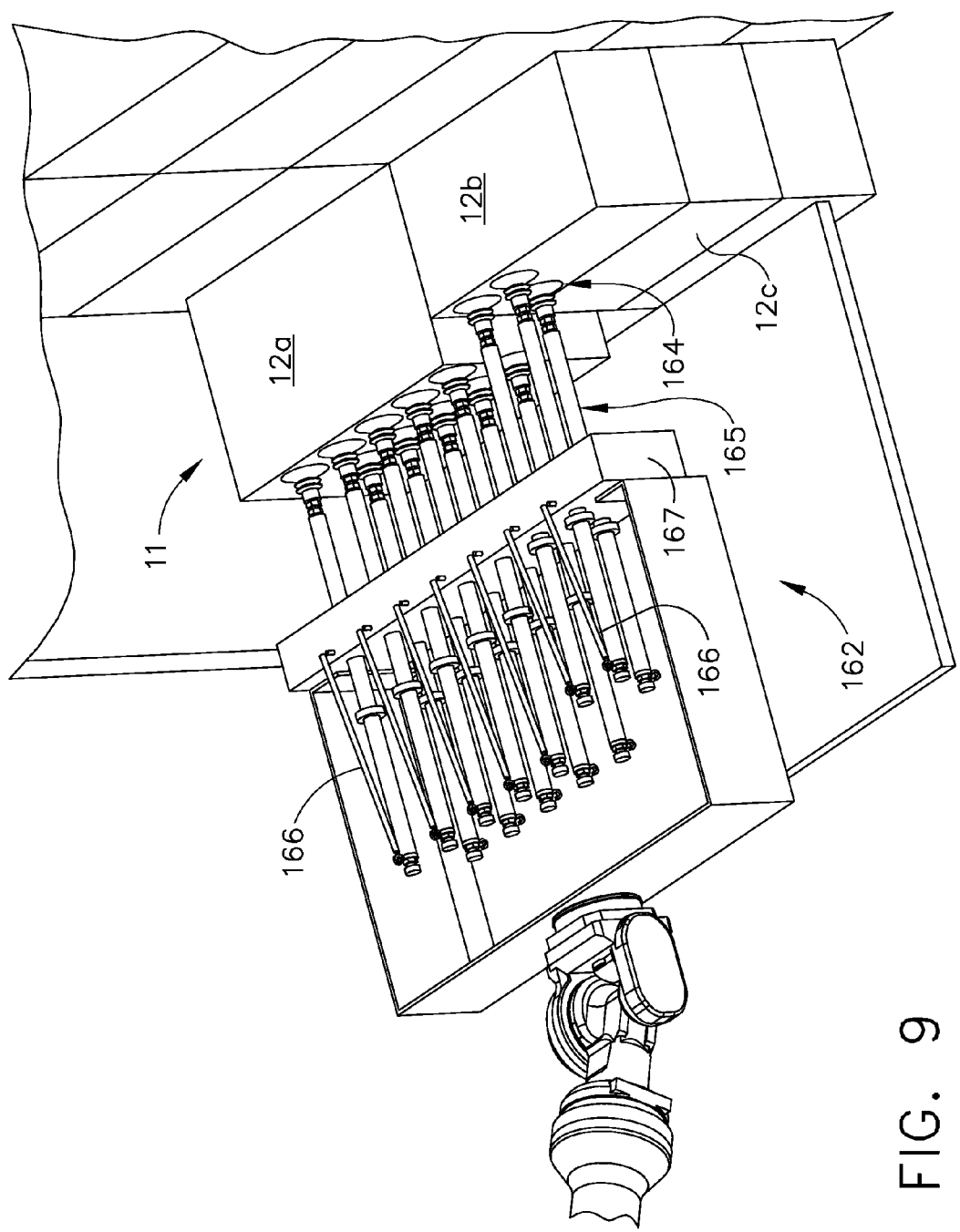

FIG. 9 shows the vacuum manipulator 162 brought into contact with the uneven face of the carton pile 11 and moved forward towards the carton pile 11 to ensure that vacuum cups 164 are brought into suction contact with carton 12b. Note that the guide rods 165 that are attached to the vacuum cups 164 in contact with carton 12a are moved farther rearward than the guide rods 165 associated with the vacuum cups 164 in contact with carton 12b.

Figure 10:
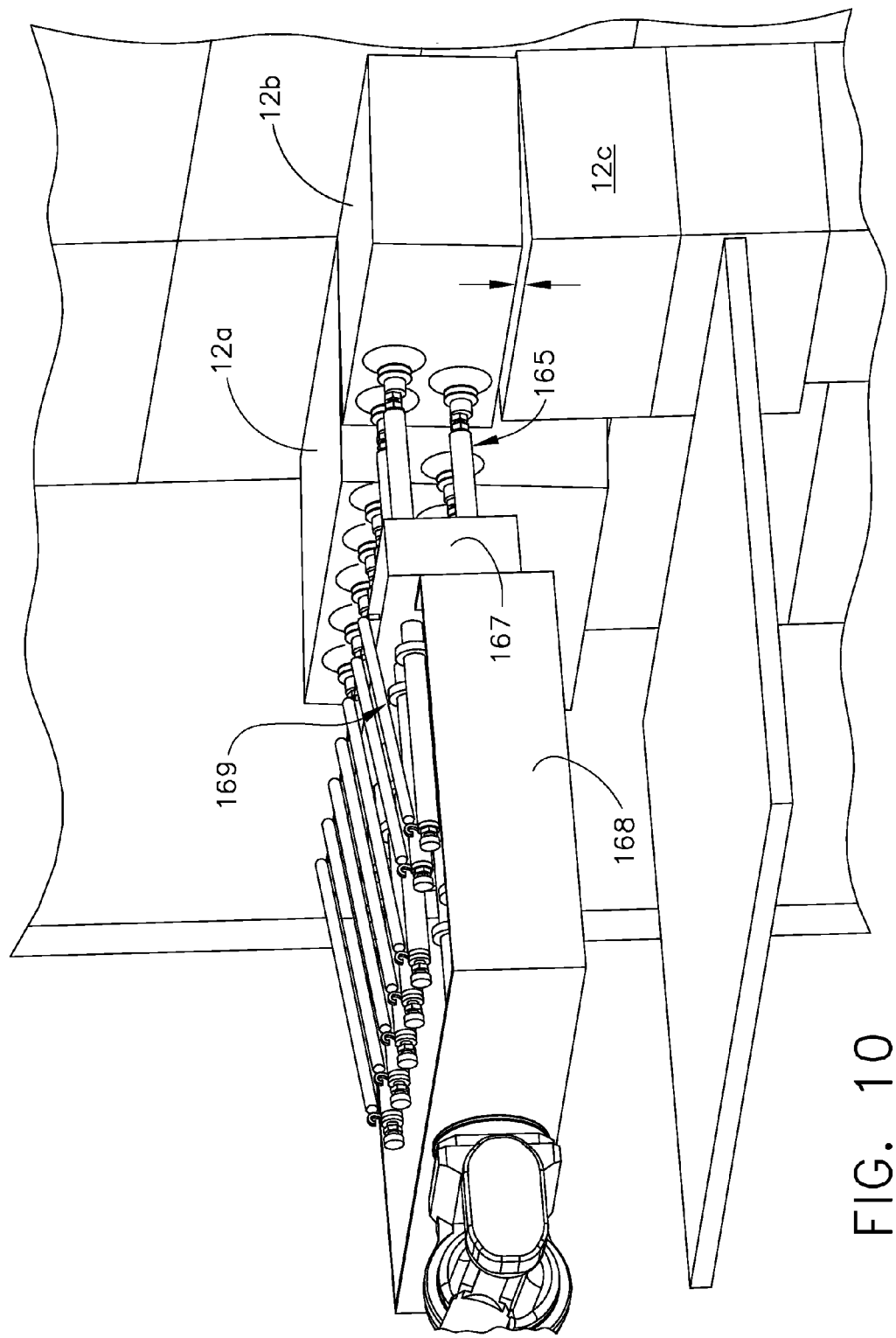
Figure 11:
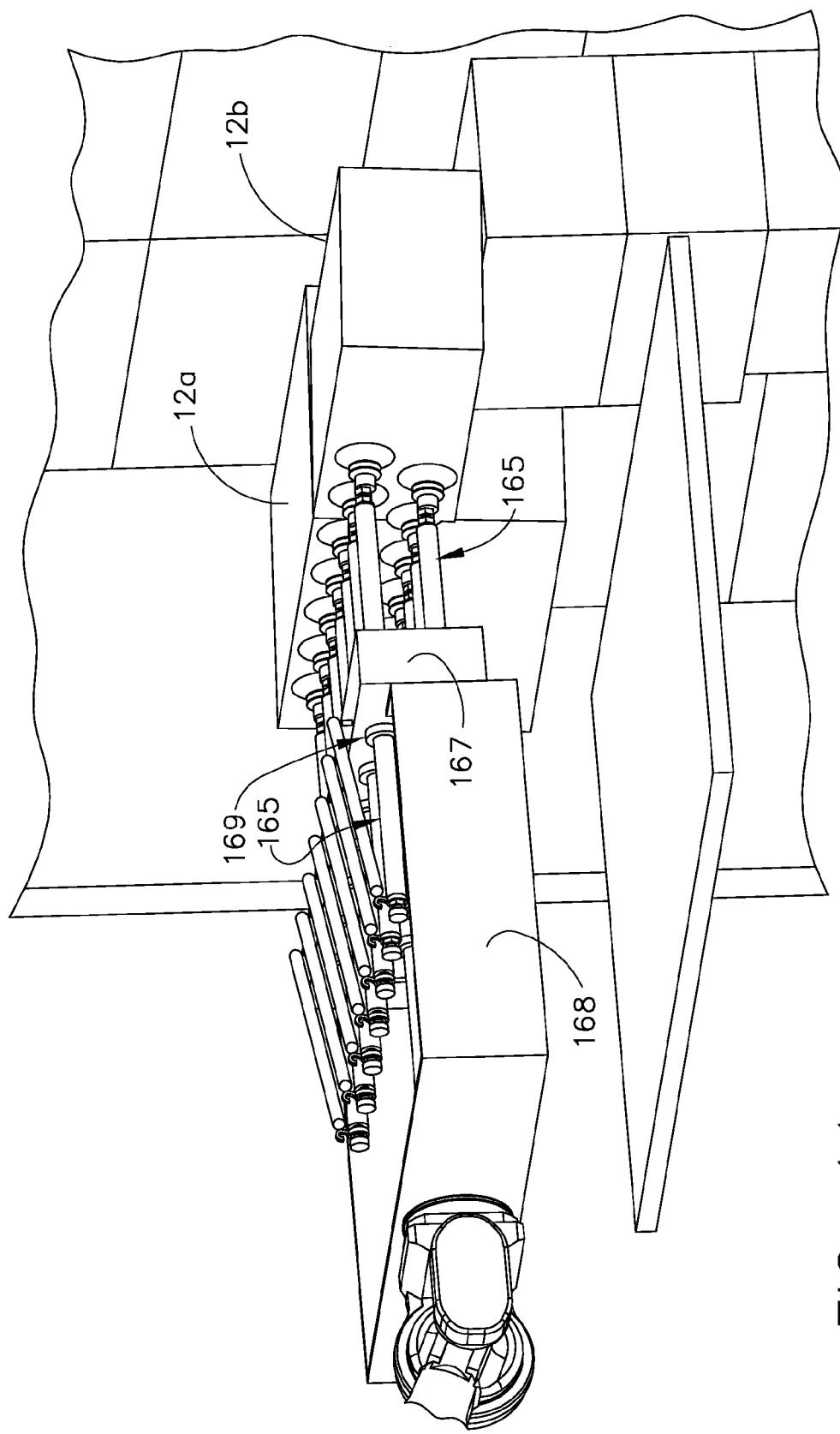
Figure 12:
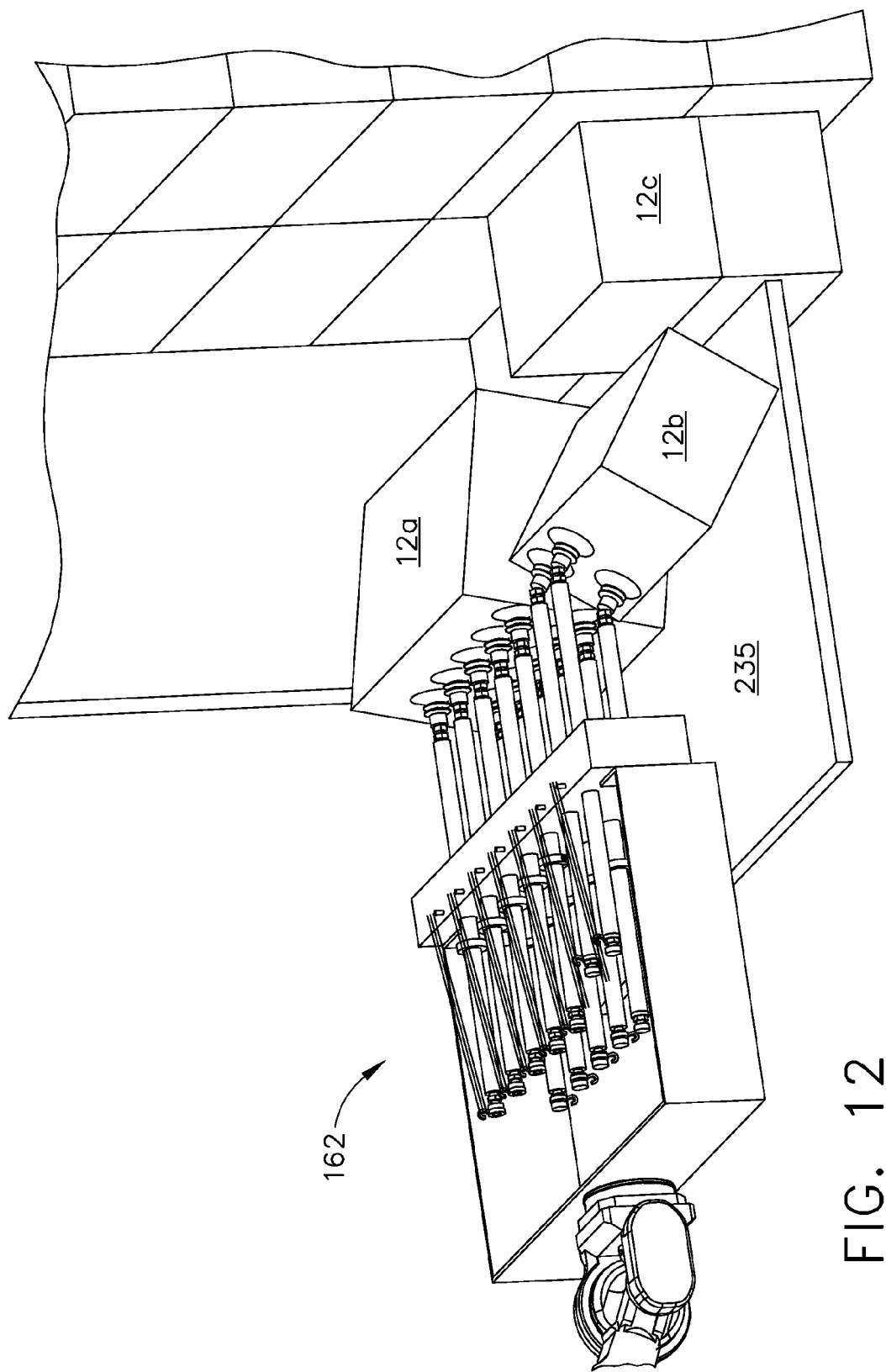
Figure 13:
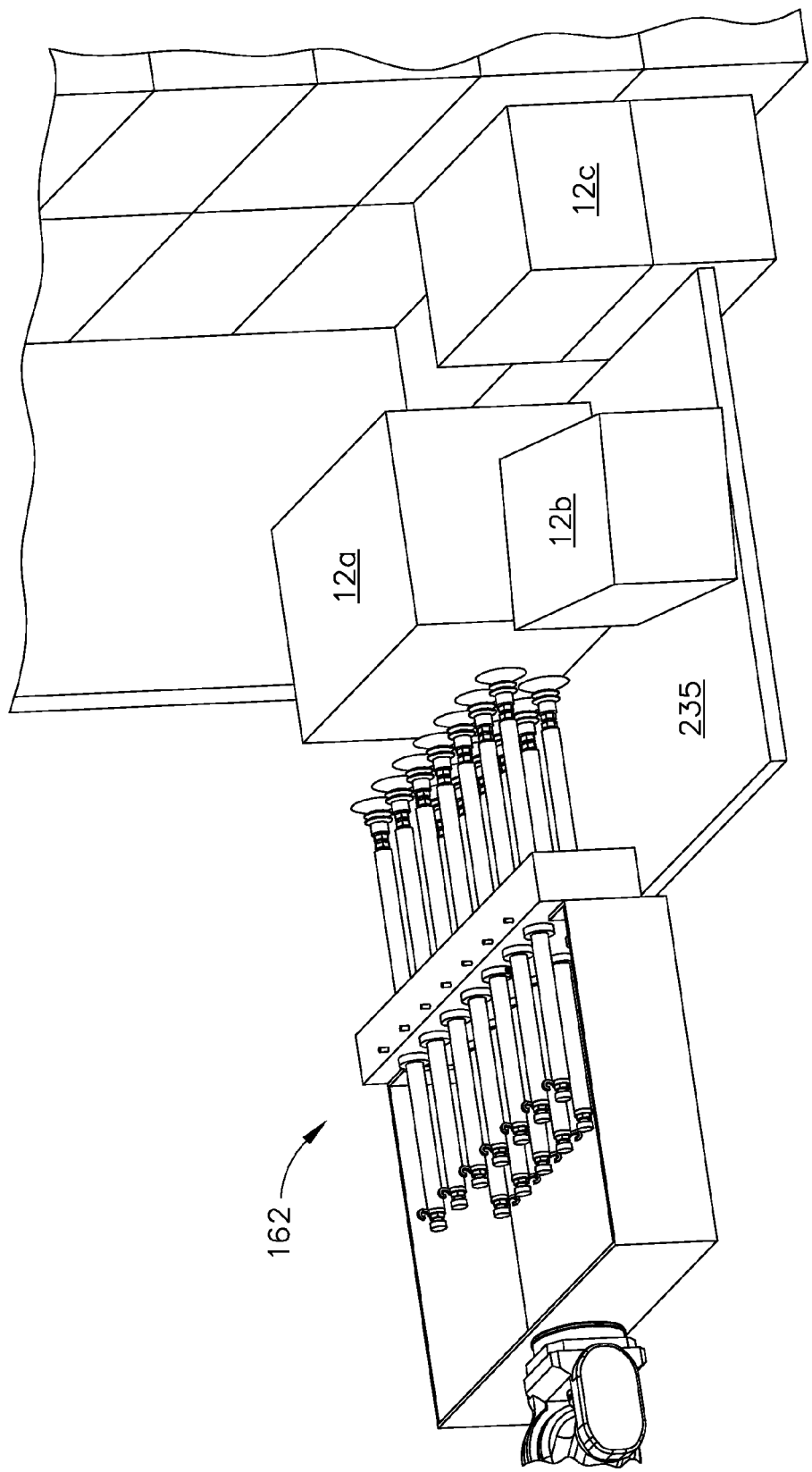

In FIG. 10, the arms 12 have been elevated to lift cartons 12a and 12b from the carton pile 11. In FIG. 11, the arms 12 have moved rearward pulling the guide frame 168 rearward until the stops 169 of the guide rods 165 contact the rearward moving guide frame 168. Once the stops 99 associated with a carton 12a, 12b are in contact with the rearward moving guide frame 168, the carton 12a, 12b begins moving rearward. Since the cartons 12a and 12b are staggered, the stops associated with carton 12b make contact before the stops of carton 12a, and carton 12b begins moving rearward before carton 12a. In this view, both carton 12a and 12b are being drawn rearward by the moving vacuum manipulator 162. In FIG. 12, the rearward moving vacuum manipulator 162 has pulled cartons 12a, 12b off of the carton pile and a front end of each carton 12a, 12b is resting on the body conveyor system 235. In FIG. 13, the vacuum is turned off, and the cartons 12a and 12b have fallen full onto the body conveyor system 235 for removal.

Figure 14:
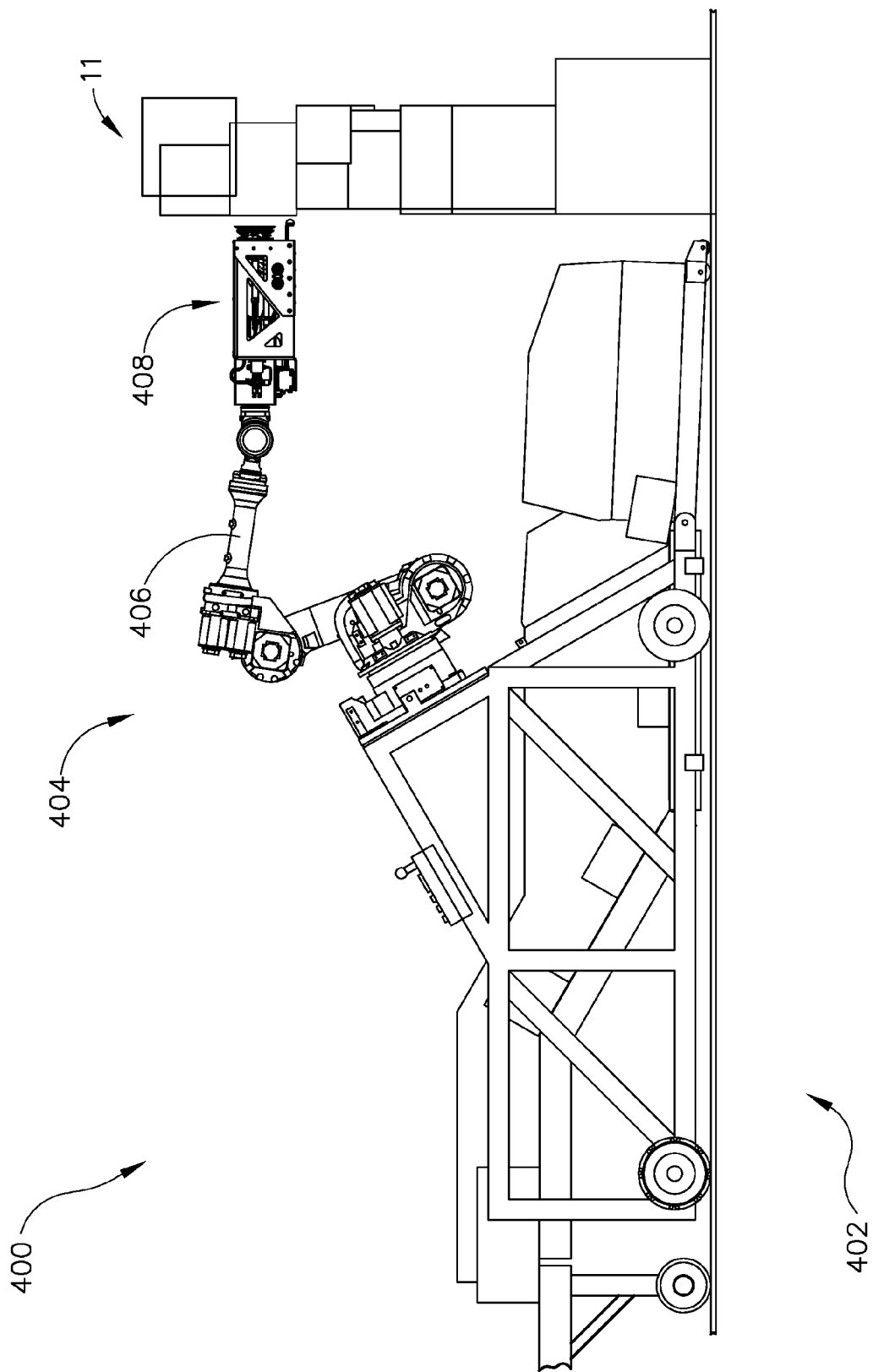
FIG. 14 is a right side sectional view of another robotic carton unloader including a vacuum manipulator according to an embodiment.

FIG. 14 is a right side sectional view of another embodiment robotic carton unloader 400 including a manipulator, such as vacuum manipulator 408, that includes a conformable face configured to conform to irregularities of a carton pile. The robotic carton unloader 400 may be similar to robotic carton unloader 100 described above with reference to FIGS. 1-6, and may include a mobile body 402 and robotically controlled carton remover system 404 similar to those described above. One difference between the robotic carton unloader 400 and robotic carton unloader 100, may be that robotic carton unloader 400 may include a vacuum manipulator 408 coupled to the robotic positioner 406. The robotic positioner 406 may be any type robotic arm, such as the FANUC® Robot R-1000ia sold by FANUC® Robotics America Corporation described above, and may extend the vacuum manipulator 408 forward toward the carton pile 11, backward (or rearward) from the carton pile 11, to the left, to the right, and/or rotate the vacuum manipulator 408. The robotic positioner 406 and vacuum manipulator 408 may be connected to a control and visualization system, such as control and visualization system 180 described above, and the control and visualization system may control the operations of the robotic positioner 406, vacuum manipulator 408, and mobile body 402 to unload cartons from the carton pile 11. For example, the control and visualization system may monitor sensor inputs received from sensors on the robotic positioner 406 and/or vacuum manipulator 408, and send control signals, such as electrical control signals or fluid control signals, to motors, valves, actuators, and/or other devices of the robotic positioner 406 and/or vacuum manipulator 408 to control the robotic positioner 406 and/or vacuum manipulator 408 based on the sensor inputs to unload cartons from the carton pile 11. As used herein, the term fluid may refer to any compressible or incompressible fluid. Examples of fluids may include air, oil, etc.

Figure 15:
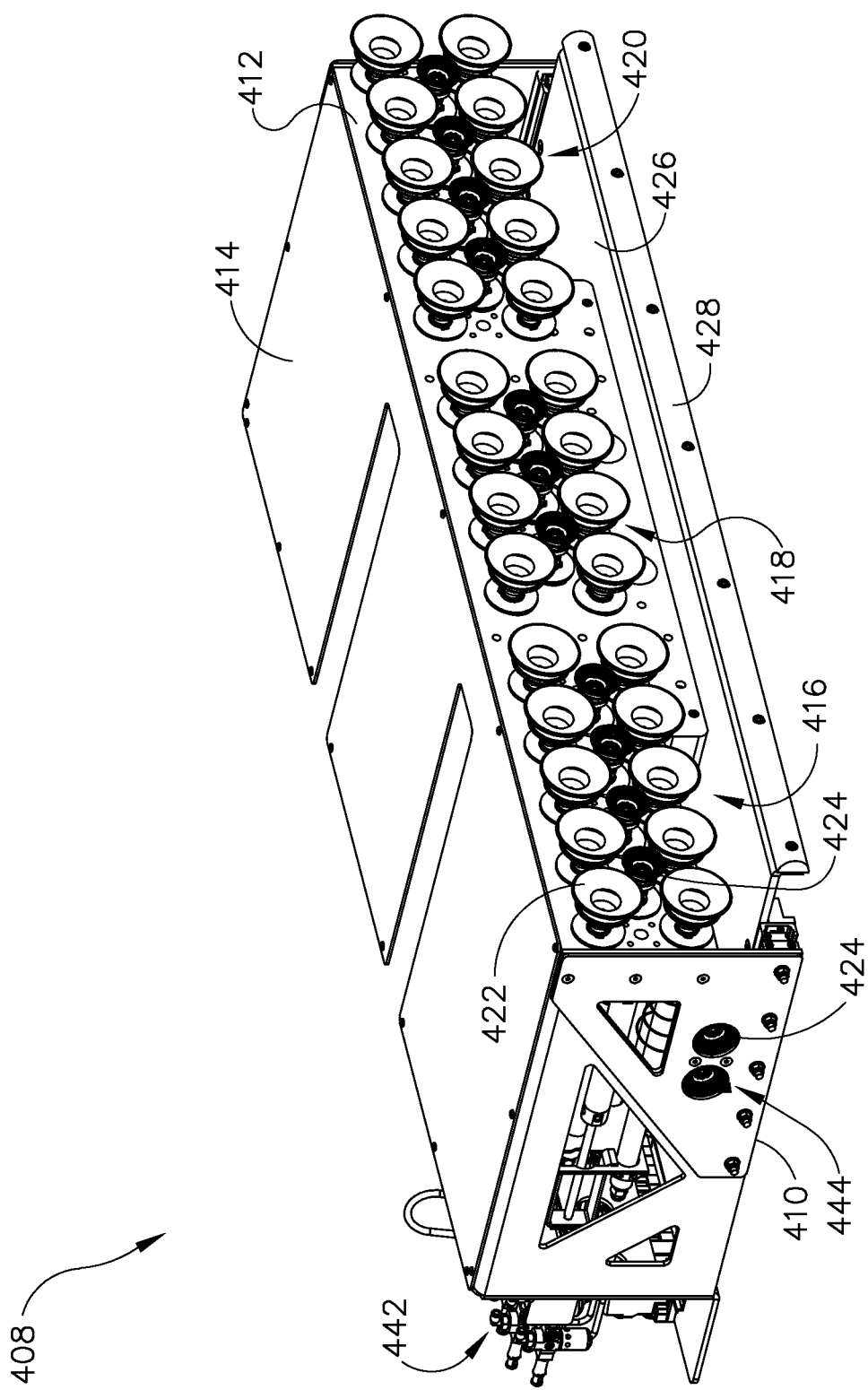
FIG. 15 is an isometric view of the right side of the vacuum manipulator of FIG. 14.

FIG. 15 is an isometric view of the right side of the vacuum manipulator 408 according to an embodiment. The vacuum manipulator 408 may comprise a manipulator frame 410 coupled to and configured to support a guide frame 412. The vacuum manipulator 408 may include one or more banks of carton connectors (e.g., vacuum rods), such as a first bank of vacuum rods 416, a second bank of vacuum rods, 418, and a third bank of vacuum rods 420. The each vacuum rod of the banks of vacuum rods 416, 418, and 420, may be supported by and extend through holes in the guide frame 412 from an internal portion of the vacuum manipulator 408 out to the front face of the guide frame 412. In an embodiment, the guide frame 412 may be a solid block, such as a resin (e.g., Delrin®) block, with a series of holes drilled through the block. The vacuum rods of each bank of vacuum rods 416, 418, and 420 may pass through the holes to extend out from and into the guide frame 412 and vacuum manipulator 408. In this manner, the banks of vacuum rods 416, 418, and 420 may form a conformable face of the vacuum manipulator 408. A top cover 414 may be affixed to the manipulator frame 410 to protect the vacuum rods and other devices housed within the vacuum manipulator 408.

In an embodiment, the banks of pluralities of carton connectors, such as banks of vacuum rods 416, 418, and 420, may be comprised of a series of vacuum rods having vacuum cups affixed to one end. In an embodiment, the vacuum cups in each bank 416, 418, and 420 may be of different diameters, such that the banks 416, 418, and 420 are comprised of at least one vacuum rod having a major vacuum cup 422 and at least one vacuum rod having a minor vacuum cup 424. For example, the banks 416, 418, and 420, may be comprised of parallel rows of major vacuum cups 422 and minor vacuum cups 424, such as two vertically aligned parallel rows of major vacuum cups 422 disposed above a vertically offset parallel row of minor vacuum cups 424. In an embodiment, the banks of vacuum rods 416, 418, and 420 may include the same number of vacuum rods and vacuum cups. In another embodiment, the banks of vacuum rods 416, 418, and 420 may include different numbers of vacuum rods and vacuum cups. For example, the first bank 416 and the third bank 420 may each include two rows of five major vacuum cups 422 and one row of four minor vacuum cups 424, while the second bank 418 (e.g., the middle bank) includes two rows of four major vacuum cups 422 and one row of three minor vacuum cups 424. In another embodiment, the rows of vacuum cups may include different types of vacuum cups, such as both major vacuum cups 422 and minor vacuum cups 424. In an embodiment, the diameter of the major vacuum cups 422 may be relatively larger than the diameter of the minor vacuum cups 424. In an embodiment, the major vacuum cups 422 and minor vacuum cups 424 may have the same or different surface textures, be made from the same or different materials, and/or may have the same or different deflection depths. While discussed in terms of two different types of vacuum cups, major vacuum cups 422 and minor vacuum cups 424, a single type of vacuum cup or more than two different types of vacuum cups may be used in the various embodiments.

Each of the vacuum rods of each bank of vacuum rods 416, 418, and 420 may be connected to a respective bank of vacuum generators. A first bank of vacuum generators 442 is illustrated in FIG. 15 coupled to the manipulator frame 410. An opposite end of the vacuum rod may include a vacuum coupling which may be connected by a vacuum line to one of the vacuum generators of the first bank of vacuum generators 442. In operation the vacuum generators may draw a vacuum which may pull fluid through the vacuum lines, through the respective vacuum rods and through the respective vacuum cups. In an embodiment, the vacuum drawn through the respective vacuum rods and through the respective vacuum cups may enable the conformable face of the vacuum manipulator 408 to attach to contacted cartons of the carton pile 11 to unload the contacted cartons from the carton pile 11.

In an embodiment, the vacuum manipulator 408 may include at least one carton connector, such as a vacuum rod, configured to extend out from a side of the manipulator perpendicular to the conformable face of the vacuum manipulator 408. In an embodiment, the vacuum manipulator may include at least one carton connector configured to extend out from a side of the manipulator perpendicular to the conformable face as one or more banks of vacuum rods disposed on one or both of the left and/or right sides of the manipulator frame 410. A right side bank of vacuum rods 444 is illustrated in FIG. 15. The side banks of vacuum rods may be oriented in different directions than the banks of vacuum rods 416, 418, and 420 extending from the front of the vacuum manipulator 408. For example, the side banks of vacuum rods may extend perpendicular to the front of the vacuum manipulator and/or in other directions/orientations. In an embodiment, the bank of vacuum rods 444 may comprise one or more vacuum rods 444, such as two vacuum rods, having vacuum cups, such as minor vacuum cups 424, affixed to one end. The right side bank of vacuum rods 444 may be configured to extend and retract out of and into the right side of the manipulator frame 410. In operation the right side bank of vacuum rods 444 may extend out from the vacuum manipulator 408 to contact, attach to, and dislodge (e.g., remove) cartons arranged to the right side of vacuum manipulator 408. When unloading cartons from a truck or trailer, the unloading of cartons from the center portion of the carton pile 11 may result in columns of cartons arranged along the sides of the truck or trailer that may be difficult for a vacuum manipulator 408 to reach with the banks of vacuum rods 416, 418, and 420 extending from the front of the vacuum manipulator 408. The side banks of vacuum rods, such as right side bank of vacuum rods 444, may extend from the manipulator frame 410 to contact and manipulate cartons in these columns of cartons arranged along the sides of the truck or trailer. The side banks of vacuum rods through their own retraction or in combination with movement of the vacuum manipulator 408 caused by the robotic positioner 406 may pull these side cartons to a position in which the vacuum manipulator 408 may engage the cartons with the banks of vacuum rods 416, 418, and 420 extending from the front of the vacuum manipulator 408. Alternatively, the side banks of vacuum rods through their own retraction or in combination with movement of the vacuum manipulator 408 caused by the robotic positioner 406 may remove the cartons from their respective columns and cause them to fall onto a conveyor system.

In an embodiment, the vacuum manipulator 408 may include at least one carton connector, such as a vacuum rod, configured to extend out from a side of the manipulator perpendicular to the conformable face of the vacuum manipulator 408. In an embodiment, the vacuum manipulator may include at least one carton connector configured to extend out from a side of the manipulator perpendicular to the conformable face as one or more banks of vacuum rods disposed on one or both of the left and/or right sides of the manipulator frame 410. A right side bank of vacuum rods 444 is illustrated in FIG. 15. The side banks of vacuum rods may be oriented in different directions than the banks of vacuum rods 416, 418, and 420 extending from the front of the vacuum manipulator 408. For example, the side banks of vacuum rods may extend perpendicular to the front of the vacuum manipulator and/or in other directions/orientations. In an embodiment, the bank of vacuum rods 444 may comprise one or more vacuum rods 444, such as two vacuum rods, having vacuum cups, such as minor vacuum cups 424, affixed to one end. The right side bank of vacuum rods 444 may be configured to extend and retract out of and into the right side of the manipulator frame 410. In operation the right side bank of vacuum rods 444 may extend out from the vacuum manipulator 408 to contact, attach to, and dislodge (e.g., remove) cartons arranged to the right side of vacuum manipulator 408. When unloading cartons from a truck or trailer, the unloading of cartons from the center portion of the carton pile 11 may result in columns of cartons arranged along the sides of the truck or trailer that may be difficult for a vacuum manipulator 408 to reach with the banks of vacuum rods 416, 418, and 420 extending from the front of the vacuum manipulator 408. The side banks of vacuum rods, such as right side bank of vacuum rods 444, may extend from the manipulator frame 410 to contact and manipulate cartons in these columns of cartons arranged along the sides of the truck or trailer. The side banks of vacuum rods through their own retraction or in combination with movement of the vacuum manipulator 408 caused by the robotic positioner 406 may pull these side cartons to a position in which the vacuum manipulator 408 may engage the cartons with the banks of vacuum rods 416, 418, and 420 extending from the front of the vacuum manipulator 408. Alternatively, the side banks of vacuum rods through their own refraction or in combination with movement of the vacuum manipulator 408 caused by the robotic positioner 406 may remove the cartons from their respective columns and cause them to fall onto a conveyor system.

Figure 16:
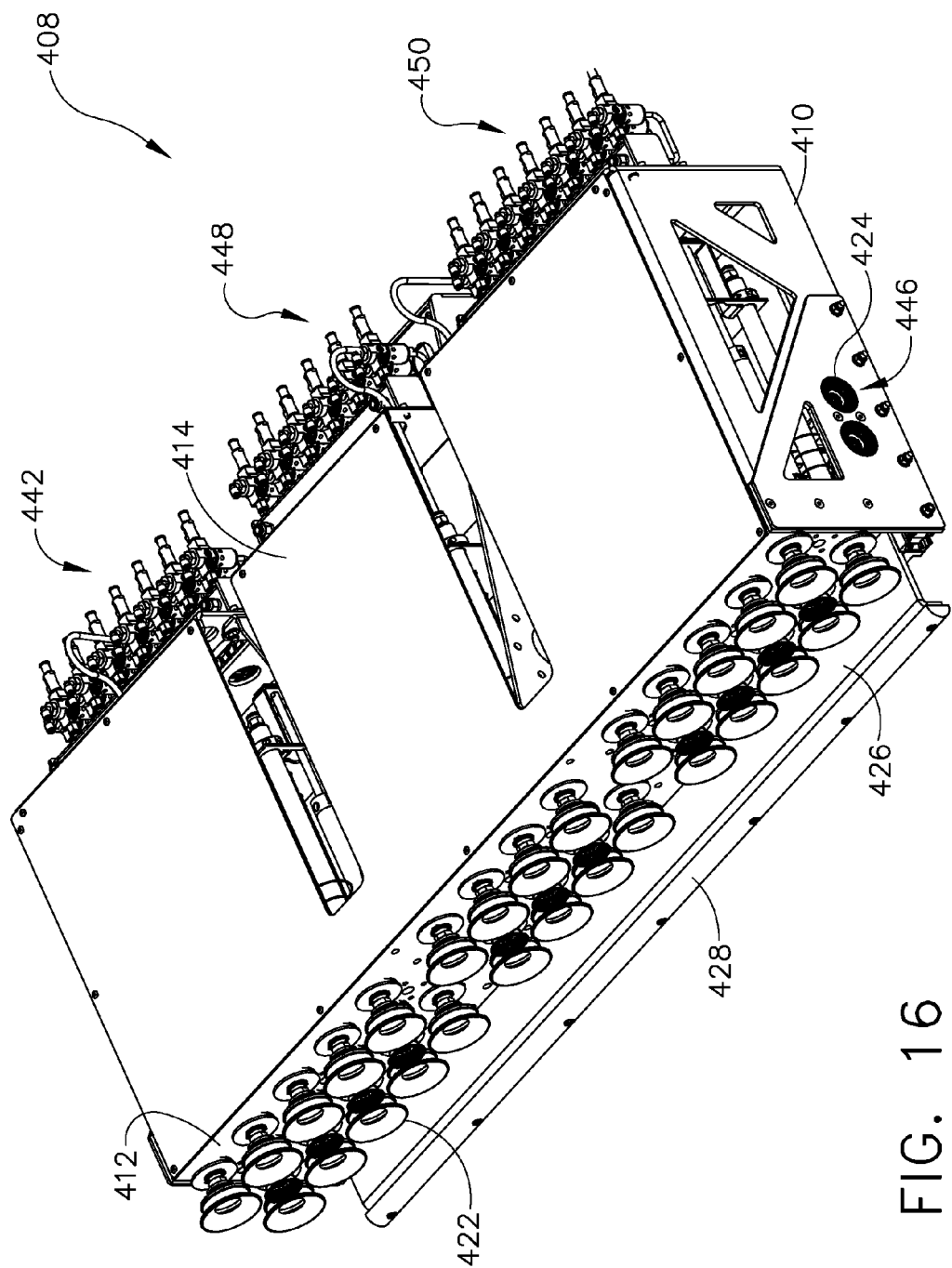
FIG. 16 is an isometric view of the left side of the vacuum manipulator of FIG. 14.

FIG. 16 is an isometric view of the left side of the vacuum manipulator 408. FIG. 16 illustrates the left side bank of vacuum rods 446 including minor vacuum cups 424 which may extend through the manipulator frame 410 out to the left. Additionally, in FIG. 16 the first bank of vacuum generators 442, second bank of vacuum generators 448, and third bank of vacuum generators 450 for each of the first bank of vacuum rods 416, second bank of vacuum rods 418, and third bank of vacuum rods 420 are illustrated coupled to the manipulator frame 410.

Figure 17A:
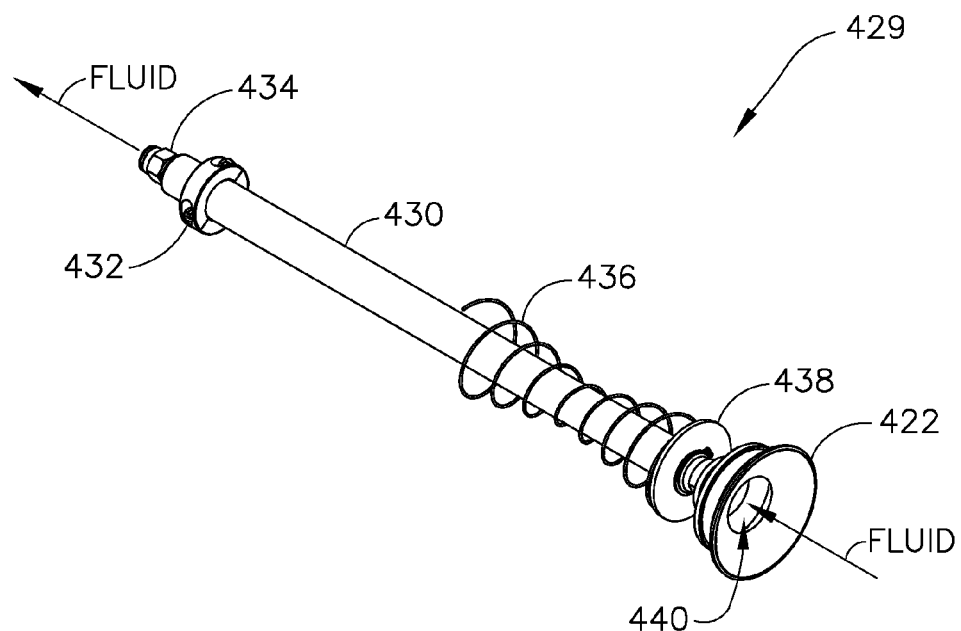
FIG. 17A is an isometric view of an embodiment vacuum rod.
Figure 17B:
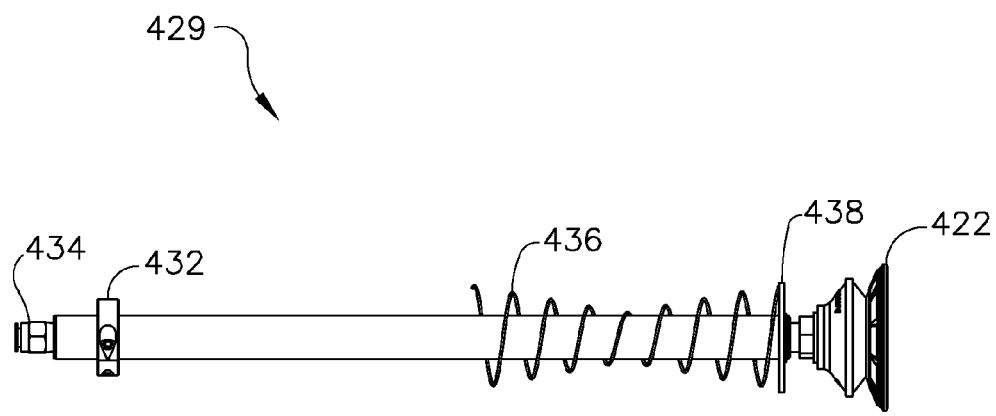
FIG. 17B is a side view of the vacuum rod of FIG. 17A.

FIG. 17A is an isometric view and FIG. 17B is a side view of an embodiment carton connector, such as vacuum rod 429, having a major vacuum cup 422 affixed to one end. The vacuum rod 429 may be comprised of a hollow guide rod 430 to which the major vacuum cup 422 may be affixed to one end and a vacuum coupling 434 may be affixed to an opposite end. Disposed along the guide rod 430, such as forward of the vacuum coupling 434, may be a stop 432. The stop 432 may be a protrusion, such as a collar, ring, ridge, etc., affixed to and/or formed on the guide rod 430. Opposite the stop 432 along the guide rod 430 may be a washer 438 set at or back from the point of attachment of the major vacuum cup 422. The washer 438 may be a collar, ring, ridge, etc., affixed to and/or formed on the guide rod 430. A compression spring 436 may surround the guide rod 430 and extend from the washer 438 on a side opposite the major vacuum cup 422. When compressed, the compression spring 436 may push against the washer 438 exerting a force against the washer 438. The hole through the center of the major vacuum cup 422, hole through the center of the guide rod 430, and the hole through the vacuum coupling 434 may form a central passage 440 through which fluid may travel from the major vacuum cup 422, through the center of the guide rod 430, and out the vacuum coupling 434, thereby traveling through the vacuum rod 429.

Figure 18A:
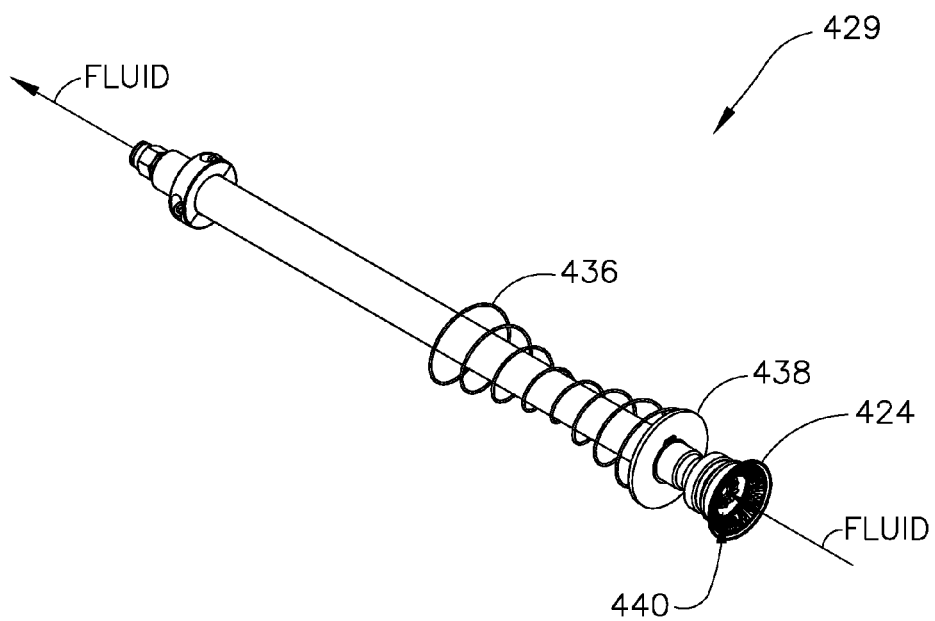
FIG. 18A is an isometric view of another embodiment vacuum rod.
Figure 18B:
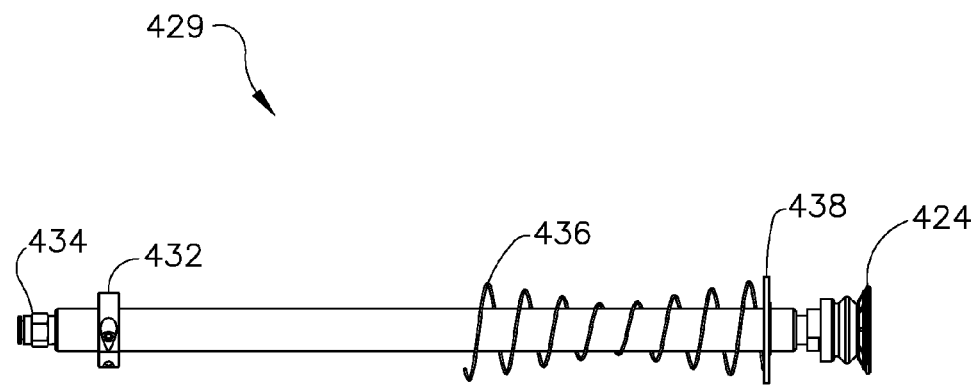
FIG. 18B is a side view of the vacuum rod of FIG. 18A.

FIG. 18A is an isometric view and FIG. 18B is a side view of the embodiment carton connector, such as vacuum rod 429, described above with reference to FIGS. 17A and 17B, except in FIGS. 18A and 18B the carton connector, such as vacuum rod 429, is illustrated including a minor vacuum cup 424 affixed to one end. Series of vacuum rods 429 with major vacuum cups 422 and/or minor vacuum cups 424 may comprise the first bank of vacuum rods 416, second bank of vacuum rods 418, and/or third bank of vacuum rods 420. When the vacuum rod 429 contacts a surface of a carton, the major vacuum cup 422 or minor vacuum cup 424 may deflect and/or compress due to the force of the carton and the guide rod 430 exerted against the major vacuum cup. The deflection and/or compression distance of the major vacuum cup 422 or minor vacuum cup 424 may depend on various factors, such as material properties of the vacuum cup, diameter of the vacuum cup, etc. In one embodiment, the maximum deflection of the major vacuum cup 422 or minor vacuum cup 424 may be 1.19 inches. Other embodiment maximum deflection or compression distances may be greater than 1.19 inches or less than 1.19 inches.

Figure 19:
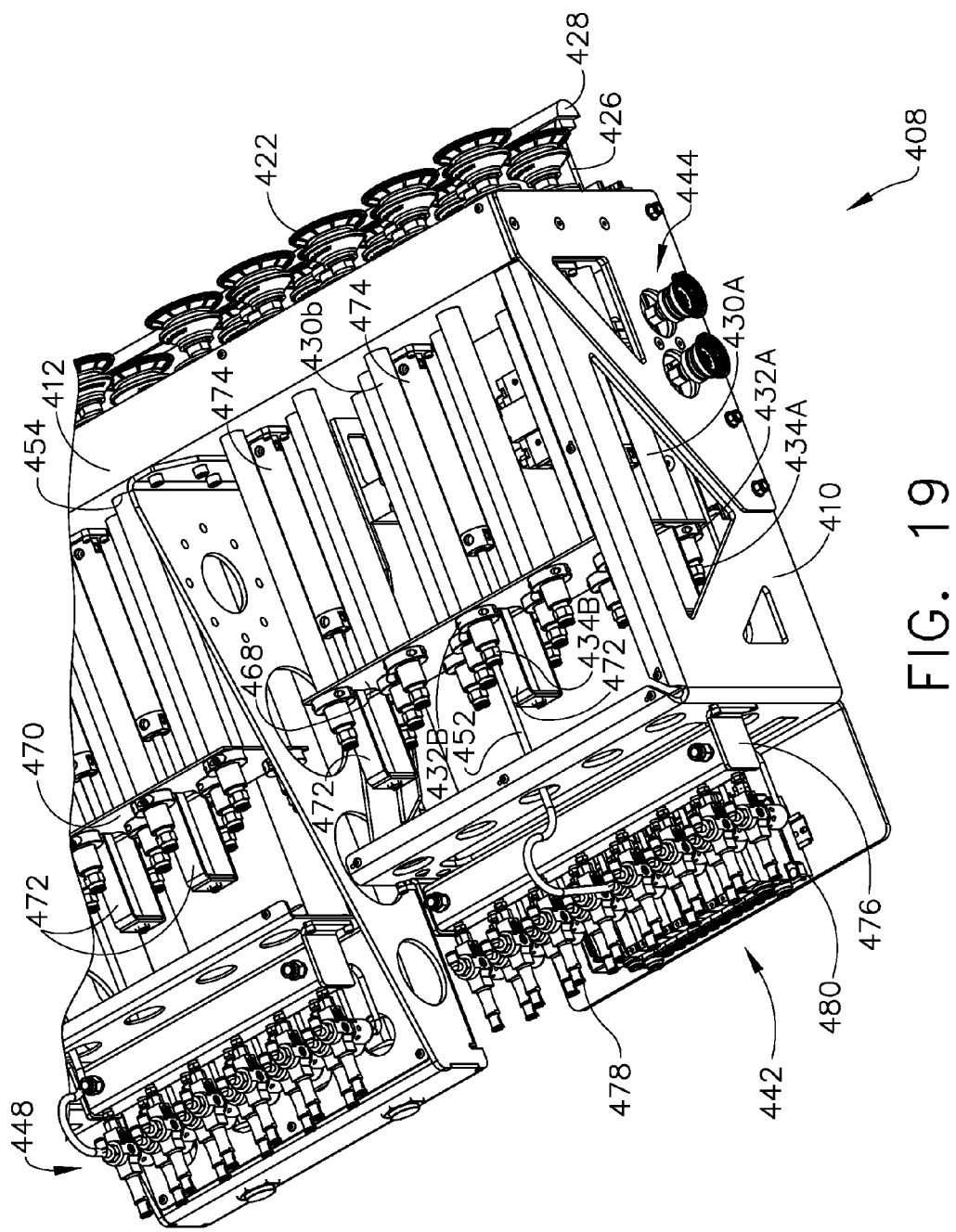
FIG. 19 is a partial isometric view of the right side of the vacuum manipulator of FIG. 14 illustrating internal features according to an embodiment shown through a clear top cover.

FIG. 19 is a partial isometric view of the right side of the vacuum manipulator 408 with the top cover 414 shown clear to provide a view of the internal configuration of the vacuum manipulator. FIG. 19 illustrates that the vacuum rods pass through the guide frame 412 and through plates, such as a first plate 468 associated with the first bank of vacuum rods 416 and a second plate 470 associated with the second bank of vacuum rods 418. All the vacuum rods for the first bank of vacuum rods 416 are illustrated, but a number of vacuum rods for the second bank of vacuum rods 418 are removed for illustration purposes. With the vacuum rods removed, the guide frame openings 454 (e.g., holes) in the guide frame 412 are visible as well as the plate openings 455 (e.g., holes) in the second plate 470. The vacuum rods may extend through the guide frame 412 and through their respective plates 468 and 470 and may slide through the guide frame 412 and their respective plates 468 and 470.

The first plate 468 and the second plate 470 may each be slidably mounted within the manipulator frame 410 and may move forward toward the guide frame 412 and backward (e.g., rearward) away from the guide frame 412. In an embodiment retraction cylinders 474 may be coupled to the plates and may be actuated to move the plates within the manipulator frame 410. For example, the retraction cylinders 474 may be mounted between the plates and the guide frame 412, such that the retraction cylinders 474 extend from the back surface of the guide frame 412 in an opposite direction of the vacuum cups of the banks of vacuum rods 416, 418, and 420. The extension rods of the retraction cylinders 474 may extend through the plates and contact u-shaped brackets 472 located on a back surface of the plates. In operation, as the retraction cylinders 474 extend their extension rods, the extension rods may exert force on the u-shaped brackets 472 pushing the plates away from the guide frame 412. In an embodiment, the retraction cylinders 474 may be compressed fluid (e.g., air) cylinders configured to extend the extension rods when compressed fluid (e.g., air) is supplied. For example, one or more valves of a compressed fluid (e.g., air) distributor may be controlled by the control and visualization system to be closed to provide compressed fluid (e.g., air) to the retraction cylinders 474 to extend the extension rods and the one or more valves may be controlled to be opened to vent the cylinders 474 to the atmosphere, thereby allowing the extension rods to be retracted and the plate to slide forward toward the guide frame 412.

As illustrated in FIG. 19, the stops 432a and 432b of guide rods 430a and 430b, respectively, contact the first plate 468. When the first plate 468 is slid all the way forward toward the guide frame 412 (e.g., when the extension rods of retraction cylinders 474 are not extended), stops 432a and 432b may contact the first plate 468 and prevent their respective guide rods 430a and 430b from moving farther forward. As the first plate 468 slides back away from the guide frame 412 due to extension of the extension rods applying force to the u-shaped brackets 472, the first plate 468 applies force against the stops 432a and 432b to pull guide rods 430a and 430b back through the guide frame 412, thereby compressing the compression springs of the respective vacuum rods between the front face of the guide frame 412 and the respective washers. In this manner, the vacuum rods may be retracted back into the vacuum manipulator 408 to prevent damage, such as bending, breaking, etc. of the vacuum rods. For example, the vacuum rods may be retracted during movement of the robotic carton unloader 400 and/or robotic positioner 406 to protect the vacuum rods from damage. When the extension rods of the retraction cylinders 474 are no longer exerting force against the u-shaped brackets 472, the force of the compression springs of the various vacuum rods pushing on the guide frame 412 and the various washers may drive the vacuum rods forward out of the guide frame 412. In this manner, each of the various vacuum rods may be biased towards the carton pile by its spring. The stops 432, such as stops 432a and 432b, may exert force on the plates, such as the first plate 468, to pull the plates forward toward the guide frame 412 as the compression springs extend the vacuum rods. As the extension and retraction of the vacuum rods is controlled by the compression springs and/or the retraction cylinders 474, respectively, the vacuum rods may be considered spring loaded passive suction devices. In an embodiment, the various plates associated with each respective bank of vacuum rods may have the same number of respective u-shaped brackets 472 and retraction cylinders 474. In another embodiment, the plates may have different numbers of respective u-shaped brackets 472 and retraction cylinders 474. For example, the middle plate 470 may be associated with two u-shaped brackets 472 and two retraction cylinders 474, while the outer plates (e.g., first plate 468 and third plate 471) may be associated with three u-shaped brackets 472 and three retraction cylinders 474.

FIG. 19 also illustrates aspects of the first bank of vacuum generators 442, including a vacuum line 452 connected between one of the vacuum generators and the vacuum coupling 434b of one of the vacuum rods of the first bank of vacuum rods 416. Other vacuum generators and vacuum couplings, such as vacuum coupling 434a, may be connected in a similar manner, but are illustrated without vacuum lines 452 for clarity of illustration. The vacuum lines 452 may be any type connection, such as flexible tubes, pipes, hoses, etc. The vacuum generators may receive compressed fluid (e.g., air) from a compressed fluid (e.g., air) manifold 476. The compressed fluid may flow to each of the vacuum generators from the compressed fluid manifold 476 and be forced across an opening connected to the respective vacuum line 452 and out an exhaust 478. In this manner, the vacuum generator may act as an educator drawing fluid through the vacuum line 452 and through the central passage 440 of the vacuum, and drawing a vacuum or partial vacuum when the vacuum cups contact a surface of a carton. In an embodiment, each bank of vacuum generators 442, 448, and 450 may have its own respective compressed fluid manifold 476.

The compressed fluid manifolds 476 and other fluid actuated devices, such as retraction cylinders 474, may receive compressed fluid (e.g., air) from compressed fluid (e.g., air) distributor 480. Compressed fluid lines may connect the compressed fluid manifolds 476 and other fluid actuated devices, such as retraction cylinders 474, to the compressed fluid distributor 480. The compressed fluid distributor 480 may receive compressed fluid (e.g., air) from a main compressed fluid connection and may comprise a series of valves remotely controllable by the control and visualization system, such as electrically operated valves, that may be cycled open and closed to provide compressed fluid from the main compressed fluid connection to the compressed fluid manifolds 476 and other fluid actuated devices, such as retraction cylinders 474 of the vacuum manipulator 408. In an embodiment, the vacuum manipulator 408 may have one compressed fluid distributor 480. In another embodiment, more than one compressed fluid distributor 480 may be present on the vacuum manipulator.

Figure 20:
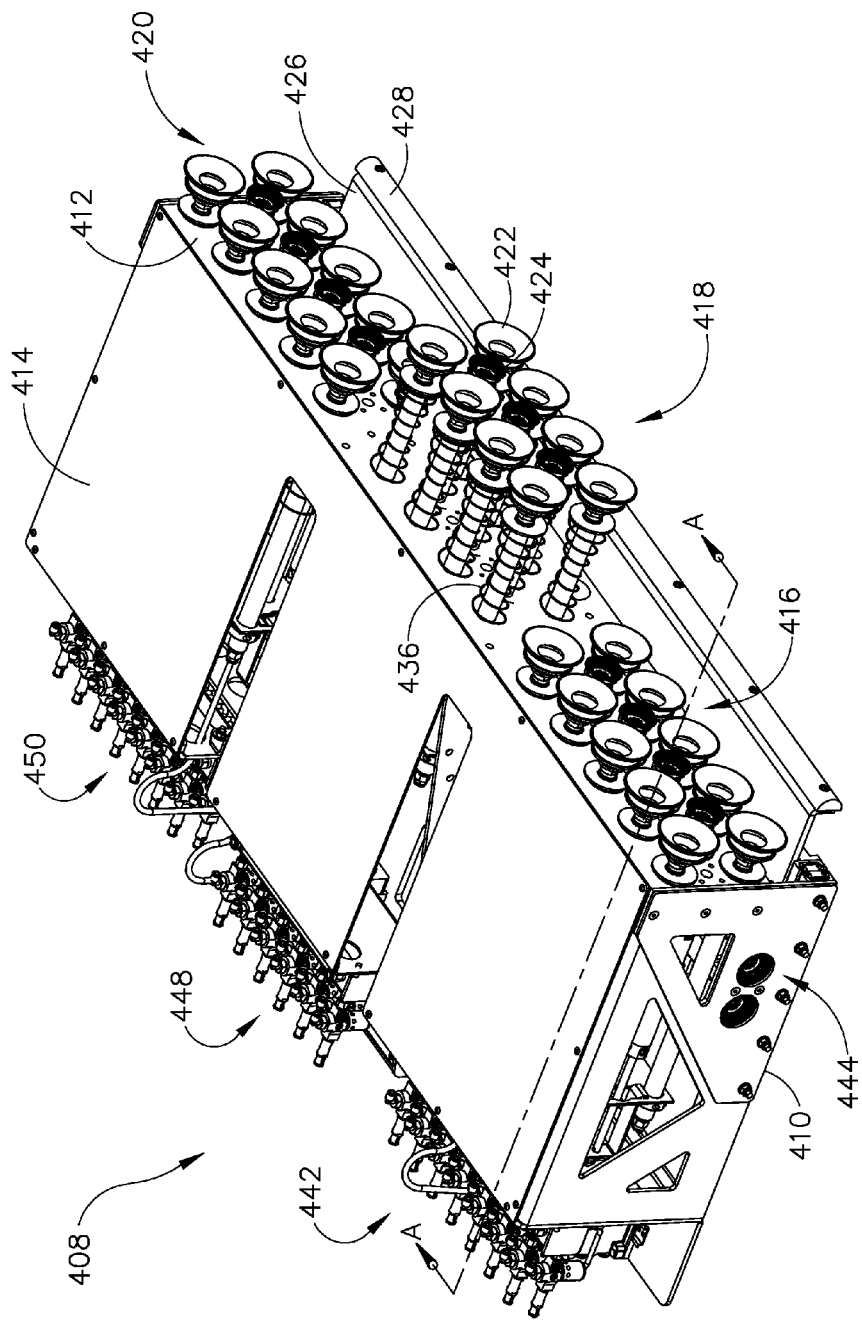
FIG. 20 is an isometric view of the right side of the vacuum manipulator of FIG. 14 with a second bank of vacuum rods extended.

FIG. 20 is an isometric view of the right side of the vacuum manipulator 408 with the second bank of vacuum rods 418 extended and the sliding shelf 426 retracted. The first bank of vacuum rods 416, the second bank of vacuum rods 418, and the third bank of vacuum rods 420 may be independently extendable and retractable. In this manner, each bank of a plurality of carton connectors, such as the first bank of vacuum rods 416, the second bank of vacuum rods 418, and the third bank of vacuum rods 420, may be configured to move independent of the other banks of pluralities of carton connectors towards the carton pile to conform to irregularities of the carton pile by contact therewith and to move independent of the other banks of pluralities of carton connectors away from the carton pile to unload the contacted cartons. As illustrated in FIG. 20, when the second bank of vacuum rods 418 is extended the compression springs 436 of the various vacuum rods expand out from the guide frame 412 pushing against the washers 438 to extend the vacuum cups forward. As illustrated in FIG. 20 by the extension of the vacuum rods 418, as the various vacuum rods may extend through the guide frame 412 to extend the vacuum cups away from the guide frame 412 and manipulator frame 410. The range of extension of the vacuum rods may be based on the length of the guide rods 430, uncompressed length of the springs 436, location of the stops 432, separation distance between the plates 468, 470, 471 and the guide frame 412, and/or the depth of guide frame 412. However, the extension of the vacuum rods may enable the vacuum cups to be extend out a range from the guide frame 412 that is longer than the depth of the vacuum cups and beyond the distance the vacuum cups extend in the retracted state. In this manner, the vacuum cups may be extended to reach deeper into the carton pile 11 to reach cartons that may not be aligned with the front face of the carton pile 11 because the vacuum cups may be extended beyond their own depth forward from the retracted position to any position over the range. Additionally, because the vacuum rods are in effect spring loaded passive suction devices that may move freely through the guide frame 412 and the plates 468, 470, 471 limited only by the stops 432, washers 438, and springs 436, the vacuum rods may also deflect the same range backward from their fully extended position back to their retracted position. In this manner, each carton connector, such as each vacuum rod, and therefore the banks of vacuum rods 416, 418, and 420, may deflect to conform to the face of the carton pile 11, and the conformable face of the manipulator may be configured to passively conform to irregularities of the carton pile 11 to unload the carton pile 11 by contact therewith. In an embodiment, the deflection may be the range of extension distance plus any deflection/compression distance of the vacuum cups themselves. In this manner, the effective deflection distance may be greater than the deflection distance of the vacuum cups themselves.

Figure 21:
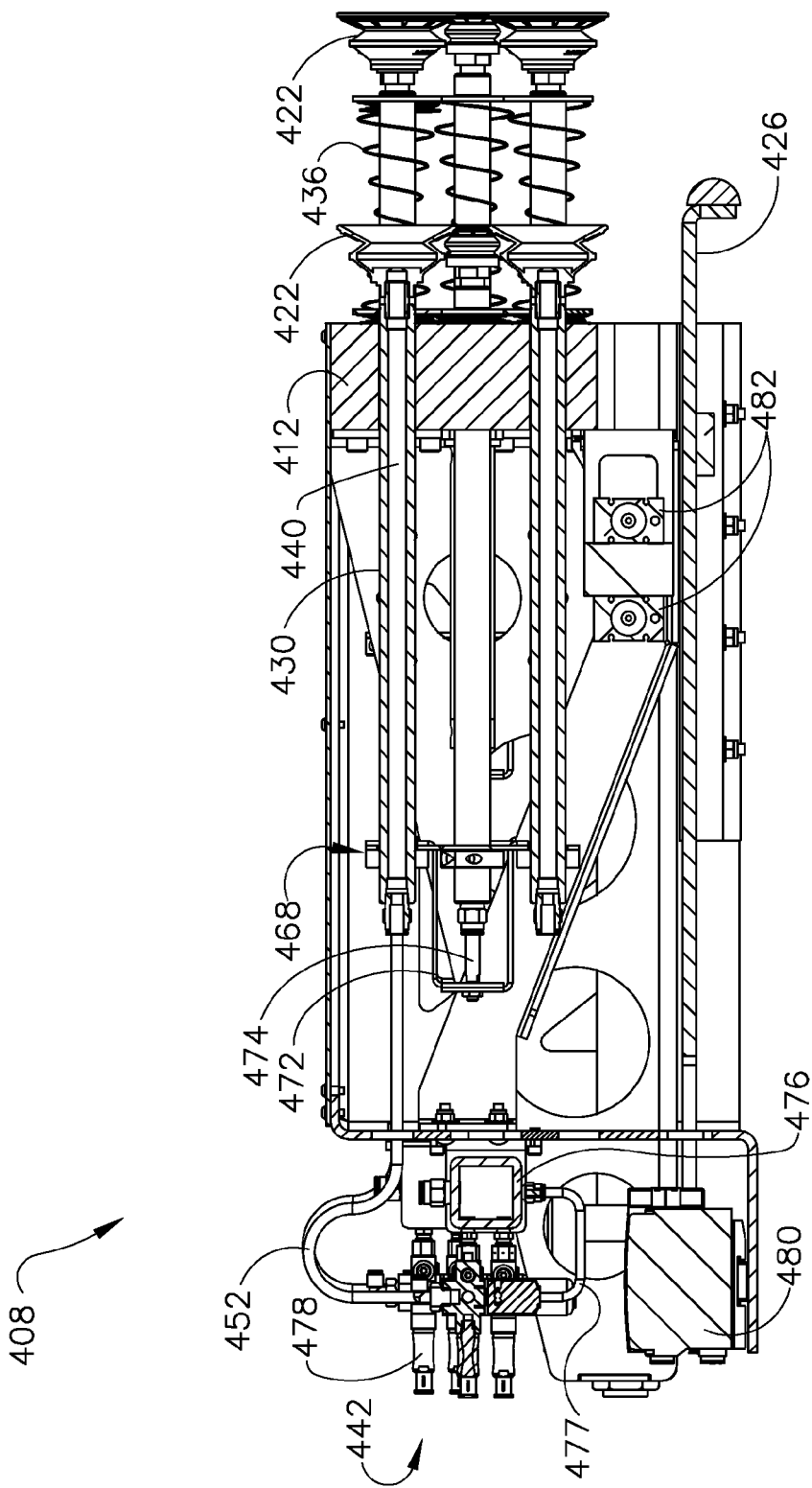
FIG. 21 is a side sectional view of the right side of the vacuum manipulator of FIG. 20.

FIG. 21 is a side sectional view of the right side of the vacuum manipulator 408 along the line A-A shown in FIG. 20. In FIG. 21, the central passage 440 and the pathway from the vacuum generator through the vacuum line 452 and vacuum coupling 432 is visible. Additionally, compressed fluid line 477 coupling the compressed fluid manifold 476 to the vacuum generator is illustrated. As illustrated in FIG. 21, the compression springs 436 for the second bank of vacuum rods are extended, while the compression springs 436 for the first bank of vacuum rods are compressed between the washer 438 and guide frame 412. Additionally, the side actuators 482 for the two vacuum cups of the right side bank of vacuum rods 444 are shown in FIG. 21.

Figure 22:
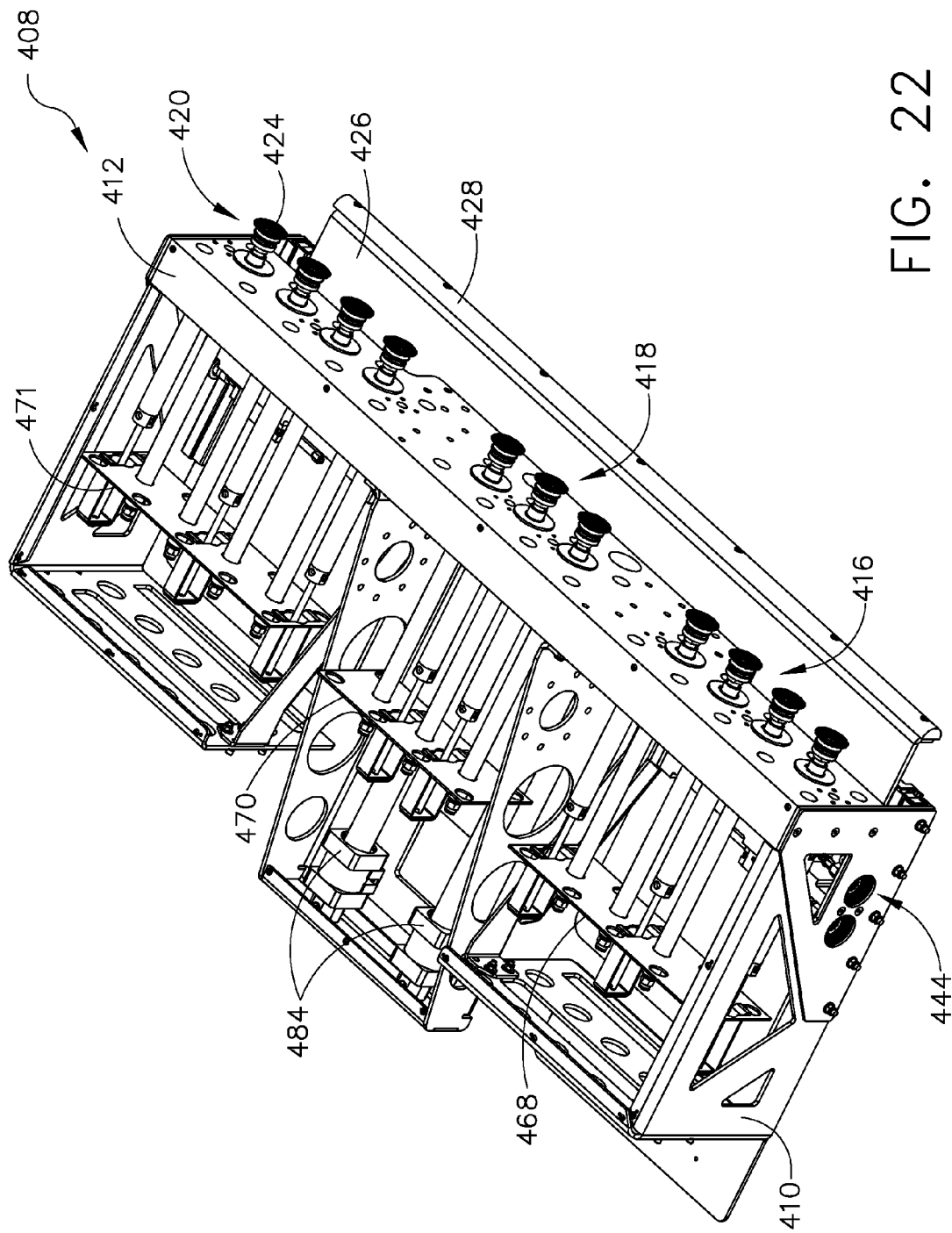
FIG. 22 is an isometric view of the right side of the vacuum manipulator of FIG. 14 with the top cover and various vacuum rods removed for clarity of illustration.

FIG. 22 is an isometric view of the right side of the vacuum manipulator 408 with the top cover and various vacuum rods removed for clarity of illustration. FIG. 22 illustrates the sliding shelf 426 retracted and all banks 416, 418, and 420 retracted. Additionally, the right side bank of vacuum rods 444 is retracted. The sliding shelf 426 may be coupled to one or more pneumatic cylinders 484, such as two pneumatic cylinders 484, that may drive the sliding shelf 426 in and out of the vacuum manipulator 408. In an embodiment, pneumatic cylinders 484 may be pneumatic rodless fluid (e.g., air) cylinders with magnetic coupling. Each pneumatic cylinder 484 may include an outside collar that slides on the outside of a fluid (e.g., air) cylinder and is magnetically coupled to an inside piston through the cylinder wall. The outside collars may be coupled to the sliding shelf 426 and as they piston drives forward or backward the magnetically coupled collars drive the sliding shelf 426 forward or backward, respectively. The magnetic coupling of the collars may provide a magnetic decoupling should the sliding shelf 426 impact the carton pile 11 with too high an impact force. In this manner, damage to the sliding shelf 426 and/or the carton pile 11 may be avoided. The collars may re-couple magnetically with the piston when the piston retracts. The pneumatic cylinders 484 may be coupled to the compressed fluid distributor 480 and received compressed fluid (e.g., air) to extend and retract the sliding shelf 426 based on the control and visualization system controlling the valves of the compressed fluid distributor 480.

Figure 23:
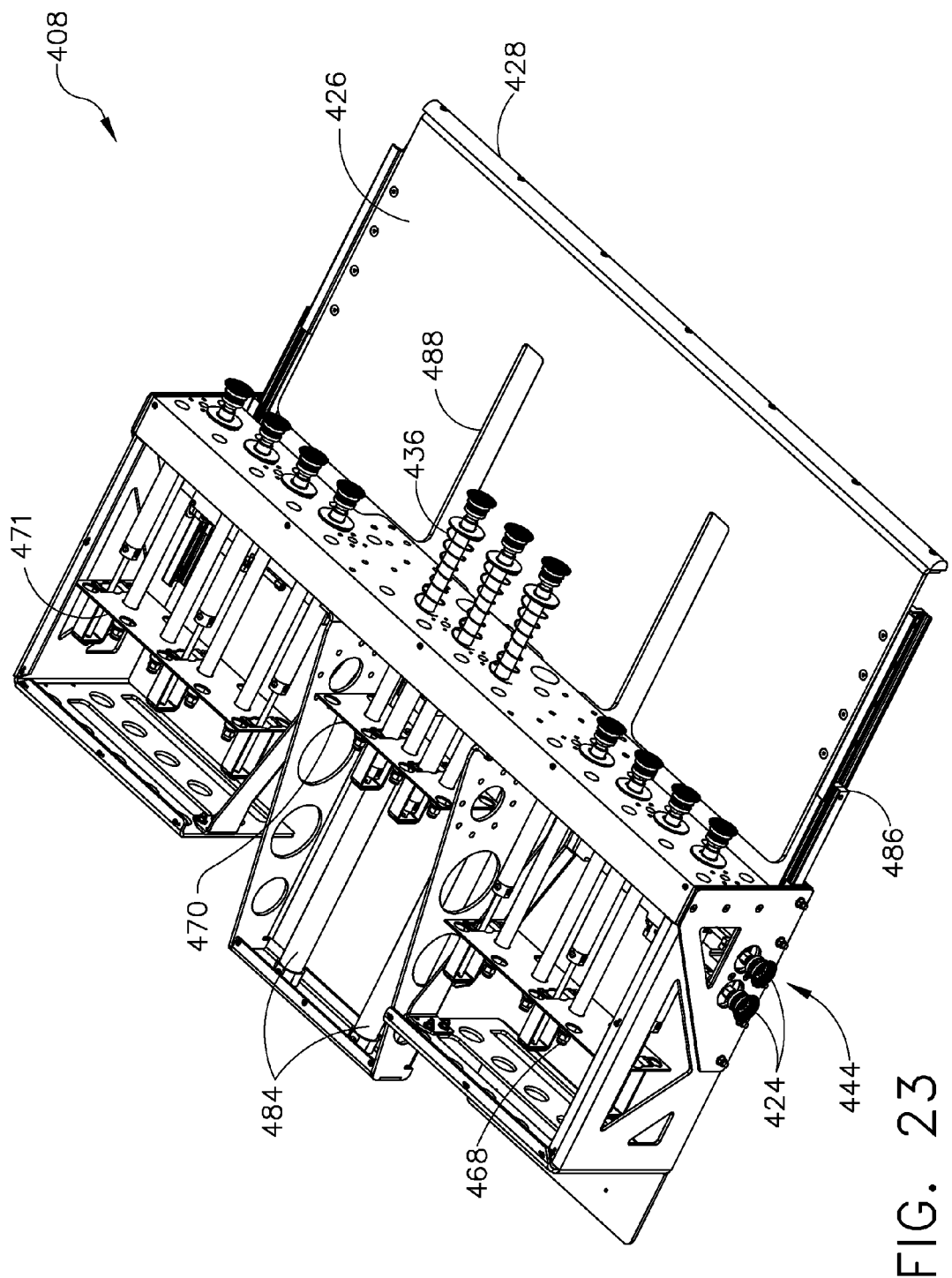
FIG. 23 is an isometric view of the right side of the vacuum manipulator of FIG. 22 with a second bank of vacuum rods, the right side bank of vacuum rods, and the sliding shelf extended.

FIG. 23 is an isometric view of the right side of the vacuum manipulator 408 with the second bank of vacuum rods 418, the right side bank of vacuum rods 444, and the sliding shelf 426 extended. Other vacuum rods have been removed for clarity of illustration. As illustrated in FIG. 23, when the sliding shelf 426 is extended the collars of the pneumatic cylinders 484 may be moved forward to extend the sliding shelf 426. In an embodiment, the sliding shelf 426 may slide forward on rails 486 mounted between the sliding shelf 426 and the manipulator frame 410. Rails 486 may be any type rails enabling the sliding shelf 426 to extend from and retract into the vacuum manipulator, such as roller slides. The sliding shelf 426 may be a continuous shelf or a modular shelf and may include various shelf cutouts 488.

FIG. 23 also shows that the plate 470 associated with the second bank of vacuum rods 418 may move forward when the vacuum rods are extended by the compression springs 436, while the first plate 468 and third plate 471 remain retracted all the way back, thereby compressing the compression springs 436.

Figure 24:
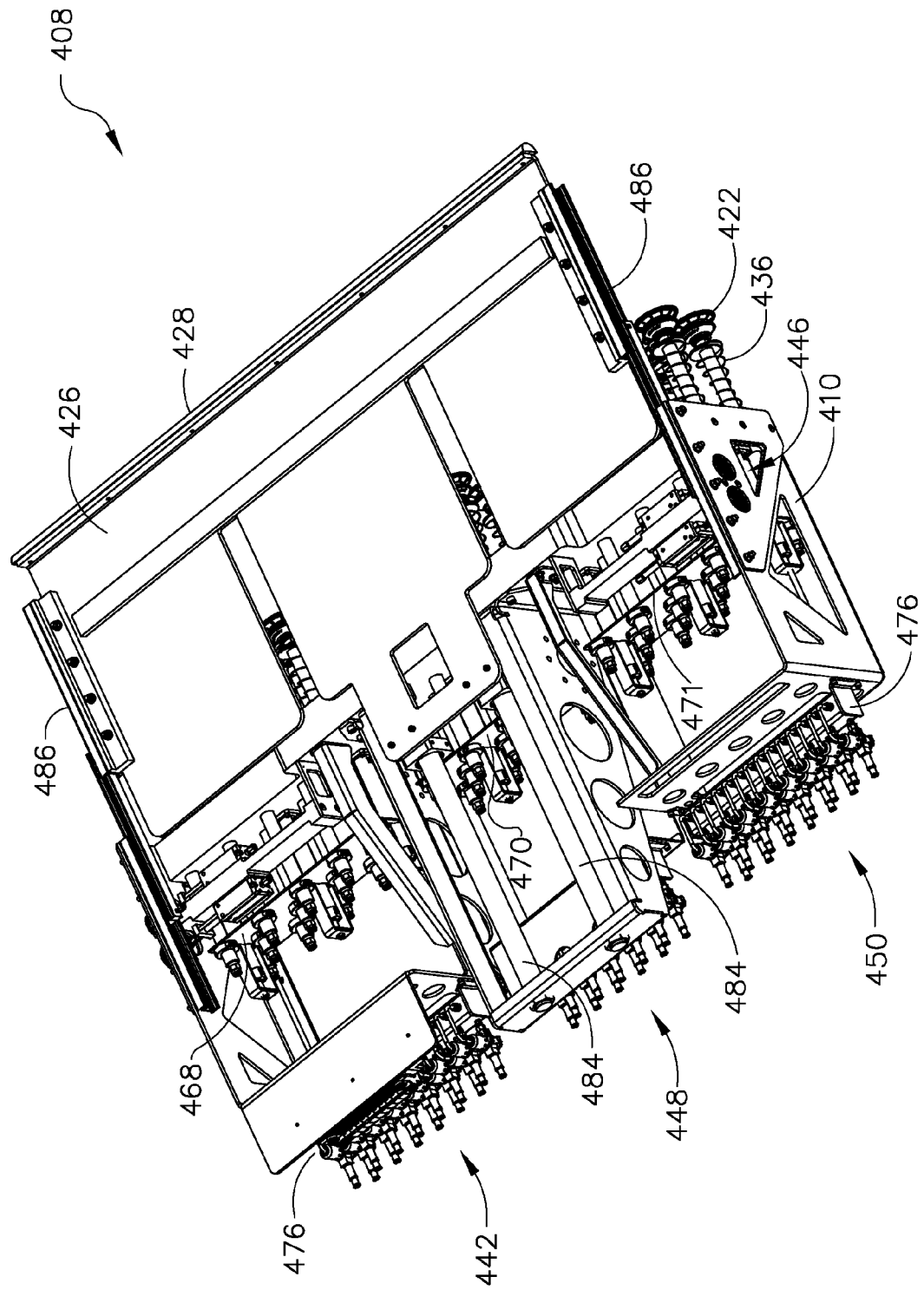
FIG. 24 is an isometric view of the left under-side of the vacuum manipulator of FIG. 14 with the sliding shelf and first, second, and third banks of vacuum rods extended.
Figure 25:
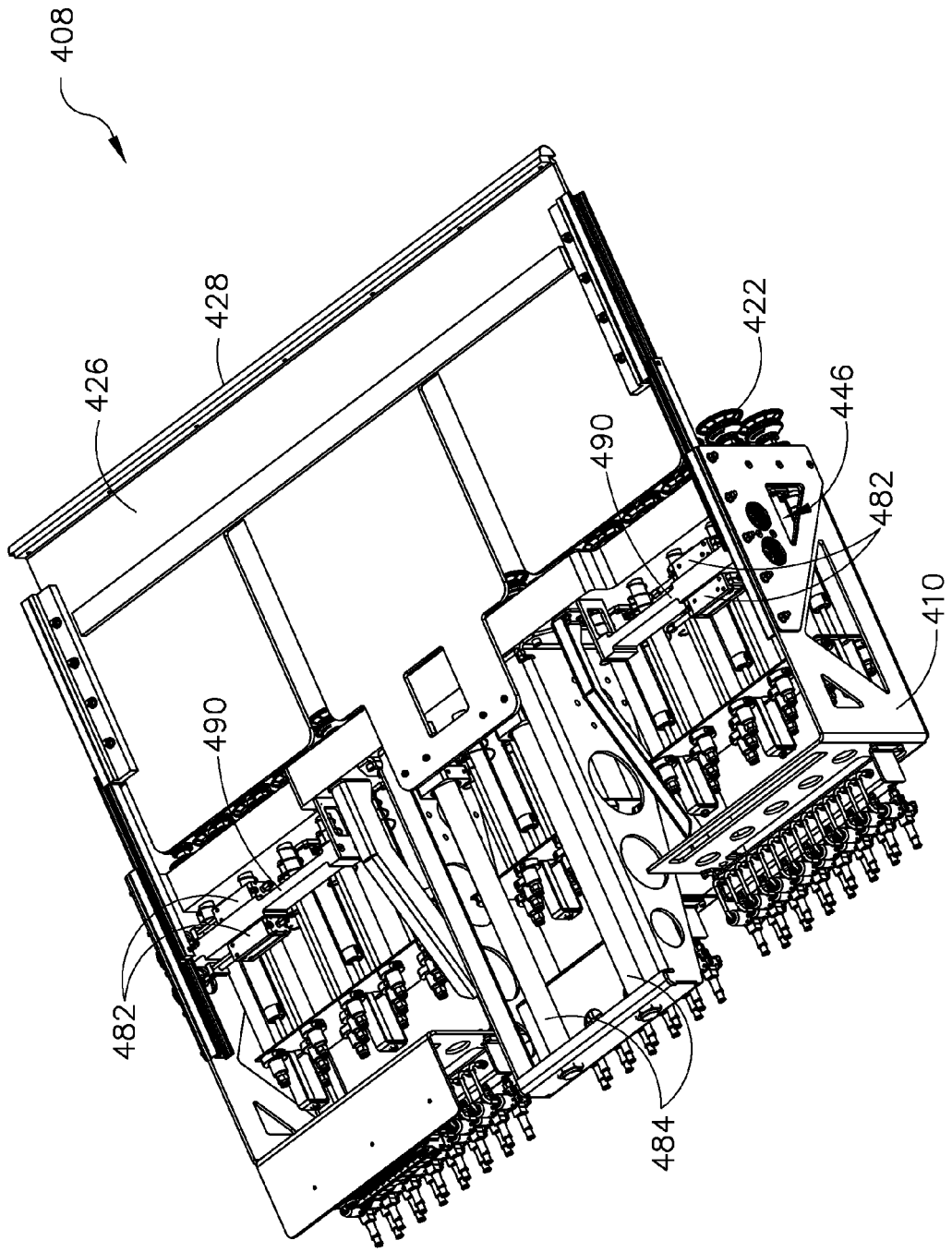
FIG. 25 is an isometric view of the left under-side of the vacuum manipulator of FIG. 24 with the sliding shelf extended and first, second, and third banks of vacuum rods retracted.

FIG. 24 is an isometric view of the left under-side of the vacuum manipulator 408 with the sliding shelf 426 and banks of vacuum rods 416, 418, and 420 extended. Because all banks of vacuum rods 416, 418, and 420 are extended, all plates 468, 470, and 471 are pulled forward to the same location. The collars of the pneumatic cylinders 484 may also be seen pushed forward with the sliding shelf 426. The left side bank of vacuum rods 446 is illustrated retracted. FIG. 25 is an isometric view of the left under-side of the vacuum manipulator 408 with the sliding shelf 426 extended and banks of vacuum rods 416, 418, and 420 retracted. The extension rods of the retraction cylinders 474 are all extended driving the plates 468, 470, and 471 reward and compressing the compression springs 436 as the washers 438 and vacuum cups are pulled back to the guide frame 412. FIG. 25 also illustrates the underside view of the side actuators 482 for the right side bank of vacuum rods 444 and the left side bank of vacuum rods 446. The side actuators 482 may be affixed to cross beams 490 running parallel to the guide frame 412.

FIGS. 26A, 26B, 27A, 27B, 28A, 28B, 29A, and 29B are partial top and side sectional views, respectively, of the left side of the vacuum manipulator 408 in contact with the carton pile 11 at various times during carton removal operations. Only the vacuum rods with minor vacuum cups 424 are illustrated for clarity.

Figure 26B:
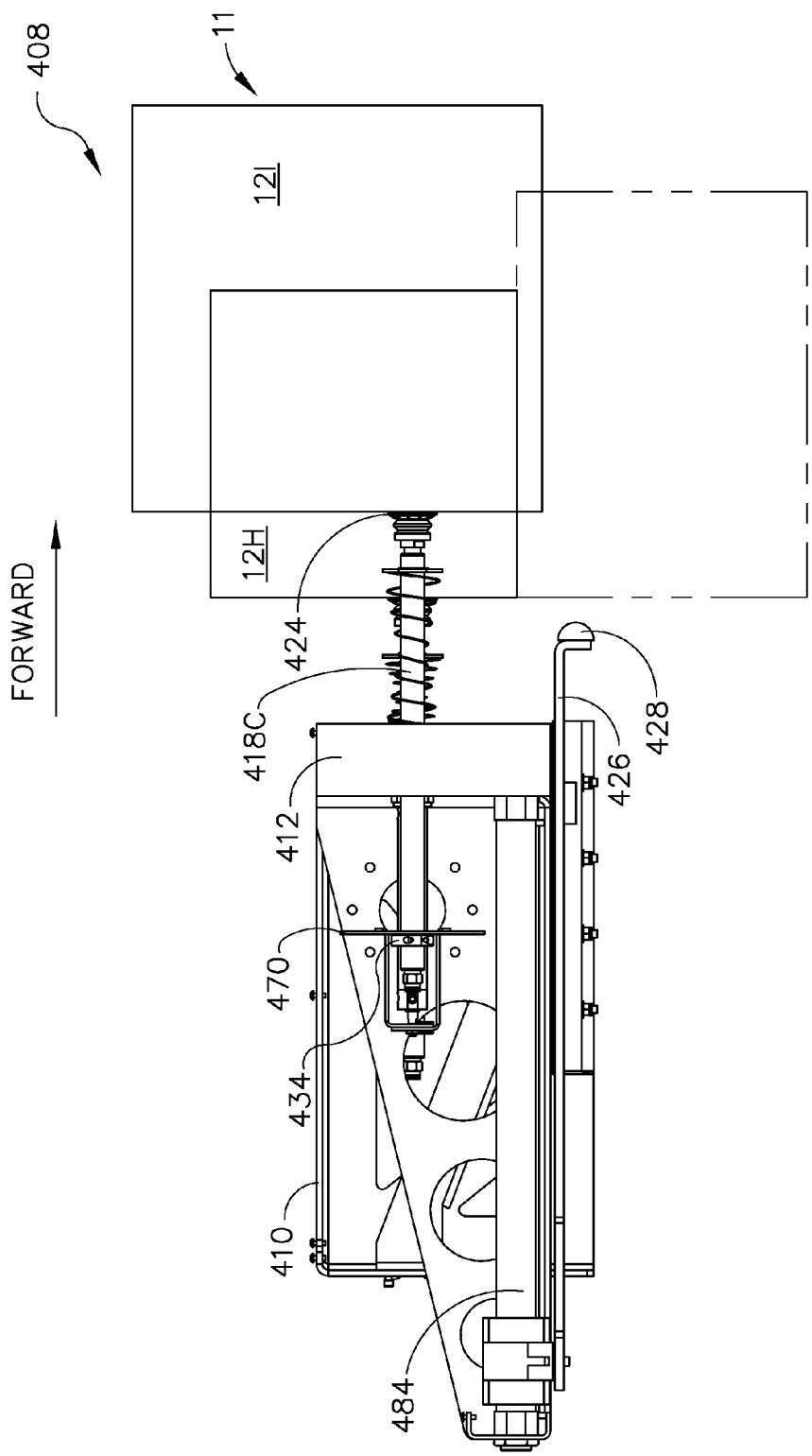
FIG. 26B is a side sectional view of the vacuum manipulator of FIG. 26A.

Initially during carton removal operations, the control and visualization system may measure the distance to the carton pile 11, such as using a sensor (e.g., a camera other type of carton sensor), and position the vacuum manipulator 408 an initial distance from the face of the carton pile 11. As illustrated in FIGS. 26A and 26B, at a first time after positioning the vacuum manipulator 408, the compressed fluid to the retraction cylinders 474 associated with the second bank of vacuum rods 418 and the third bank of vacuum rods 420 may be de-energized, thereby allowing the compression springs 436 to drive the second bank of vacuum rods 418 and third bank of vacuum rods 420 forward until the various vacuum cups contact (or engage) the cartons 12H and 12I to be removed. Carton 12H may be closer to the vacuum manipulator 408 than carton 12I, so the vacuum rods 420A, 420B, and 420C, may not extend as far as vacuum rods 420D, 418A, and 418B. Vacuum rod 418C may extend fully until its stop 434 contacts plate 470 because no carton is present in front of vacuum rod 418C to impede its extension. The sliding shelf 426 may remain retracted. As illustrated in FIG. 26A, the ability of each vacuum rod 420A, 420B, 420C, 420D, 418, 418B, and 418C to extend and deflect independently over a range enables the conformable face of the vacuum manipulator 408 formed by the banks of vacuum rods 418 and 420 to conform to the shape of the face of the carton pile 11, thereby conforming to the irregularities of the carton pile 11. For example, when the rods 420A, 420B, 420C, 420D, 418A, 418B, and 418C are extended the full extension range initially and the vacuum manipulator 408 is driven forward into the carton pile 11, the rods 420A, 420B, and 420C contacting closer box 12H may deflect further backward than the rods 420D, 418A, and 418B contacting farther box 12I. In an embodiment, the extension range may be 9.5 inches, greater than 9.5 inches, or less than 9.5 inches. The vacuum cups may be enabled to deflect the full extension range plus their own deflection depth. A vacuum cup may be deflected the full extension range by the surface of a carton until the vacuum rod spring 436 and washer 438 contact the guide frame and still further back the deflection distance of the vacuum cup itself. For example, when the deflection depth of the vacuum cup is 1.19 inches from the edge of the vacuum cup to the forward end of the hollow guide rod 430 and the extended range is 9.5 inches, the vacuum cup may deflect a maximum distance of 10.69 inches from its max extension to max deflection. As another example, when the rods 420A, 420B, 420C, 420D, 418A, 41.8B, and 418C are retracted initially and the vacuum manipulator 408 is driven forward before the rods are extended, the rods 420A, 420B, and 420C contacting closer box 12H may extend a shorter distance forward than the rods 420D, 418A, and 418B contacting farther box 12I which may extend the full extension range. The ability of the vacuum rods to extend beyond the retracted state may enable cartons set back from the face of the carton pile 11 to be reached/grasped while cartons at or extending from the face of the carton pile 11 are also reached/grasped. In this manner, the vacuum manipulator 408 may conform to an uneven carton pile 11 and unload cartons at different depths in the carton pile 11 at the same time.

Figure 27A:
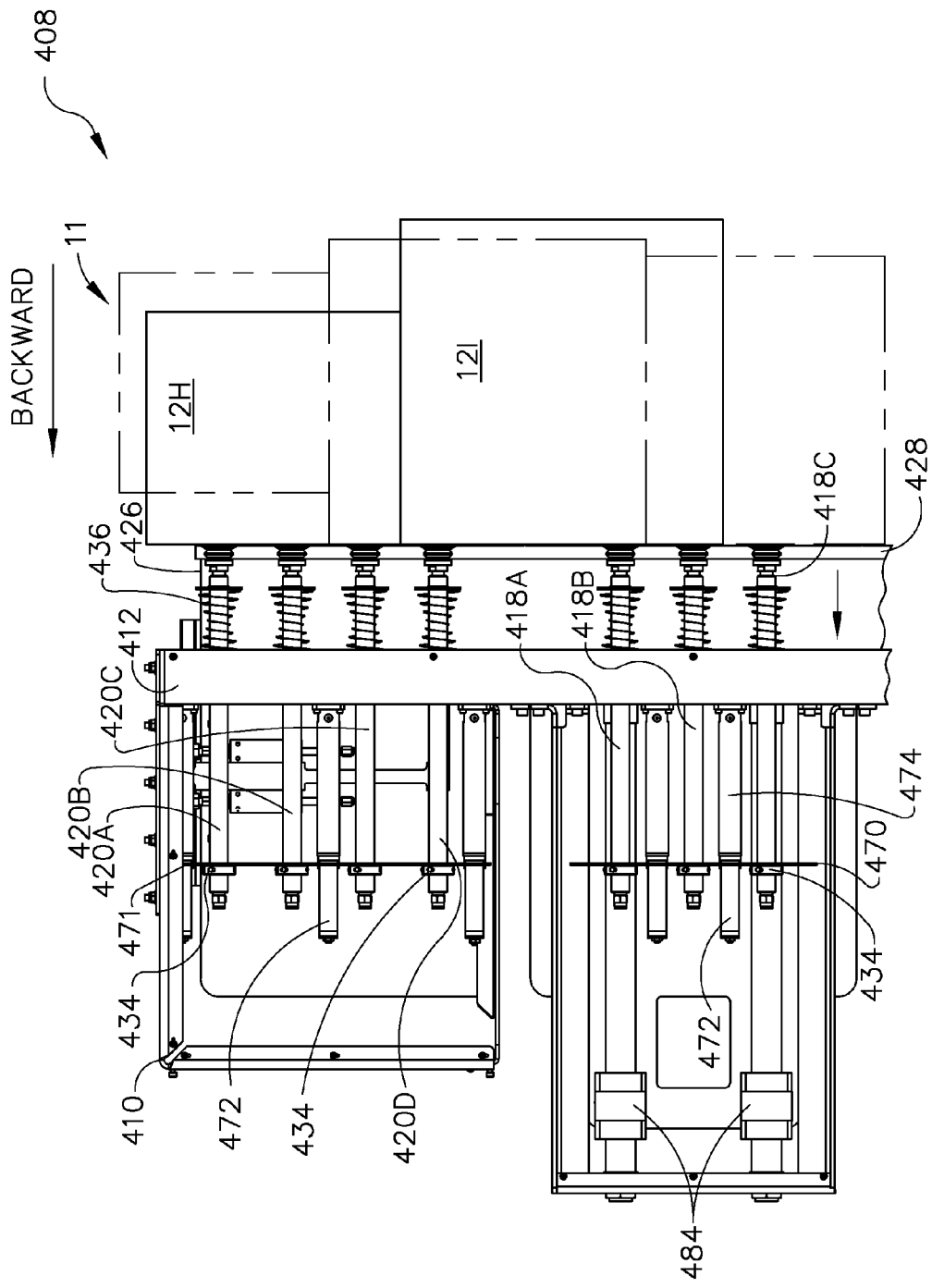
FIG. 27A is a partial top view of the left side of the vacuum manipulator of FIG. 26A in contact with the carton pile at a second time during carton removal operations.
Figure 27B:
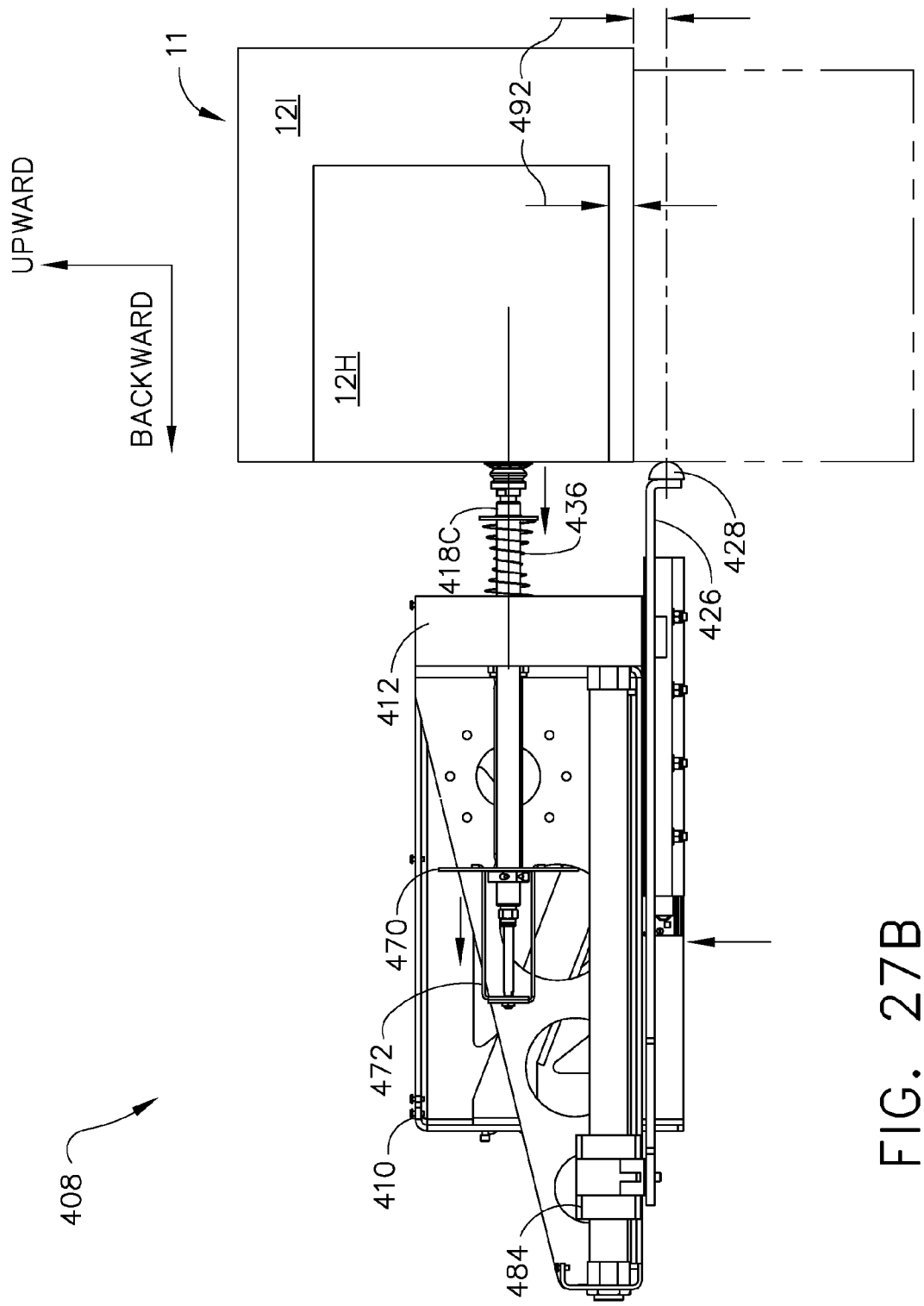
FIG. 27B is a side sectional view of the vacuum manipulator of FIG. 27A.
Figure 28A:
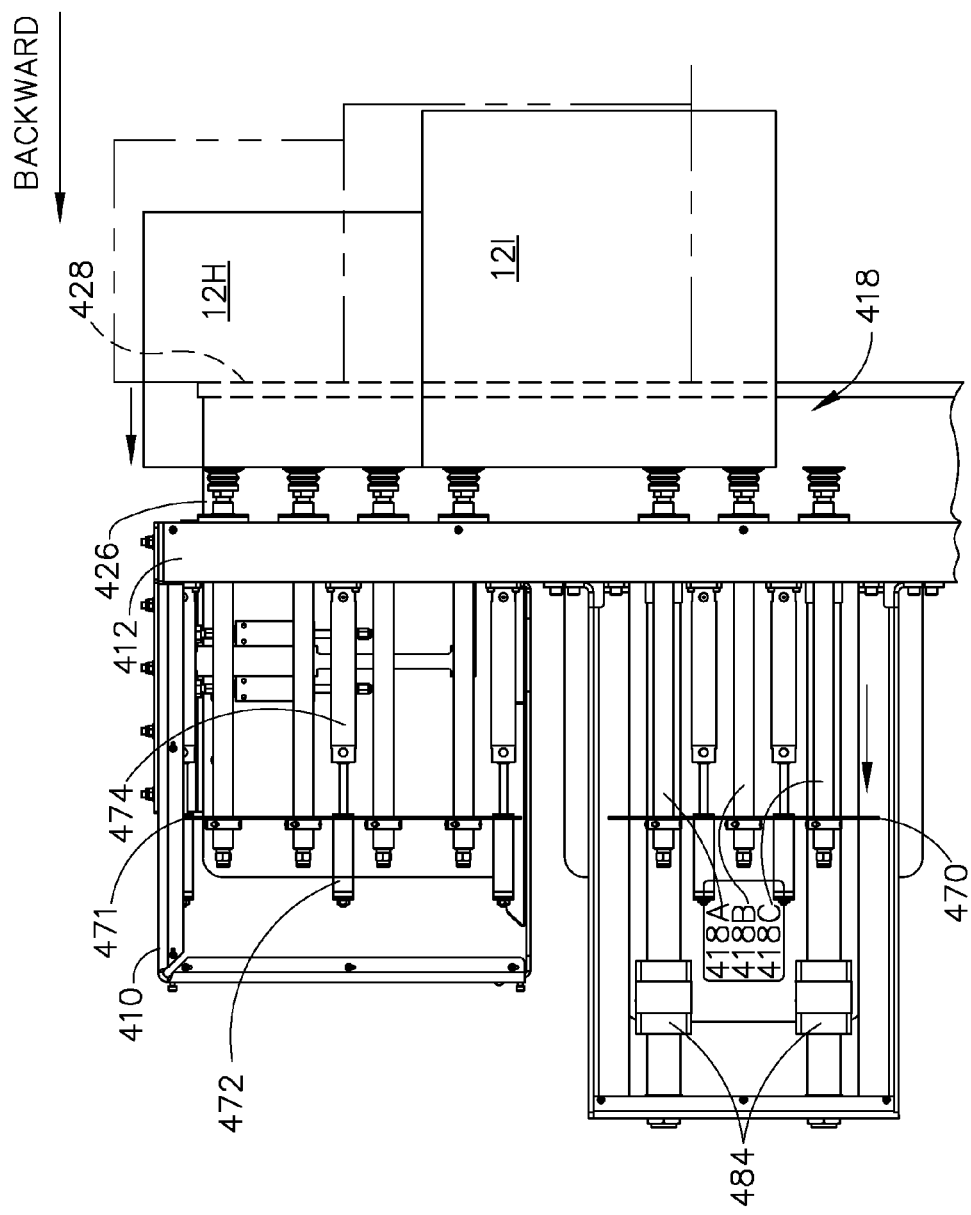
FIG. 28A is a partial top view of the left side of the vacuum manipulator of FIG. 27A in contact with the carton pile at a third time during carton removal operations.
Figure 28B:
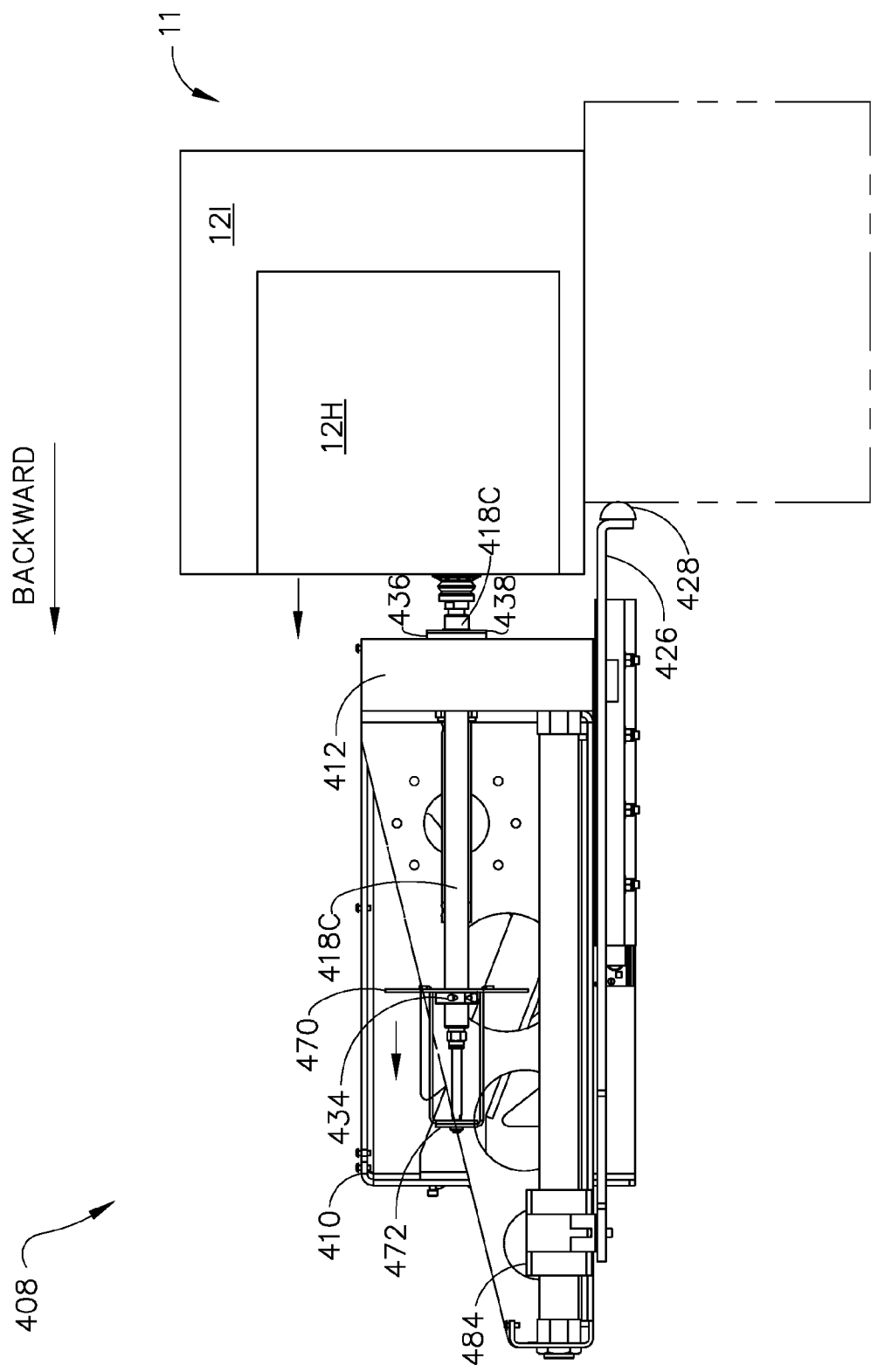
FIG. 28B is a side sectional view of the vacuum manipulator of FIG. 28A.
Figure 29A:
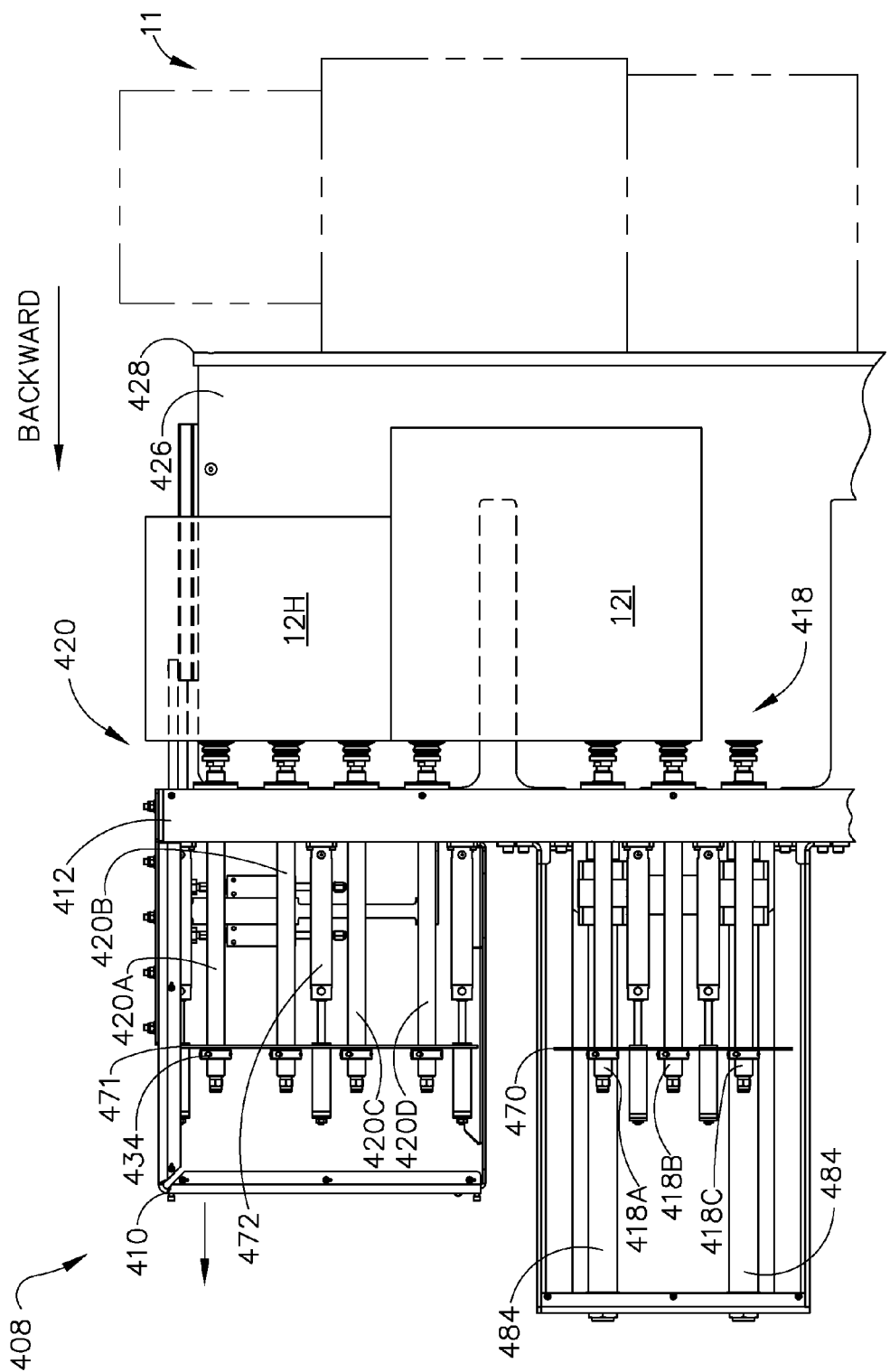
FIG. 29A is a partial top view of the left side of the vacuum manipulator of FIG. 28A in contact with the carton pile at a fourth time during carton removal operations.
Figure 29B:
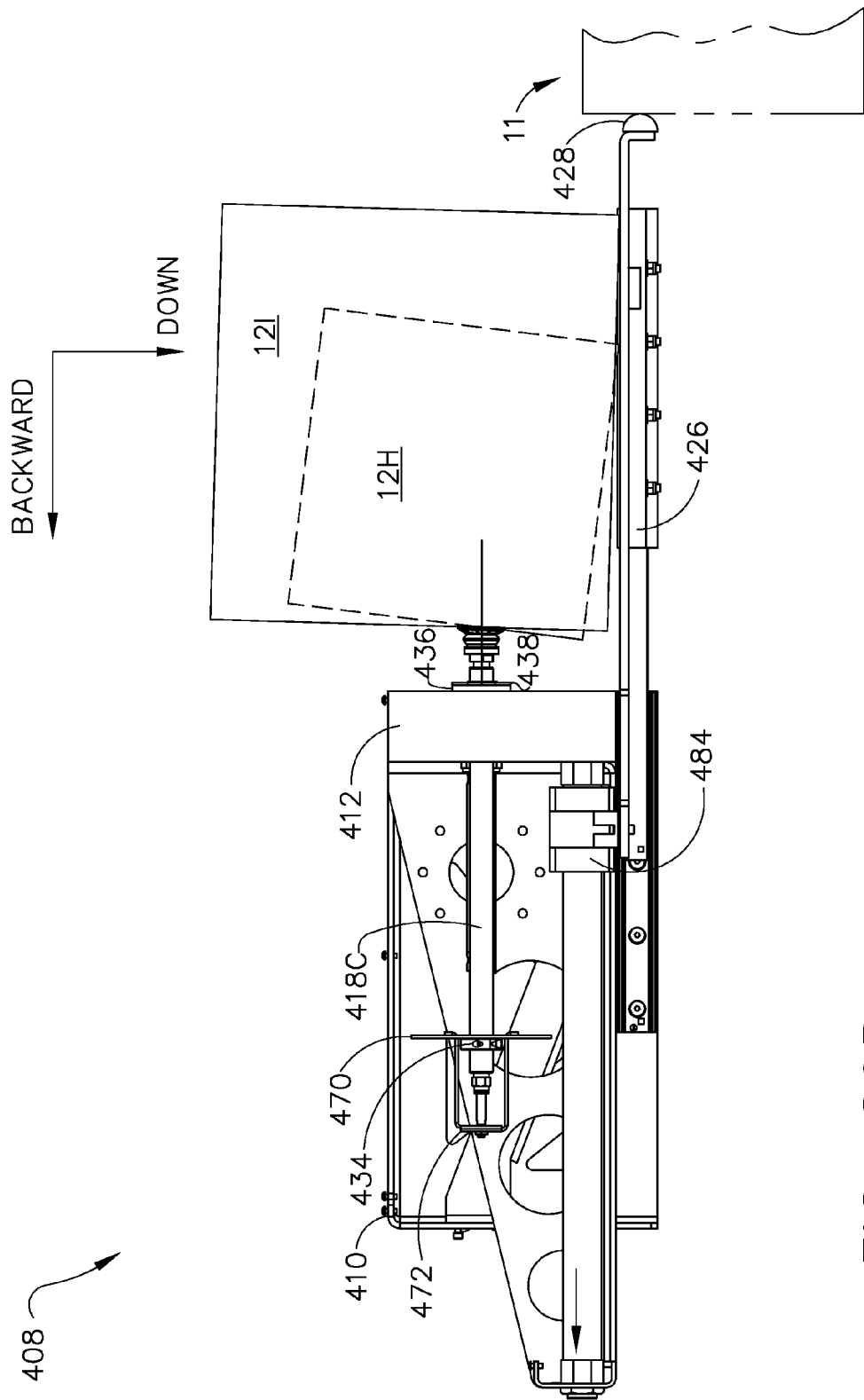
FIG. 29B is a side sectional view of the vacuum manipulator of FIG. 29A.

As illustrated in FIGS. 27A and 27B, at a second time the vacuum may be applied by the vacuum generators to the second bank of vacuum rods 418 and the third bank of vacuum rods 420 to grip the cartons 12H and 12I with the vacuum cups via suction thereby effectively attaching the vacuum rods 420A, 420B, 420C, 420D, 418A, and 418B to the cartons 12H and 12I. The compressed fluid may be energized to the retraction cylinders 474 which may drive the plates 470 and 471 backward. Vacuum rods at or near full extension, such as vacuum rods 420D, 418A, 418B, and 418C may begin retracting as the plates 470 and 471 start to move backwards because these vacuum rods' stops 432 may already be in contact with the plates 470 and 471, while vacuum rods not full extended, such as vacuum rods 420A, 420B, and 420D may remain stationary until their respective stops 432 are contacted by the plates 470 and 471 moving backward. In this manner, there may be a "dead zone" in which though a vacuum has been applied and the vacuum manipulator 408 has started to move some cartons, such as carton 12I, farther from the vacuum manipulator other closer cartons, such as carton 12H remain stationary. The sequential movement of cartons 12H and 12I based on their distance from the vacuum manipulator 408 and its resulting impact on the stops 432 being contacted by the plates 470 and 471 may align the carton line being removed. Additionally, the vacuum manipulator 408 may be raised a height 492 from its initial position by the robotic positioner 406 to lift the cartons 12H and 12I. The height 492 may be any height, for example the height 492 may be two inches. Further the sliding shelf 426 may be extended forward from the vacuum manipulator 408 to place the bumper 428 against the carton pile 11 to stabilize the carton pile 11 below the cartons 12H and 12I being dislodged (e.g., removed). As illustrated in FIGS. 28A and 28B, the plates 470 and 471 may be pushed backwards until the compression springs 436 are fully compressed. Once the compression springs 436 are fully compressed, as illustrated in FIGS. 29A and 29B, the robotic positioner 406 may be actuated to retract the vacuum manipulator 408 while the sliding shelf 426 is further extended away from the front face of the guide frame 412. In an embodiment, the sliding shelf 426 may be extended as the vacuum manipulator 408 is retracted, such that the sliding shelf 426 extends to over fifty percent of the distance to the center of gravity of the cartons 12H and 12I being removed. Once the cartons 12H and 12I are full supported by the sliding shelf 426, the sliding shelf 426 may retract and/or pivot or rotate down and the suction may be released for the vacuum cups, thereby dropping the cartons 12H and 12I onto a conveyor system.

Figure 30A:
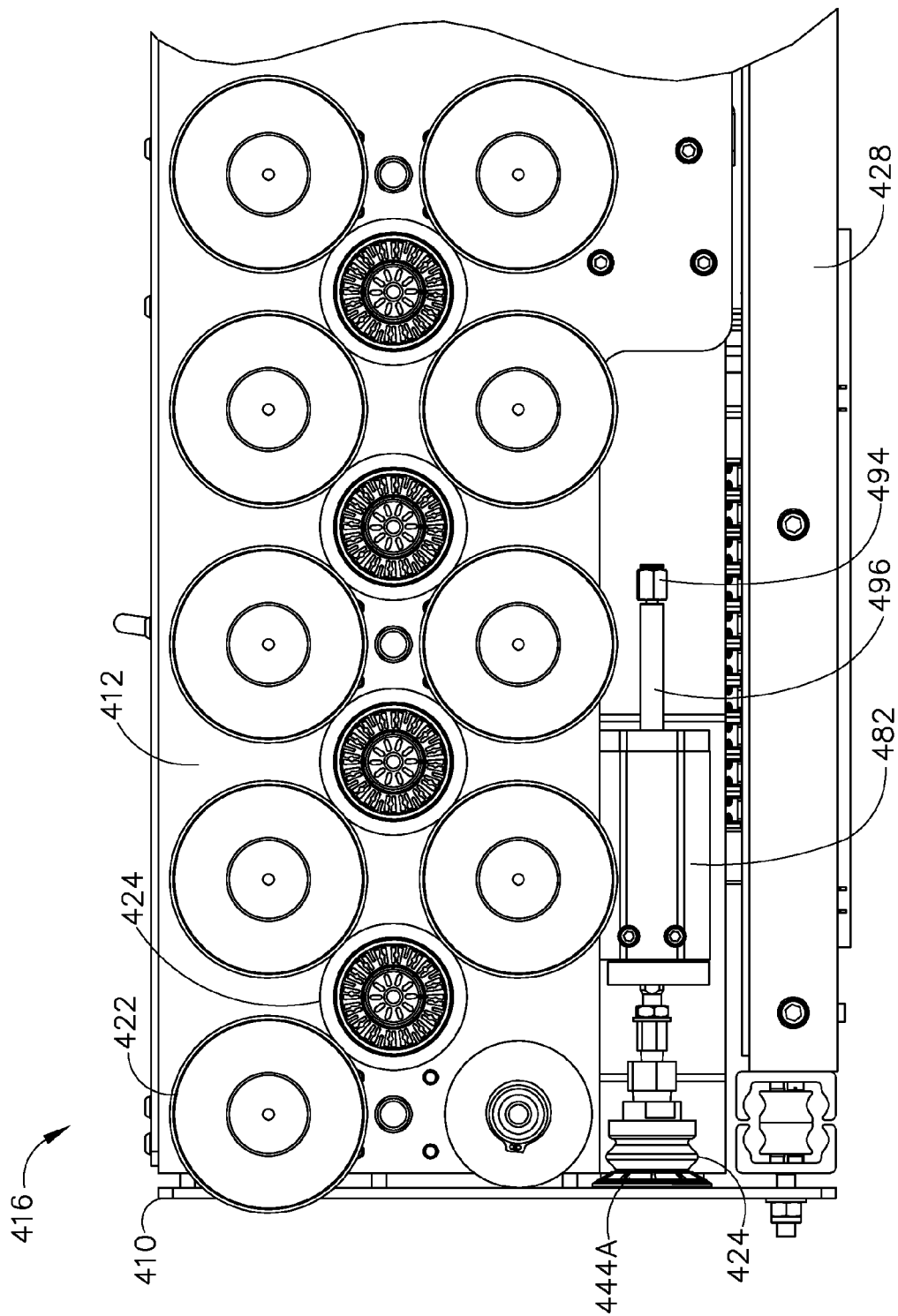
FIG. 30A is a partial front side view of the vacuum manipulator of FIG. 14 with the right side bank of vacuum rods retracted.
Figure 30B:
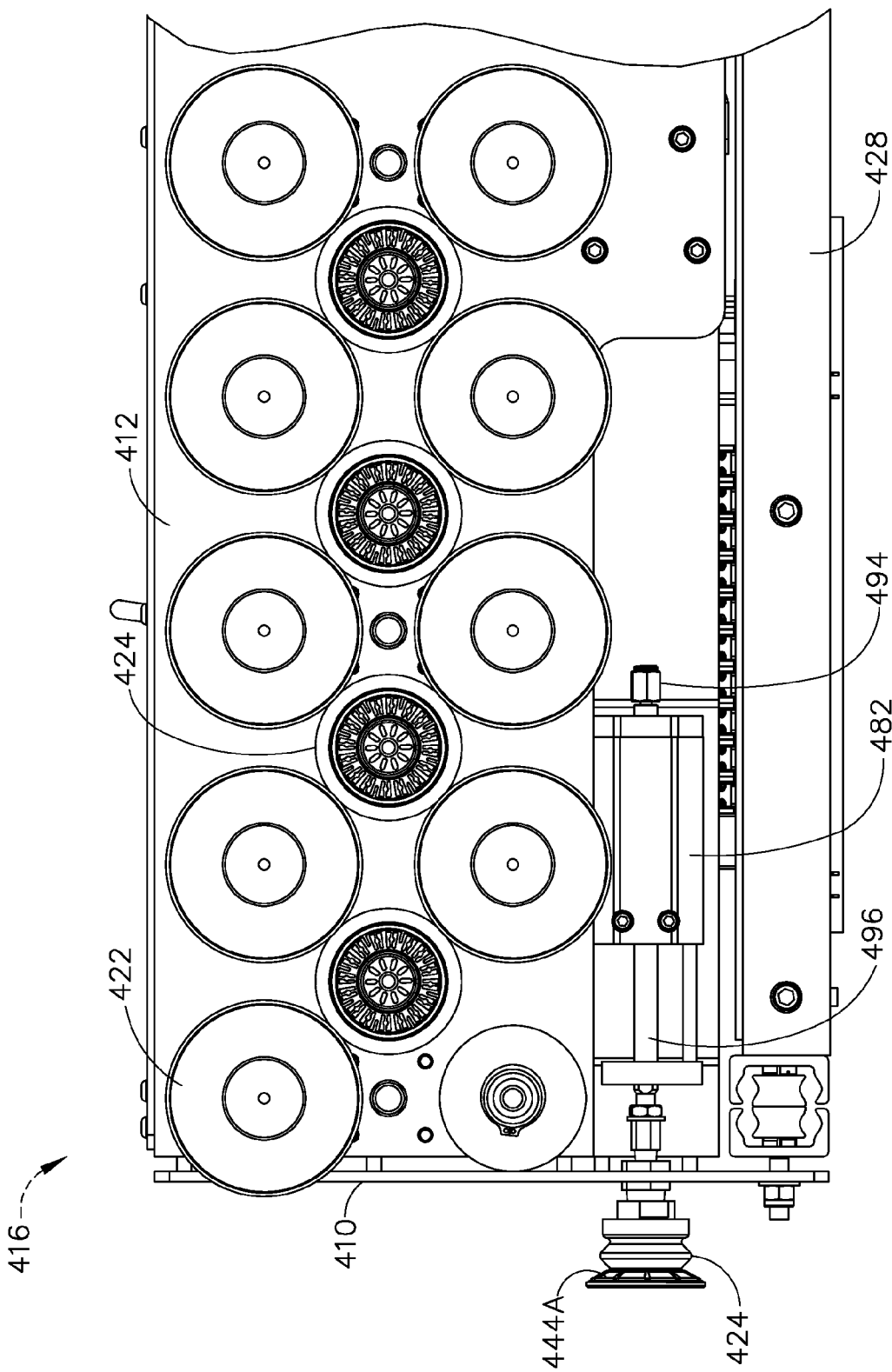
FIG. 30B is a partial front side view of the vacuum manipulator of FIG. 30A with the right side bank of vacuum rods extended.

FIG. 30A is a partial front side view of the vacuum manipulator 408 with the right side bank of vacuum rods 444 retracted. On major vacuum cup 422 of the first bank of vacuum rods 416 is removed for clarity of illustration. The right side bank of vacuum rods 444 may be extended and refracted by a side actuator 482 which may be an electric or pneumatic actuator that may drive hollow guide rod 496 to extend vacuum cups 424 into and out of the right side of the manipulator frame 410. A vacuum coupling 494 may connect the guide rod 496 to a vacuum generator via a vacuum line to draw fluid (e.g., air) through the vacuum cup 424, the guide rod 496, and the vacuum coupling 494. FIG. 30B is the same view as FIG. 30A, except that the guide rod 496 is extended pushing the vacuum cup 424 out from the manipulator frame 410. In this manner, the right side bank of vacuum rods 444 may be extended and retracted to dislodge (e.g., remove) boxes on the right side of the vacuum manipulator 408. The left side bank of vacuum rods 446 may be configured in a similar manner to extend out the left side of the manipulator frame 410.

Figure 31:
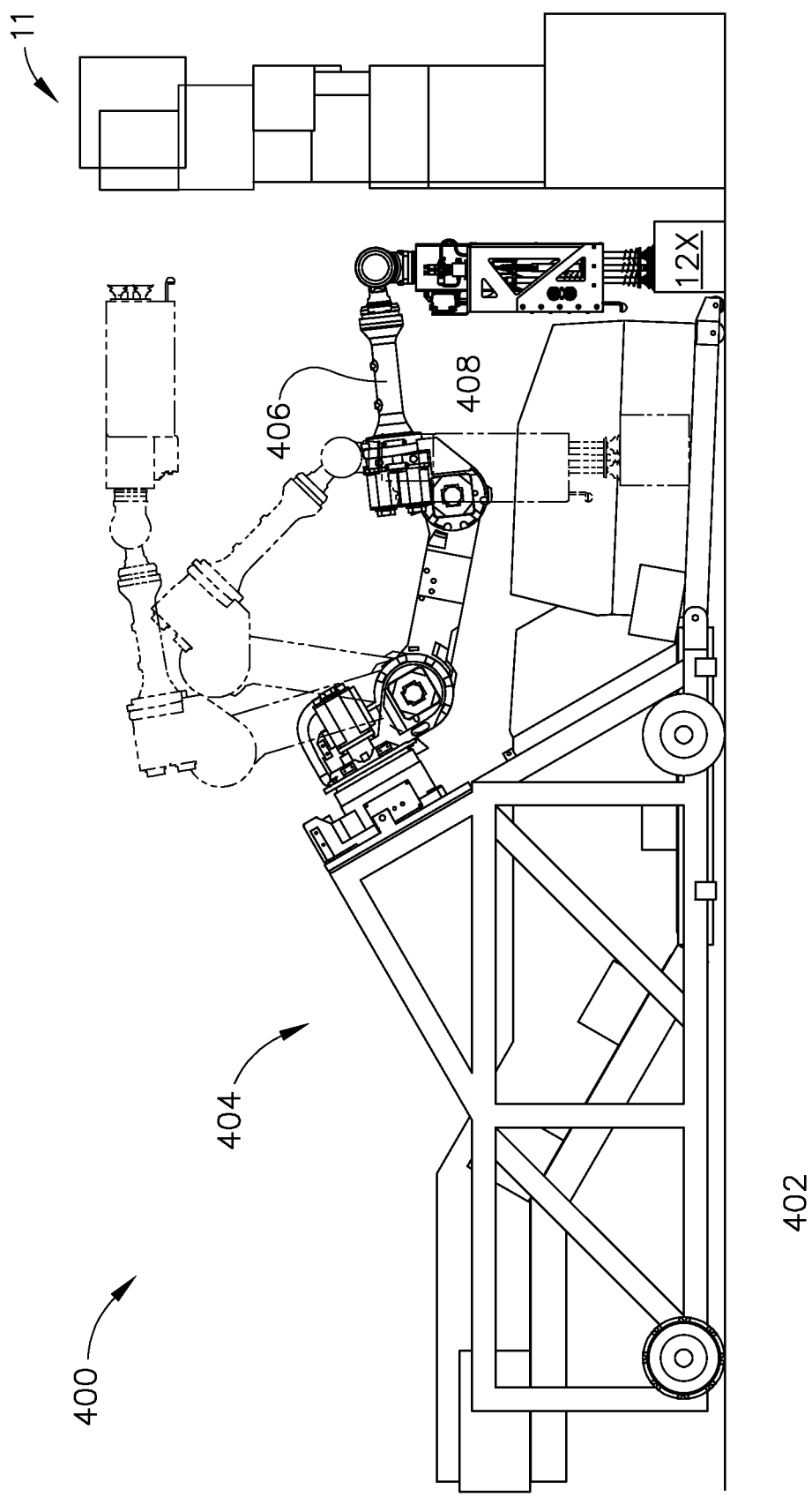
FIG. 31 is a right side sectional view of the robotic carton unloader of FIG. 14 extended to remove cartons from a floor of the truck.

FIG. 31 is a right side sectional view of the robotic carton unloader 400 extended to remove cartons from a floor of the truck or trailer. In an embodiment, the vacuum manipulator 408 may rotate down, such as 90 degrees, to face the vacuum cups toward the floor of the truck or trailer. In this manner, the vacuum cups may contact (or engage) a top of carton 12X on the floor of the truck or trailer. A vacuum may be applied by the vacuum generators to vacuum rods to grip the carton 12X with the vacuum cups via suction, and the robotic positioner 406 may be articulated to lift the vacuum manipulator 408 and carton 12X to move the carton to the conveyor system. FIG. 31 also illustrates in dotted line a first position of the vacuum manipulator 408 with the conformable face directed towards the carton pile 11, and a third position of the vacuum manipulator depositing the carton 12X on the conveyor system.

Figure 32A:
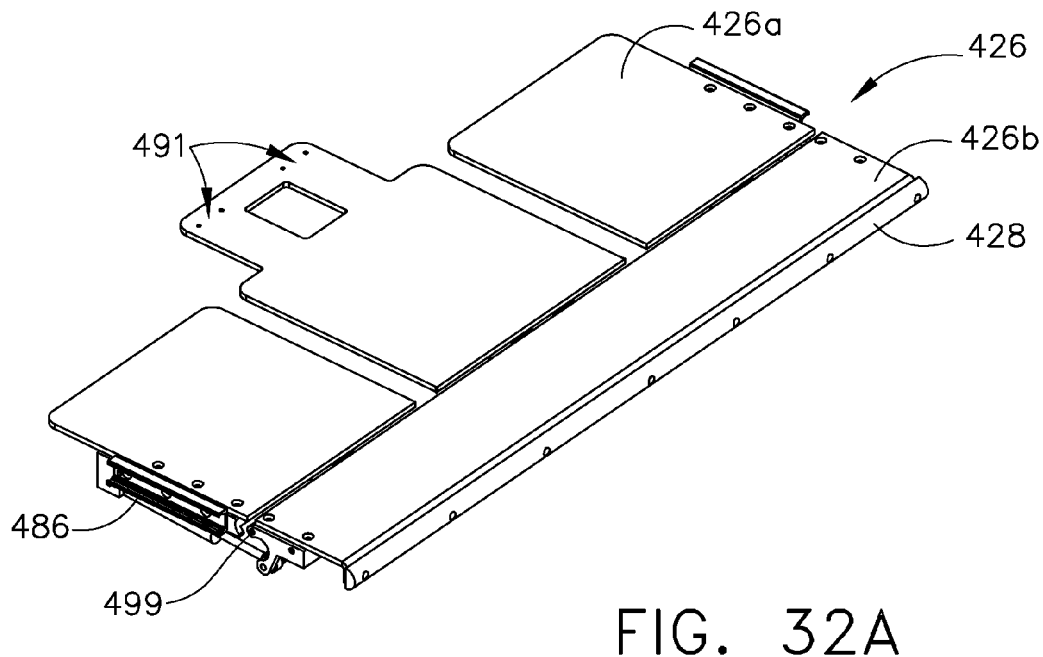
FIG. 32A is a right side isometric view of a pivoting shelf according to an embodiment.
Figure 32B:
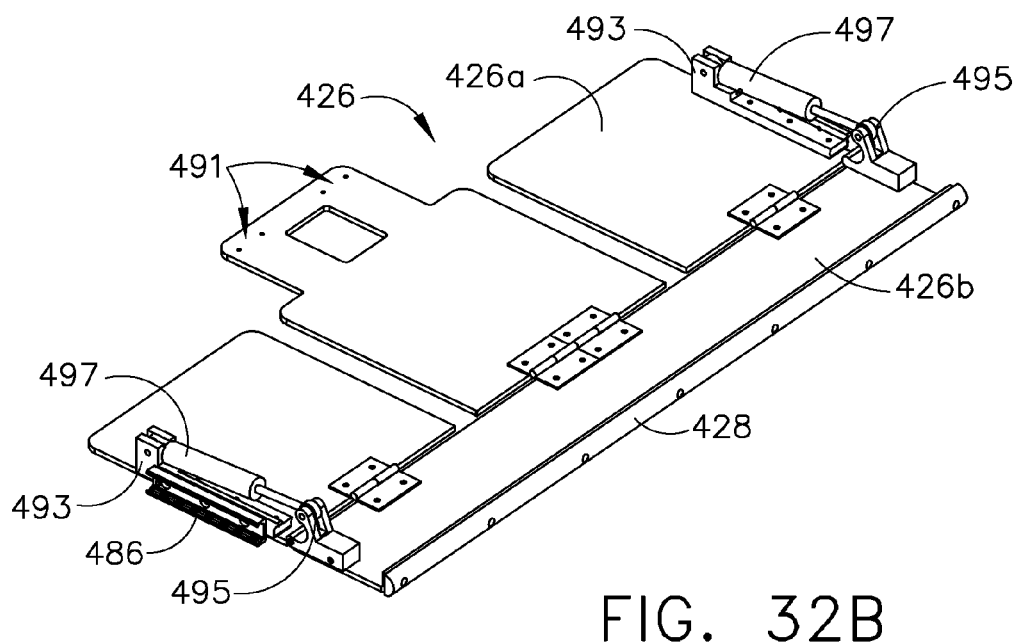
FIG. 32B is a left under-side isometric view of a pivoting shelf according to an embodiment.

In an embodiment, the sliding shelf 426 may pivot or rotate to swing down from a position parallel to the extension direction of the forward facing vacuum rods to a position perpendicular to forward facing vacuum rods. In an embodiment, the entire sliding shelf 426 may pivot or rotate. In another embodiment, a portion of the sliding shelf 426 may pivot or rotate. For example, a pivoting portion of the sliding shelf may be attached by a hinge or other type joint to a stationary portion of the sliding shelf and the pivoting portion may pivot or rotate relative to the stationary portion. FIG. 32A is a right side isometric view of a pivoting sliding shelf 426 according to an embodiment and FIG. 32B is a left under-side isometric view of the same pivoting sliding shelf 426. The pivoting sliding shelf 426 may comprise a stationary shelf 426a and pivoting shelf or tray 426b to which bumper 428 may be connected. The stationary shelf 426a may include attachment points 491 for pneumatic cylinders 484 to attach to the stationary shelf 426a to drive the pivoting sliding shelf 426 into and out of the manipulator frame 410. In an embodiment the pivoting shelf or tray 426b may be rotationally coupled to the stationary shelf 426a and/or to the rails 486, such as by one or more hinges 499. In an embodiment, pistons 497, such as a pneumatic pistons, may be coupled between brackets 493 mounted to the stationary shelf 426a and protruding arms 495 of the pivoting shelf or tray 426b. The extension of the rods of the pistons 497 may raise and lower the pivoting shelf or tray 426b.

Figure 33A:
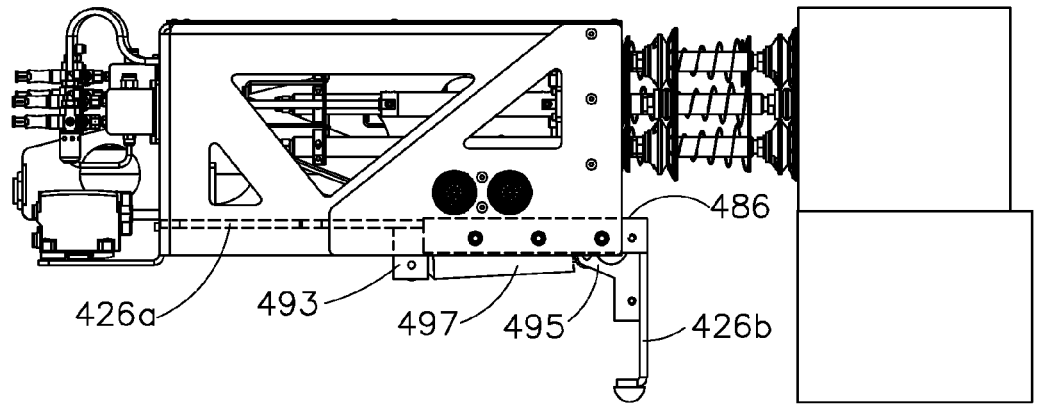
FIGS. 33A-C are right side views of a pivoting shelf transitioning from a rotated down state to a rotated up state.
Figure 33B:
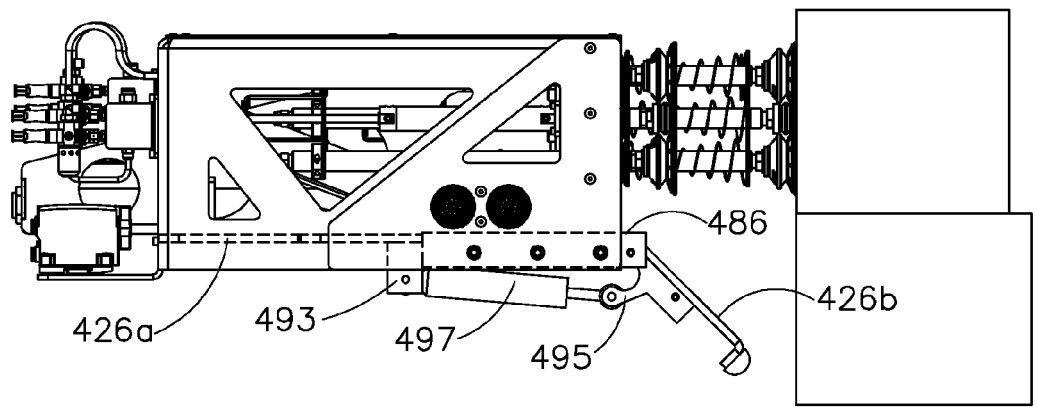
Figure 33C:
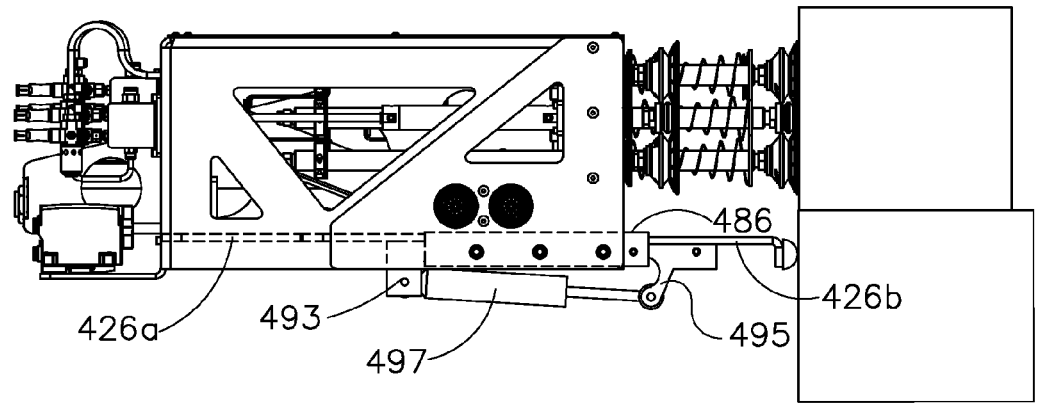

FIGS. 33A-B are right side views of a manipulator including pivoting shelf or tray 426b transitioning from a rotated down state to a rotated up state. FIG. 33A illustrates the pivoting shelf or tray 426b rotated down, perpendicular to the stationary shelf 426a. The rod of the piston 497 may be refracted pulling the pivoting shelf or tray 426b down. In an embodiment, the pivoting shelf or tray 426b may be rotated down to drop cartons onto a conveyor system and/or to enable the vacuum cups to be positioned closer to cartons of a carton pile 11. As illustrated in FIG. 33A the pivoting shelf or tray 426b may be rotated down when the manipulator is attached to the cartons of the carton pile 11. FIG. 33B illustrates the pivoting shelf or tray 426b rotated partially up through its range of motion between a rotated down state and a rotated up state. The rod of piston 497 may be partially extended/retracted driving the protruding arm 495 forward/backward, thereby raising the pivoting shelf or tray 426b up from a rotated down state or down from a rotated up state, respectively. FIG. 33C illustrates the pivoting shelf or tray 426b rotated up parallel to the stationary shelf 426a. The rod of the piston 497 may be fully extended. In an embodiment, the pivoting shelf or tray 426b may be rotated up to support cartons and/or to place the bumper against the carton pile 11 to stabilize the carton pile 11. In an embodiment, the pivoting shelf or tray 426b may be rotated up before the vacuum manipulator 408 is placed in position at the carton pile 11. In another embodiment, the pivoting shelf or tray 426b may be rotated up after the vacuum manipulator 408 is placed in position at the carton pile 11.

Figure 34:
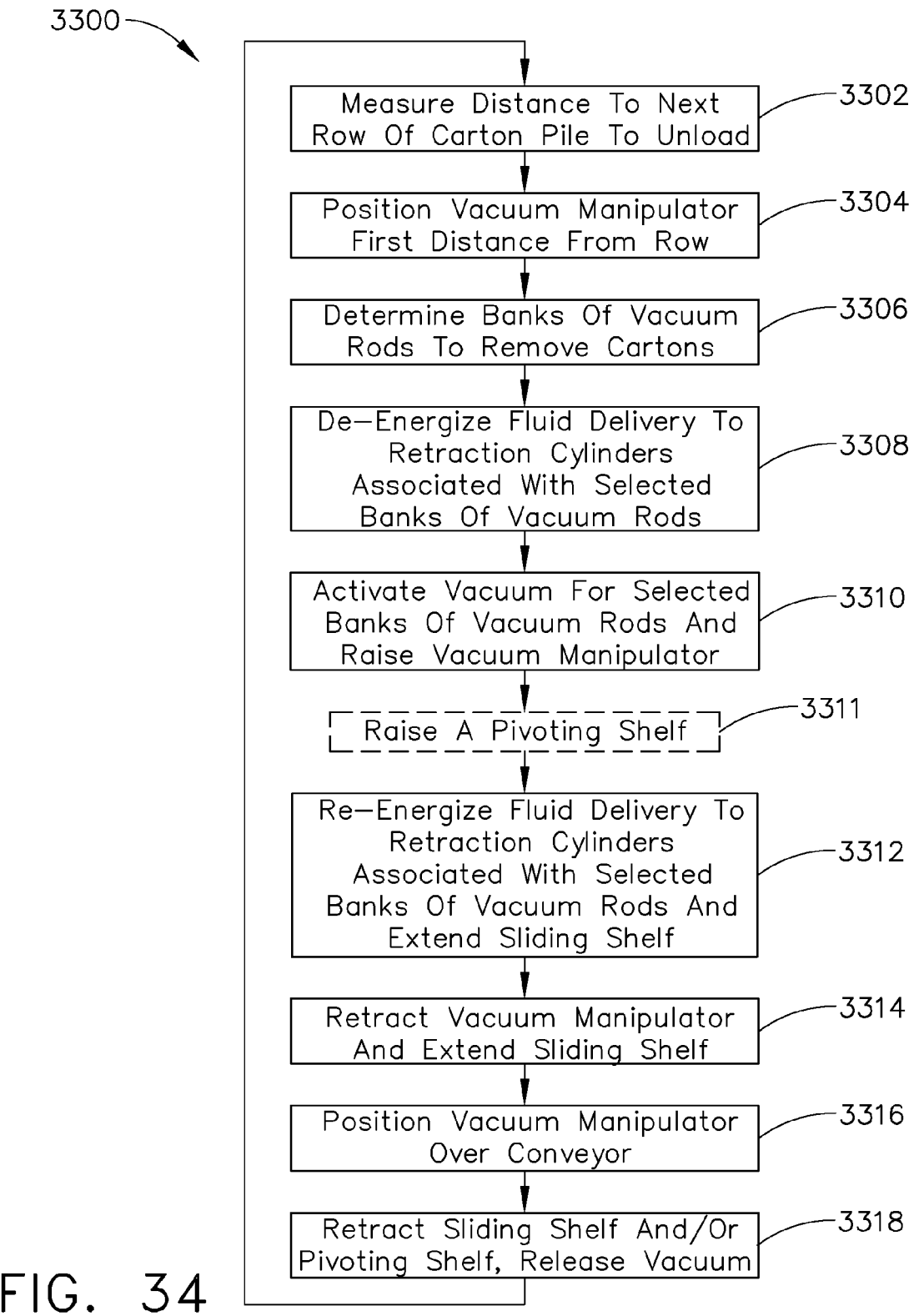
FIG. 34 is a process flow diagram illustrating an embodiment method for controlling a robotic carton unloader including a vacuum manipulator.

FIG. 34 is a process flow diagram illustrating an embodiment method 3300 for controlling a robotic carton unloader including a manipulator, such as vacuum manipulator 408 described above. In an embodiment, the operations of method 3300 may be performed by a processor of a control and visualization system connected to a conveyor system, robotic positioner, and manipulator to automatically control the conveyor system, robotic positioner, and manipulator to unload a carton pile.

In block 3302 the control and visualization system may measure a distance to the next row of a carton pile to be unloaded. For example, the control and visualization system may measure the distance using one or more sensor, such as one or more camera or other carton sensor. In block 3304 the control and visualization system may position the vacuum manipulator a first distance away from the row. For example, the distance may be a distance selected to enable the vacuum rods of the vacuum manipulator to extend to the cartons in the row. The control and visualization system may use the measured distance to the next row of the carton pile to be unloaded determine the robotic positioner and mobile body actuations necessary to position the vacuum manipulator at the first distance. In an embodiment where the vacuum manipulator includes a pivoting shelf or tray, the pivoting shelf or tray may be rotated up as the vacuum manipulator is positioned or after the vacuum manipulator is brought into position. In block 3306 the control and visualization system may determine the banks of vacuum rods needed to remove the cartons of the row. For example, the control and visualization system may determine that one bank, two banks, and/or three banks of vacuum rods may be activated. Removing cartons from each row may not require all banks to be selected for each carton removal operation.

In block 3308 the control and visualization system may de-energize the fluid delivery to the retraction cylinders associated with the selected banks of vacuum rods. De-energizing the fluid delivery to the retraction cylinders may enable the compression springs of each selected bank to drive the vacuum rods forward to contact the cartons of the row. In block 3310 the control and visualization system may activate the vacuum for the selected banks of vacuum rods to grip the cartons via suction and raise the vacuum manipulator a selected height, such as two inches. Raising the vacuum manipulator may raise the cartons reducing the surface area of cartons being moved in contact with cartons below remaining in the carton pile, thereby making dislodging the cartons easier.

In optional block 3311 the control and visualization system may raise a pivoting shelf portion. As discussed above, in an optional embodiment, a portion of the moveable shelf may pivot or rotate. For example, a pivoting portion of the sliding shelf may be attached by a hinge or other type joint to a stationary portion of the movable shelf that merely slides forward and backward, and the pivoting portion pivots or rotate relative to the sliding portion. In this manner, the moveable shelf slides and/or the moveable shelf pivots. The control and visualization system may optionally raise the pivoting shelf portion to stabilize the carton pile during unloading of the carton pile. In block 3312 the control and visualization system may re-energize the fluid delivery to the retraction cylinders associated with the selected banks of vacuum rods and extend the shelf. As discussed above, though the fluid delivery may be re-energized, all vacuum rods may not begin moving at the time of fluid delivery and/or at the same time, because an individual vacuum rod is passive and will not move until the respective plate contacts its respective stop. Thus, there may be a "dead zone" in which though a vacuum has been applied and the vacuum manipulator has started to move some cartons, other vacuum rods and/or cartons may remain still waiting for their stops to be contacted by plates. In an embodiment, the moveable shelf, or portions of the moveable shelf, slides and/or pivots, and the shelf may be extended at the same time fluid delivery is started, such as nearly the same time, or may be started at a different time. In block 3314 the control and visualization system may retract the vacuum manipulator and extend the sliding shelf. The vacuum manipulator may be retracted by the robotic positioner as the shelf is extended such that the shelf extends over fifty percent of the distance to the center of gravity of the cartons being removed.

In block 3316 the control and visualization system may position the vacuum manipulator over the conveyor system and in block 3318 the control and visualization system may retract the shelf (and optionally lower a pivoting shelf portion in embodiments in which the shelf pivots) and release the vacuum. In an embodiment where the vacuum manipulator includes a pivoting shelf or tray, the pivoting shelf or tray may be rotated down in addition to or in place of retracting the sliding shelf to drop the cartons. Whether through retracting the shelf, tipping the vacuum manipulator, and/or pivoting the shelf, the cartons may drop onto the conveyor. The method 3300 may then return to block 3300 to measure the distance to the next row of cartons to be unloaded.

The various embodiments may provide a robotic carton unloader for unloading a carton pile, comprising a conveyor system, a robotic positioner, and a manipulator having a conformable face configured to conform to irregularities of the carton pile, the manipulator movably attached to an end of the robotic positioner wherein the conformable face comprises a plurality of forward biased independently moveable passive carton remover devices. In a further embodiment, conformable face may be configured such that when the plurality of forward biased independently moveable passive carton remover devices contacts the carton pile one or more of the carton remover devices move to conform the conformable face to the irregularities of the carton pile. In a further embodiment, the carton remover devices may be vacuum rods supported within a guide frame of the manipulator. In a still further embodiment, the manipulator may further comprise a spring associated with each vacuum rod configured to impart force on the guide frame and the respective vacuum rod to extend the vacuum rod forward from the guide frame toward a carton of the carton pile. In an additional embodiment, each vacuum rod may comprise a hollow guide rod, a vacuum cup connected to a forward end of the guide rod, a vacuum coupling connected to a rear end of the guide rod, a stop located between the vacuum coupling and the vacuum cup, and a washer located between the stop and the vacuum cup. In a further embodiment, each spring may be a compression spring encircling the guide rod of its respective vacuum rod and configured to impart force on a front face of the guide frame and the washer to extend its respective vacuum rod forward from the guide frame toward the carton of the carton pile. In an additional embodiment, the manipulator may further comprise a plate, and a retraction cylinder connected to the plate, wherein the plate may be configured to contact the stops of the vacuum rods when the retraction cylinder is extended to retract the vacuum rods into the guide frame. In a further embodiment, the plurality of forward biased independently moveable passive carton remover devices may be arranged into two or more banks of carton remover devices. In an embodiment, the robotic carton unloader may further comprise a control and visualization system connected to the conveyor system, the robotic positioner, and the manipulator, wherein the control and visualization system may be configured to automatically control the conveyor system, the robotic positioner, and the manipulator to unload the carton pile. In a further embodiment, the control and visualization system may be configured to control the vacuum manipulator to extend each of the two or more banks of vacuum rods independently. In a further embodiment, the control and visualization system may be configured to control the robotic positioner to rotate the manipulator perpendicular to a floor of a truck or trailer to lift a carton from the floor. In an embodiment, the manipulator may further comprise a sliding shelf configured to extend toward the carton pile to stabilize the carton pile. In a further embodiment, the control and visualization system may be configured to control the robotic positioner and vacuum manipulator to extend the sliding shelf while retracting one or more of the carton remover devices or moving the manipulator away from the carton pile. In a further embodiment, the manipulator may further comprise at least one pneumatic cylinder coupled to the sliding shelf to extend and retract the sliding shelf. In an embodiment, the pneumatic cylinder may be a pneumatic rodless fluid cylinder with magnetic coupling. In an embodiment, the manipulator may further comprise at least one additional carton remover device configured to extend out from the manipulator perpendicular to conformable face.

As used herein, processors may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose. It is intended that the scope of this provisional filing will be better defined by the claims submitted with a later non-provisional filing.

What is claimed is:

1. A robotic carton unloader for unloading a carton pile, comprising:
   a conveyor system;
   a robotic positioner comprising a robotic arm; and
   a manipulator having a frame that supports a conformable face configured to conform to irregularities of a lateral face of two or more cartons of the carton pile, the manipulator movably attached to an end of the robotic positioner,
   wherein the robotic arm is positioned proximate to the conveyor system and the carton pile and has a range of motion of the end of the robotic positioner sufficient to move manipulator from a lateral side of the carton pile adjacent to two or more cartons to the conveyor system, and
   wherein the conformal face of the manipulator comprises a first bank of one or more vacuum manipulators and a second bank of one or more vacuum rods, the first and second bank independently extendable for the first bank of one or more vacuum rods to contact one of the two or more cartons at a first horizontal distance from the frame of the manipulator and for the second bank of one or more vacuum rods to contact another one of the two or more cartons at a second horizontal distance from the frame of the manipulator;
   wherein each bank of one or more of vacuum rods comprises at least one fluid activated cylinder to move that bank of pluralities of vacuum rods towards and away from the carton pile.

2. The robotic carton unloader of claim 1, wherein the conformable face is configured to passively conform to the irregularities of the carton pile by contact therewith.

3. The robotic carton unloader of claim 1, wherein each of the plurality of vacuum rods is biased towards the carton pile by a spring.

4. The robotic carton unloader of claim 1, wherein each bank of a plurality of vacuum rods is attached for movement by a respective plate received for extending and retracting movement within the frame of the manipulator, each plate configured to move independent of one more other plates that respectively extend and retract the one or more other banks of pluralities of vacuum rods towards the carton pile to conform to the irregularities of the carton pile by contact therewith and to move independent of the other banks of pluralities of vacuum rods away from the carton pile to unload the contacted cartons.

5. The robotic carton unloader of claim 1, further comprising a control and visualization system connected to the conveyor system, the robotic positioner, and the manipulator, wherein the control and visualization system is configured to automatically control the conveyor system, the robotic positioner, and the manipulator to unload the carton pile.

6. The robotic carton unloader of claim 1, further comprising a control and visualization system connected to the conveyor system, the robotic positioner, and the manipulator, wherein the control and visualization system is configured to automatically control the conveyor system, the robotic positioner, and the manipulator to unload the carton pile.

7. The robotic carton unloader of claim 6, wherein the control and visualization system is configured to control the robotic positioner to rotate the manipulator perpendicular to a floor of a truck or trailer to lift a carton from the floor.

8. The robotic carton unloader of claim 1, wherein the manipulator further comprises at least one vacuum rod configured to extend out from a lateral side of the manipulator perpendicular to the conformable face.

9. The robotic carton unloader of claim 8, wherein the at least one vacuum rod is configured to attach to contacted cartons on the lateral side of the manipulator to unload the contacted cartons.

10. A robotic carton unloader for unloading a carton pile, comprising:
    a conveyor system;
    a manipulator engageable to a lateral side of at least one carton of the carton pile;
    a robotic positioner comprising a robotic arm having an end attached to the manipulator, the robotic arm positioned proximate to the conveyor system and the carton pile, and the robotic arm having a range of motion of the end of the robotic positioner sufficient to move manipulator from a lateral side of the carton pile to the conveyor system; and
    a moveable shelf movably attached to the manipulator for movement towards and away from the carton pile, the moveable shelf configured to support cartons drawn from the carton pile in an opposing direction parallel to the moveable shelf that is in an extended position towards the carton pile.

11. The robotic carton unloader of claim 10, wherein the moveable shelf comprises a sliding shelf that is slidingly received on a bottom portion of the manipulator to slide towards and away from the carton pile.

12. The robotic carton unloader of claim 11, wherein the moveable shelf further comprises a pivoting shelf that pivots about an extending end of the sliding shelf from a position perpendicular to forward.

13. The robotic carton unloader of claim 10, wherein the moveable shelf includes a bumper to stabilize the carton pile as cartons are unloaded.

14. The robotic carton unloader of claim 10, wherein the moveable shelf comprises a pivoting shelf that pivots from a position perpendicular forward.

15. The robotic carton unloader of claim 14, wherein the pivoting shelf includes a bumper to stabilize the carton pile as cartons are unloaded.

16. The robotic carton unloader of claim 10, further comprising a control and visualization system connected to the conveyor system, the robotic positioner, and the manipulator, wherein the control and visualization system is configured to automatically control the conveyor system, the robotic positioner, the manipulator, and the moveable shelf to unload the carton pile.

17. A manipulator of a robotic carton unloader for unloading a carton pile, comprising:
a conveyor system;
a robotic positioner comprising a robotic arm; and
a manipulator having a frame that supports a conformable face configured to conform to irregularities of a lateral face of two or more cartons of the carton pile, the manipulator movably attached to an end of a robotic arm of a robotic positioner,
wherein the robotic arm is positioned proximate to the conveyor system and the carton pile and has a range of motion of the end of the robotic positioner sufficient to move manipulator from a lateral side of the carton pile adjacent to two or more cartons to a conveyor system, and
wherein the conformal face of the manipulator comprises a first bank of one or more vacuum manipulators and a second bank of one or more vacuum rods, the first and second bank independently extendable for the first bank of one or more vacuum rods to contact one of the two or more cartons at a first horizontal distance from the frame of the manipulator and for the second bank of one or more vacuum rods to contact another one of the two or more cartons at a second horizontal distance from the frame of the manipulator;
wherein each bank one or more of vacuum rods comprises at least one fluid activated cylinder to move that bank of pluralities of vacuum rods towards and away from the carton pile.

18. The manipulator of claim 17, wherein the conformable face is configured to passively conform to the irregularities of the carton pile by contact therewith.

19. The manipulator of claim 17, wherein each of the plurality of vacuum rods is biased towards the carton pile by a spring.

20. The manipulator of claim of claim 17, wherein each bank of a plurality of vacuum rods is attached for movement by a respective plate received for extending and retracting movement within the frame of the manipulator, each plate configured to move independent of one or more other plates that respectively extend and retract the one or more other banks of pluralities of vacuum rods towards the carton pile to conform to the irregularities of the carton pile by contact therewith and to move independent of the other banks of pluralities of vacuum rods away from the carton pile to unload the contacted cartons.

21. The manipulator of claim 17, further comprising at least one vacuum rod configured to extend out from a side of the manipulator perpendicular to the conformable face.

22. The manipulator of claim 21, wherein the at least one vacuum rod is configured to attach to contacted cartons on the side of the manipulator to unload the contacted cartons by applying vacuum to attach to the contacted cartons.

23. A manipulator of a robotic carton unloader for unloading a carton pile, comprising:
a manipulator attached to an end of a robotic arm of a robotic positioner, the robotic arm positioned proximate to a conveyor system and a carton pile, and the robotic arm having a range of motion of the end of the robotic positioner sufficient to move manipulator from a lateral side of the carton pile to the conveyor system, the manipulator engageable to a lateral side of at least one carton of the carton pile; and
a moveable shelf movably attached to the manipulator for movement towards and away from the carton pile, the moveable shelf configured to support cartons drawn from the carton pile in an opposing direction parallel to the moveable shelf that is in an extended position towards the carton pile.

24. The manipulator of claim 23, wherein the moveable shelf comprises a sliding shelf that is slidingly received on a bottom portion of the manipulator to slide towards and away from the carton pile.

25. The manipulator of claim 24 wherein the sliding shelf of the moveable shelf includes a bumper to stabilize the carton pile as cartons are unloaded.

26. The manipulator of claim 24, wherein the moveable shelf further comprises a pivoting shelf that pivots about an extending end of the sliding shelf from a position perpendicular to forward.

27. The manipulator of claim 23, wherein the moveable shelf comprises a pivoting shelf that pivots from a position perpendicular to forward.

28. The manipulator of claim 27, wherein the pivoting shelf includes a bumper to stabilize the carton pile as cartons are unloaded.

* * * * *